(12) United States Patent
Kubo

(10) Patent No.: US 7,375,781 B2
(45) Date of Patent: May 20, 2008

(54) LIQUID CRYSTAL DISPLAY DEVICE

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 11/018,767

(22) Filed: Dec. 22, 2004

(65) Prior Publication Data

US 2005/0140876 A1 Jun. 30, 2005

(30) Foreign Application Priority Data

Dec. 24, 2003 (JP) .............................. 2003-428427

(51) Int. Cl.
G02F 1/1335 (2006.01)
G02F 1/1337 (2006.01)

(52) U.S. Cl. ..................... 349/114; 349/129
(58) Field of Classification Search ........... 349/114, 349/129
See application file for complete search history.

(56) References Cited

U.S. PATENT DOCUMENTS

| | | | |
|---|---|---|---|
| 4,368,523 A | 1/1983 | Kawate |
| 4,955,698 A | 9/1990 | Knoll et al. |
| 5,132,819 A | 7/1992 | Noriyama et al. |
| 5,164,851 A | 11/1992 | Kanemori et al. |
| 5,179,456 A | 1/1993 | Aizawa et al. |
| 5,182,664 A | 1/1993 | Clerc |
| 5,245,450 A | 9/1993 | Ukai et al. |
| 5,260,818 A | 11/1993 | Wu |
| 5,289,174 A | 2/1994 | Suzuki |
| 5,309,264 A | 5/1994 | Lien et al. |
| 5,331,447 A | 7/1994 | Someya et al. |
| 5,363,294 A | 11/1994 | Yamamoto et al. |
| 5,408,345 A | 4/1995 | Mitsui et al. |
| 5,434,687 A | 7/1995 | Kawata et al. |

(Continued)

FOREIGN PATENT DOCUMENTS

EP 0 884 626 A2 12/1998

(Continued)

OTHER PUBLICATIONS

Jisaki et al, "Development of transflective LCD for high contrast and wide viewing angle by using homeotropic alignment", Asia Display/IDW '01, pp. 133-136.

(Continued)

Primary Examiner—Michael H. Caley
(74) Attorney, Agent, or Firm—Nixon & Vanderhye P.C.

(57) ABSTRACT

In each picture element region, a first electrode provided on one side of the first substrate that is closer to the liquid crystal layer includes a plurality of sub-electrodes, whereby the liquid crystal layer forms a liquid crystal domain taking a radially-inclined orientation above each sub-electrode by an inclined electric field produced around the sub-electrode. The second substrate includes a stepped portion including an upper tier located in the reflection region, a lower tier located in the transmission region and a side surface connecting the upper tier and the lower tier to each other, the side surface of the stepped portion being located in the reflection region and covered by the second electrode. The plurality of sub-electrodes are arranged in a line in a column direction D2, and picture elements that are adjacent to each other in a row direction D1 are driven with voltages of opposite polarities in each frame.

27 Claims, 33 Drawing Sheets

U.S. PATENT DOCUMENTS

| | | |
|---|---|---|
| 5,477,358 A | 12/1995 | Rosenblatt et al. |
| 5,512,336 A | 4/1996 | Yamahara |
| 5,558,927 A | 9/1996 | Aruga et al. |
| 5,594,570 A | 1/1997 | Hirata et al. |
| 5,602,662 A | 2/1997 | Rosenblatt et al. |
| 5,608,556 A | 3/1997 | Koma |
| 5,636,043 A | 6/1997 | Uemura et al. |
| 5,646,702 A | 7/1997 | Akinwande et al. |
| 5,666,179 A | 9/1997 | Koma |
| 5,668,651 A | 9/1997 | Yamada et al. |
| 5,673,092 A | 9/1997 | Horie et al. |
| 5,699,137 A | 12/1997 | Kishimoto |
| 5,726,728 A | 3/1998 | Kondo et al. |
| 5,748,276 A | 5/1998 | Uno et al. |
| 5,753,093 A | 5/1998 | Raguse et al. |
| 5,995,176 A | 11/1999 | Sibahara |
| 6,061,117 A | 5/2000 | Horie et al. |
| 6,097,464 A | 8/2000 | Liu |
| 6,141,077 A | 10/2000 | Hirata et al. |
| 6,169,593 B1 | 1/2001 | Kanaya et al. |
| 6,175,398 B1 | 1/2001 | Yamada et al. |
| 6,195,140 B1 | 2/2001 | Kubo et al. |
| 6,201,592 B1 | 3/2001 | Terashita et al. |
| 6,222,599 B1 | 4/2001 | Yoshida et al. |
| 6,256,082 B1 | 7/2001 | Suzuki et al. |
| 6,266,122 B1 | 7/2001 | Kishimoto et al. |
| 6,287,649 B1 | 9/2001 | Fukushima et al. |
| 6,330,047 B1 | 12/2001 | Kubo et al. |
| 6,335,780 B1 | 1/2002 | Kurihara et al. |
| 6,339,462 B1 | 1/2002 | Kishimoto et al. |
| 6,340,998 B1 | 1/2002 | Kim et al. |
| 6,341,002 B1 | 1/2002 | Shimizu et al. |
| 6,342,938 B1 | 1/2002 | Song et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,567,144 B1 | 5/2003 | Kim et al. |
| 6,573,964 B1 | 6/2003 | Takizawa et al. |
| 6,573,965 B1 | 6/2003 | Liu et al. |
| 6,577,366 B1 | 6/2003 | Kim et al. |
| 6,593,982 B2 | 7/2003 | Yoon et al. |
| 6,600,539 B2 | 7/2003 | Song |
| 6,614,497 B2 | 9/2003 | Yamada |
| 6,630,975 B1 | 10/2003 | Terashita |
| 6,657,695 B1 | 12/2003 | Song et al. |
| 6,661,488 B1 | 12/2003 | Takeda et al. |
| 6,710,825 B2 | 3/2004 | Kubo et al. |
| 6,788,375 B2 | 9/2004 | Ogishima et al. |
| 6,812,986 B2 | 11/2004 | Takatori et al. |
| 6,822,723 B2 | 11/2004 | Song et al. |
| 6,862,062 B2 | 3/2005 | Kubo et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,995,826 B2 | 2/2006 | Kubo et al. |
| 7,139,055 B2 | 11/2006 | Ogishima et al. |
| 7,145,624 B2 | 12/2006 | Kubo et al. |
| 7,215,395 B2 | 5/2007 | Kubo et al. |
| 7,230,664 B2 | 6/2007 | Kubo et al. |
| 2001/0024257 A1 | 9/2001 | Kubo et al. |
| 2002/0036740 A1 | 3/2002 | Kubo et al. |
| 2002/0036744 A1 | 3/2002 | Kubo et al. |
| 2002/0060764 A1 | 5/2002 | Taniguchi et al. |
| 2002/0063834 A1 | 5/2002 | Sawasaki et al. |
| 2002/0075436 A1 | 6/2002 | Kubo et al. |
| 2002/0159012 A1 | 10/2002 | Yamada |
| 2002/0171792 A1 | 11/2002 | Kubota et al. |
| 2003/0107695 A1 | 6/2003 | Kubo et al. |
| 2003/0227429 A1* | 12/2003 | Shimoshikiryo ............ 345/90 |
| 2004/0041770 A1 | 3/2004 | Kubo et al. |
| 2004/0201810 A1 | 10/2004 | Kubo et al. |
| 2005/0001947 A1 | 1/2005 | Ogishima et al. |
| 2005/0140876 A1 | 6/2005 | Kubo |

FOREIGN PATENT DOCUMENTS

| | | |
|---|---|---|
| JP | 03-209440 | 9/1991 |
| JP | 04-139402 | 5/1992 |
| JP | 04-293018 | 10/1992 |
| JP | 04-318816 | 11/1992 |
| JP | 05-289108 | 11/1993 |
| JP | 06-043461 | 2/1994 |
| JP | 6-75238 A | 3/1994 |
| JP | 06-118909 | 4/1994 |
| JP | 6-301036 | 10/1994 |
| JP | 07-036058 | 2/1995 |
| JP | 07-234400 | 9/1995 |
| JP | 7-281176 A | 10/1995 |
| JP | 07-311383 | 11/1995 |
| JP | 08-292423 | 11/1996 |
| JP | 09-258266 | 10/1997 |
| JP | 09-269509 | 10/1997 |
| JP | 10-186330 A | 7/1998 |
| JP | 10-301114 A | 11/1998 |
| JP | 11-109417 A | 4/1999 |
| JP | 11-242225 | 9/1999 |
| JP | 2000-47217 | 2/2000 |
| JP | 2000-47253 | 2/2000 |
| JP | 2000-075296 | 3/2000 |
| JP | 2000-305110 | 11/2000 |
| JP | 2001-343647 A | 12/2001 |
| JP | 2002-055343 A | 2/2002 |
| KR | 1999-0048949 | 7/1999 |
| KR | 2003-058012 A | 7/2003 |
| KR | 2003-058140 A | 7/2003 |
| WO | 00/22677 | 4/2000 |

OTHER PUBLICATIONS

Jignesh Gandhi et al., "Performance Enhancement of reflective CMOS Twistes Nematic Disp Projection Applications Using Compensating Films", pp. 1-6, reprinted from http://www/hanoah.com/publications/sid99 paper Jignesh final pdf. (1999).

Thomson-CSFILR-Jan. 2000, Optical compensation for displays (2pgs).

KR Notice of Reasons for Rejection and English translation thereof mailed Apr. 25, 2006 in corresponding Korean application No. 10-2004-0110955.

U.S. Appl. No. 10/601,307 filed Jun. 23, 2003.

* cited by examiner

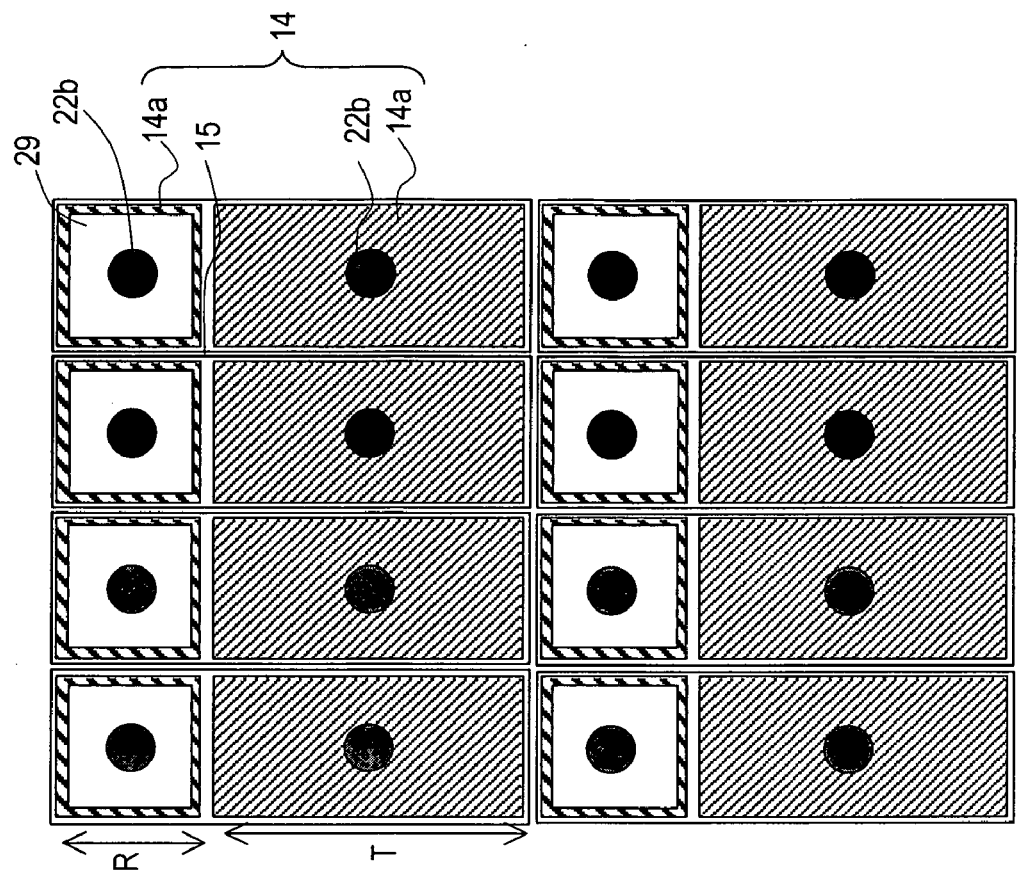
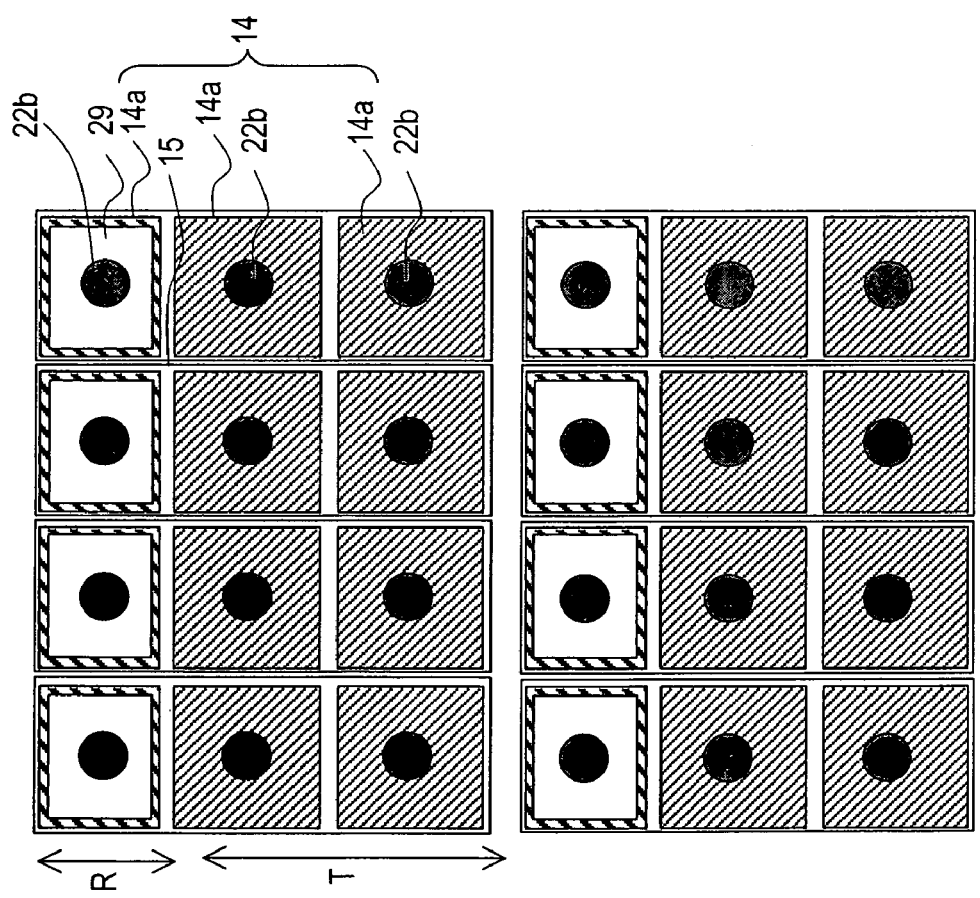

LIQUID CRYSTAL DISPLAY DEVICE

FIELD OF THE INVENTION

The present invention relates to a liquid crystal display device, and more particularly to a liquid crystal display device having a wide viewing angle characteristic and being capable of producing a high quality display.

BACKGROUND OF THE INVENTION

In recent years, liquid crystal display devices, which are thin and light in weight, are used as personal computer displays and PDA (personal digital assistance) displays. However, conventional twist nematic (TN) type and super twist nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is not suitable for mass-production.

In view of this, the present inventor, along with others, has disclosed, in Japanese Laid-Open Patent Publication No. 2003-43525, yet another approach for performing an alignment control without a rubbing treatment, in which a plurality of openings are provided in one of a pair of electrodes opposing each other via a liquid crystal layer therebetween so that the orientation direction of the liquid crystal molecules is controlled by an inclined electric field produced at the edge portions of these openings. With this approach, a stable orientation with a sufficient degree of continuity in the orientation of the liquid crystal molecules can be obtained across the entirety of each picture element, thereby improving the viewing angle and realizing a high-quality display.

Liquid crystal display devices capable of producing a high-quality display both outdoors and indoors have been proposed in the art (see, for example, Japanese Laid-Open Patent Publication No. 11-101992). A liquid crystal display device of this type is called a "transmission-reflection type liquid crystal display device", and includes, in each picture element region, a reflection region where an image is displayed in a reflection mode and a transmission region where an image is displayed in a transmission mode.

More recently, however, there is a demand for a further increase in the aperture ratio to produce a brighter display, in addition to the demand for an increase in the viewing angle and the display quality. No particular approach has been established in the art for further improving the aperture ratio in a case where an alignment control is done by using an inclined electric field, as disclosed in Japanese Laid-Open Patent Publication No. 2003-43525.

Moreover, optimal configurations have not yet been found for cases where the alignment control using an inclined electric field is applied to a transmission-reflection liquid crystal display device.

SUMMARY OF THE INVENTION

It is therefore an object of this invention to provide a transmission-reflection liquid crystal display device having a wide viewing angle characteristic, a high display quality, and a high aperture ratio, and being capable of producing a bright display.

An inventive liquid crystal display device includes: a first substrate; a second substrate; and a liquid crystal layer provided between the first substrate and the second substrate, wherein: a plurality of picture element regions are defined in a matrix pattern including a plurality of rows extending in a first direction and a plurality of columns extending in a second direction crossing the first direction; each of the plurality of picture element regions includes a first electrode provided on one side of the first substrate that is closer to the liquid crystal layer, a second electrode provided on one side of the second substrate that is closer to the liquid crystal layer so as to oppose the first electrode, and the liquid crystal layer provided between the first electrode and the second electrode; the first electrode includes, in each of the plurality of picture element regions, a plurality of sub-electrodes, whereby the liquid crystal layer takes a vertical alignment in the absence of an applied voltage between the first electrode and the second electrode, and forms a plurality of first liquid crystal domains above the plurality of sub-electrodes of the first electrode by inclined electric fields produced around the plurality of sub-electrodes in response to a voltage applied between the first electrode and the second electrode, each of the plurality of first liquid crystal domains taking a radially-inclined orientation; each of the plurality of picture element regions includes a transmission region where an image is displayed in a transmission mode using light coming from the first substrate side, and a reflection region where an image is displayed in a reflection mode using light coming from the second substrate side; in each of the plurality of picture element regions, a thickness dr of the liquid crystal layer in the reflection region is smaller than a thickness dt of the liquid crystal layer in the transmission region, and the second substrate includes a stepped portion including an upper tier located in the reflection region, a lower tier located in the transmission region and a side surface connecting the upper tier and the lower tier to each other, the side surface of the stepped portion being located in the reflection region and covered by the second electrode; and the plurality of sub-electrodes of the first electrode are arranged in a line in the second direction, and a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame.

In a preferred embodiment, the plurality of picture element regions each have a shape whose longitudinal direction is defined in the second direction and whose width direction is defined in the first direction.

In a preferred embodiment, a polarity of a voltage applied across the liquid crystal layer in a plurality of picture element regions belonging to one column among the plurality of picture element regions is inverted for every n rows (where n is an integer of 1 or more) in each frame.

In a preferred embodiment, a polarity of a voltage applied across the liquid crystal layer in the first picture element region is different from a polarity of a voltage applied across the liquid crystal layer in a third picture element region that belongs to the same column as that of the first picture element region and belongs to a row adjacent to a row to which the first picture element region belongs in each frame.

In a preferred embodiment, a shape of each of the plurality of sub-electrodes has rotational symmetry.

In a preferred embodiment, each of the plurality of sub-electrodes has a generally circular shape.

In a preferred embodiment, each of the plurality of sub-electrodes has a generally rectangular shape.

In a preferred embodiment, each of the plurality of sub-electrodes has a generally rectangular shape with generally arc-shaped corner portions.

In a preferred embodiment, each of the plurality of sub-electrodes has a shape with acute angle corners.

In a preferred embodiment, the first substrate includes a plurality of electrodeless regions where the first electrode is not provided, the plurality of electrodeless regions substantially surrounding the plurality of sub-electrodes of the first electrode; and the liquid crystal layer forms a plurality of second liquid crystal domains in the plurality of electrodeless regions by the inclined electric fields produced around the plurality of sub-electrodes in response to a voltage applied between the first electrode and the second electrode, each of the plurality of second liquid crystal domains taking a radially-inclined orientation.

In a preferred embodiment, an orientation of the plurality of first liquid crystal domains and that of the plurality of second liquid crystal domains are continuous with each other.

In a preferred embodiment, at least some of the plurality of electrodeless regions have substantially the same shape and substantially the same size, and form at least one unit lattice arranged so as to have rotational symmetry.

In a preferred embodiment, a shape of each of the at least some of the plurality of electrodeless regions has rotational symmetry.

In a preferred embodiment, the second substrate includes, in a region corresponding to at least one of the plurality of first liquid crystal domains, an orientation-regulating structure that exerts an orientation-regulating force for orienting liquid crystal molecules in the at least one first liquid crystal domain into a radially-inclined orientation at least in the presence of an applied voltage.

In a preferred embodiment, the orientation-regulating structure is provided in a region in the vicinity of a center of the at least one first liquid crystal domain.

In a preferred-embodiment, the orientation-regulating structure exerts an orientation-regulating force for orienting the liquid crystal molecules into a radially-inclined orientation even in the absence of an applied voltage.

In a preferred embodiment, the orientation-regulating structure is a protrusion protruding from the second substrate into the liquid crystal layer.

In a preferred embodiment, a thickness of the liquid crystal layer is defined by the protrusion protruding from the second substrate into the liquid crystal layer.

In a preferred embodiment, the first substrate includes a protrusion provided above a central portion of at least one of the plurality of sub-electrodes.

In a preferred embodiment, in each of the plurality of picture element regions, a thickness de of the liquid crystal layer at an edge portion of at least one of the plurality of sub-electrodes is smaller than a thickness dc of the liquid crystal layer at-a central portion of the at least one sub-electrode.

In a preferred embodiment, a height of a surface of the at least one sub-electrode at an edge portion thereof is larger than that at a central portion thereof.

In a preferred embodiment, the first substrate includes a transparent substrate and an interlayer insulating film provided between the transparent substrate and the first electrode; the interlayer insulating film includes a first region where a height thereof on one side that is closer to the liquid crystal layer changes continuously; and an edge portion of the at least one sub-electrode is located in the first region.

In a preferred embodiment, the interlayer insulating film includes a second region where the height thereof on one side that is closer to the liquid crystal layer is substantially constant; and a central portion of the at least one sub-electrode is located in the second region.

In a preferred embodiment, light incident upon the liquid crystal layer is circularly-polarized light, and the circularly-polarized light is modulated through the liquid crystal layer to display an image.

In a preferred embodiment, the first electrode includes a transparent electrode defining the transmission region and a reflection electrode defining the reflection region.

In a preferred embodiment, the second substrate further includes a transparent dielectric layer selectively provided in the reflection region in each of the plurality of picture element regions.

In a preferred embodiment, the transparent dielectric layer provided in each of the plurality of picture element regions is continuous with the transparent dielectric layer provided in at least one of adjacent picture element regions.

In a preferred embodiment, the first substrate further includes a switching element provided for each of the plurality of picture element regions; and the first electrode is a picture element electrode provided for each of the plurality of picture element regions and switched by the switching element, and the second electrode is at least one counter electrode opposing the plurality of picture element electrodes.

According to the present invention, a liquid crystal domain having a radially-inclined orientation is stably formed with a high degree of continuity. Therefore, it is possible to further improve the display quality of a conventional liquid crystal display device having a wide viewing angle characteristic.

Moreover, a multigap structure is realized by providing a stepped portion on a substrate different from the substrate that is provided with an electrode for producing an inclined electric field for forming a radially-inclined orientation, whereby it is possible to obtain advantages related to the production process. Since the side surface of the stepped portion is located in the reflection region while being covered with the electrode, it is possible to suppress the deterioration in the display quality due to the inclination of the side surface of the stepped portion.

Furthermore, in each picture element region, a plurality of sub-electrodes are arranged in a line in a predetermined direction, whereby it is possible to increase the area ratio of the sub-electrode in the picture element region, thus improving the aperture ratio.

Picture elements that are adjacent to each other in a direction crossing the sub-electrode arrangement direction are driven with voltages of opposite polarities in each frame, whereby it is possible to produce an inclined electric field having a sharp potential gradient between picture elements that are adjacent to each other in that direction. Thus, it is possible to form a sufficiently stable radially-inclined orientation even when employing an arrangement with a short inter-electrode distance and a high aperture ratio.

As described above, the present invention provides a transmission-reflection liquid crystal display device having a wide viewing angle characteristic, a high display quality, and a high aperture ratio, and being capable of producing a bright display.

BRIEF DESCRIPTION OF THE DRAWINGS

FIG. 1A and FIG. 1B schematically illustrate a structure of a liquid crystal display device 100 of the present invention, wherein FIG. 1A is a plan view, and FIG. 1B is a cross-sectional view taken along line 1B-1B' of FIG. 1A.

Each of FIG. 4A to FIG. 4D schematically illustrates the relationship between an electric force line and an orientation of a liquid crystal molecule.

Figure 5A:
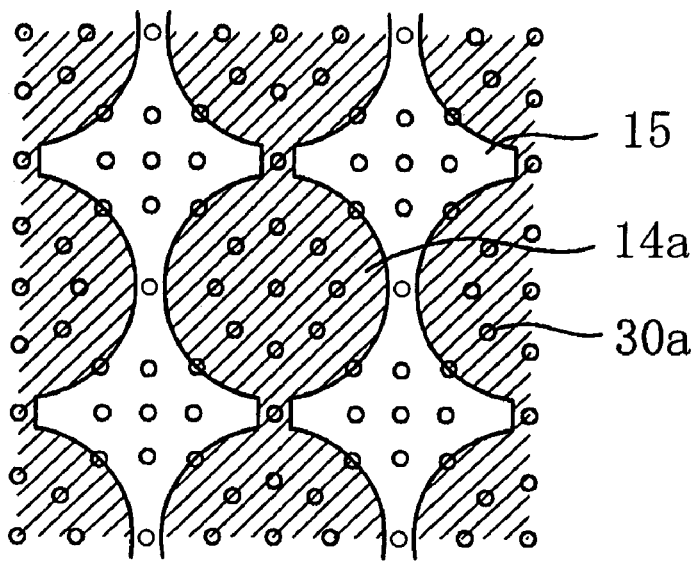
Figure 5B:
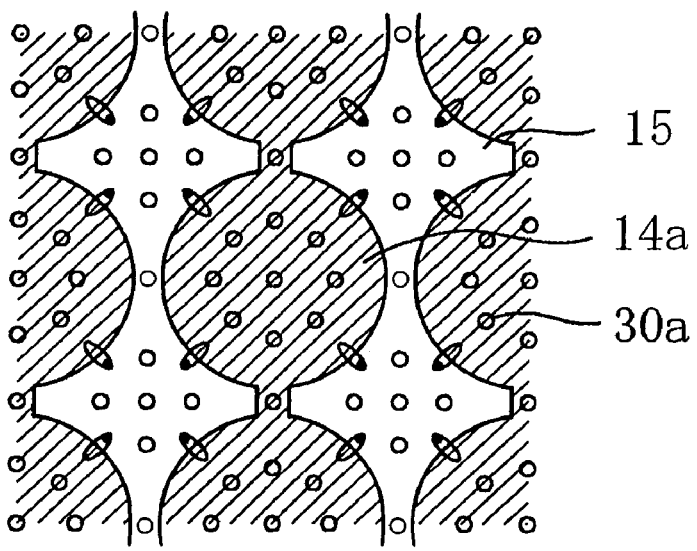
Figure 5C:
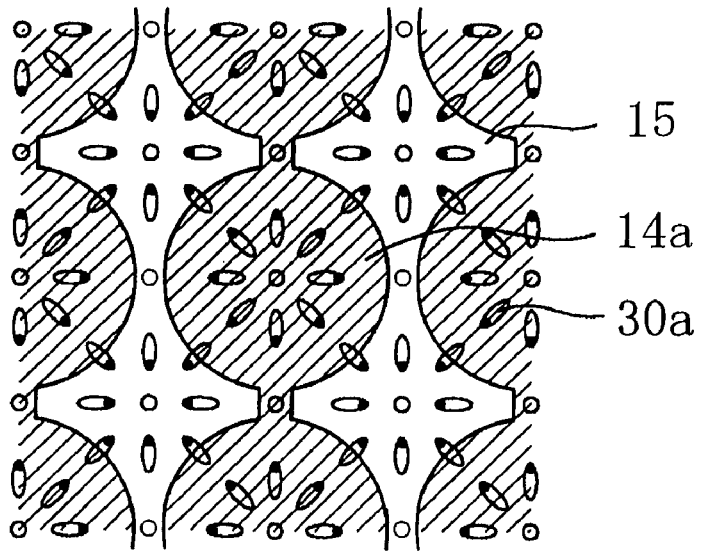

Each of FIG. 5A to FIG. 5C schematically illustrates an orientation of liquid crystal molecules in the liquid crystal display device 100 as viewed in a substrate normal direction.

Figure 6A:
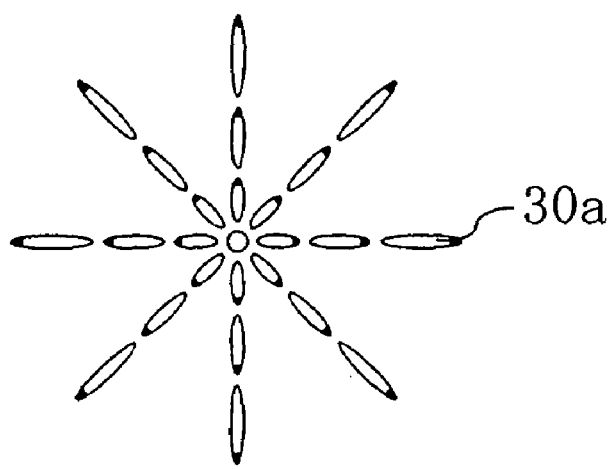
Figure 6B:
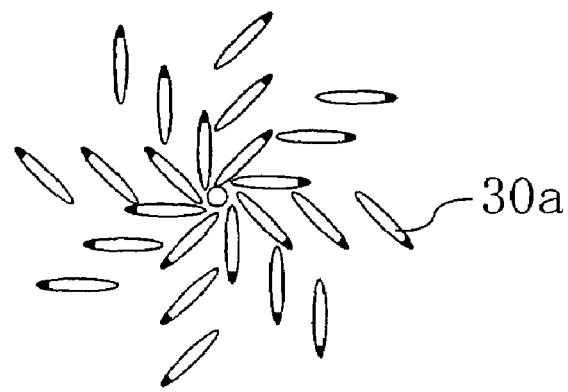
Figure 6C:
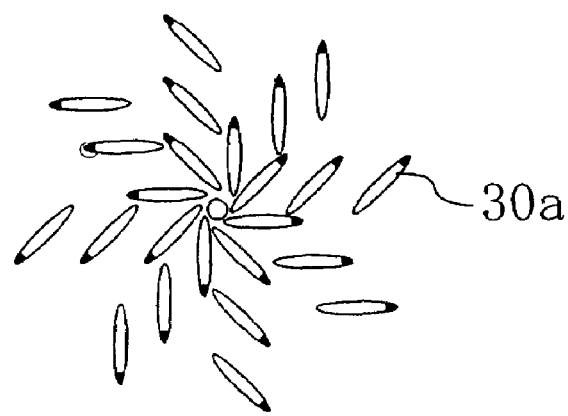

FIG. 6A to FIG. 6C schematically illustrate exemplary radially-inclined orientations of liquid crystal molecules.

Figure 7A:
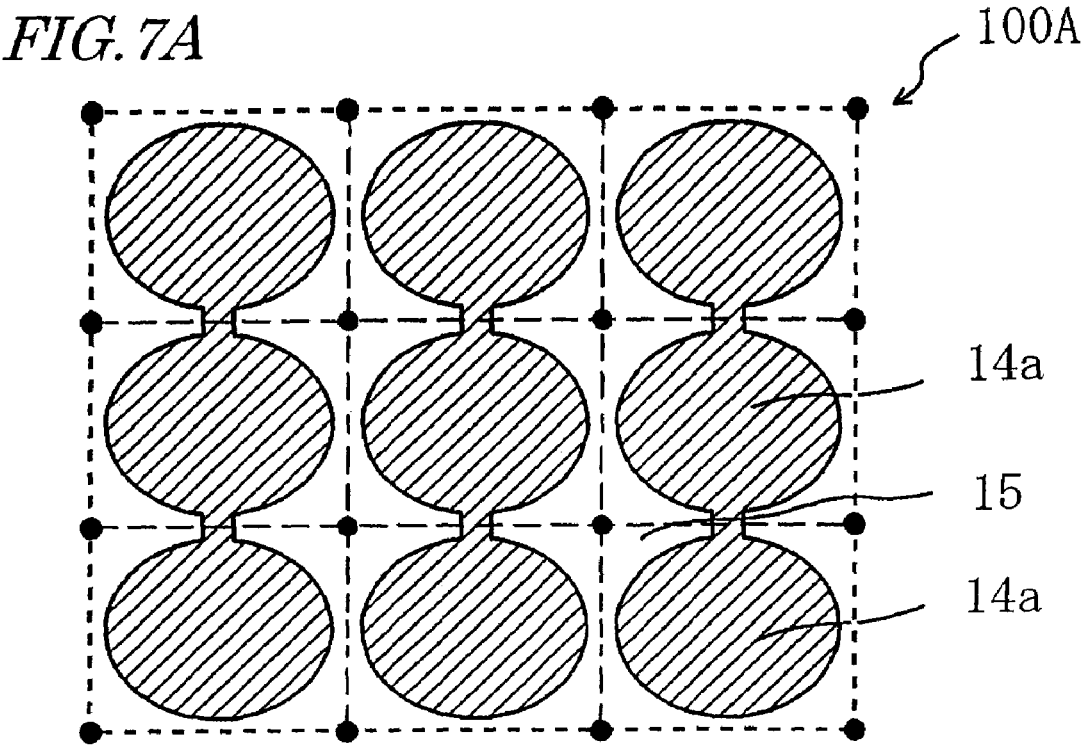
Figure 7B:
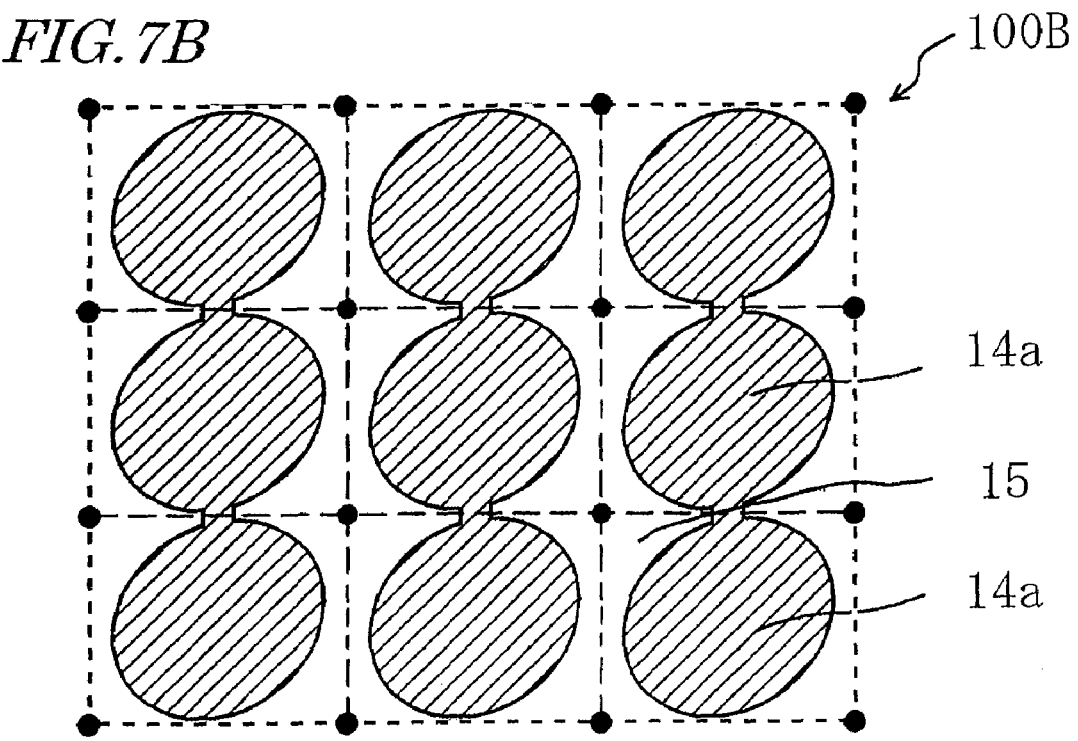

FIG. 7A and FIG. 7B are plan views schematically illustrating other liquid crystal display devices 100A and 100B, respectively, of the present invention.

Figure 8A:
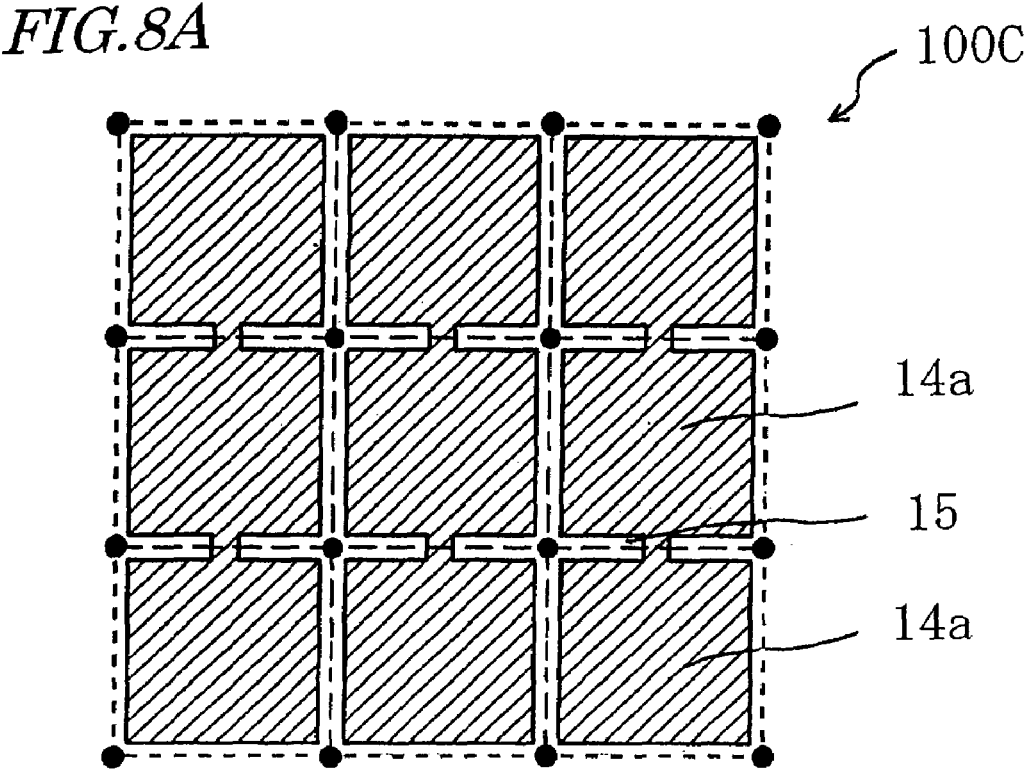
Figure 8B:
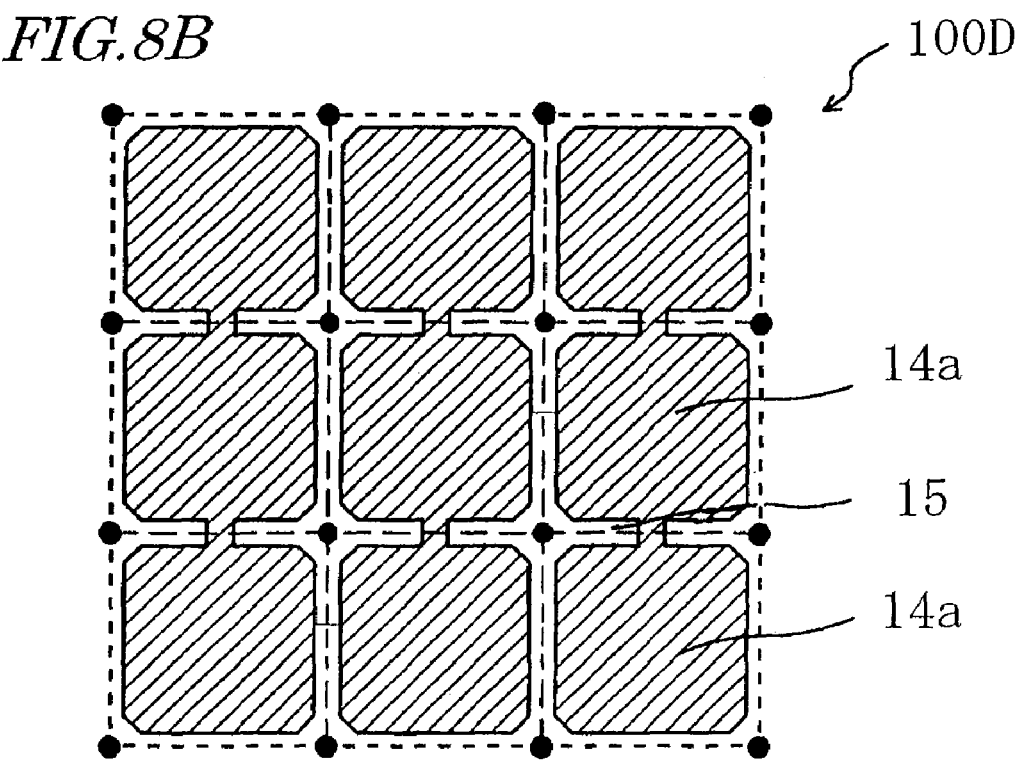

FIG. 8A and FIG. 8B are plan views schematically illustrating other liquid crystal display devices 100C and 100D, respectively, of the present invention.

Figure 9:
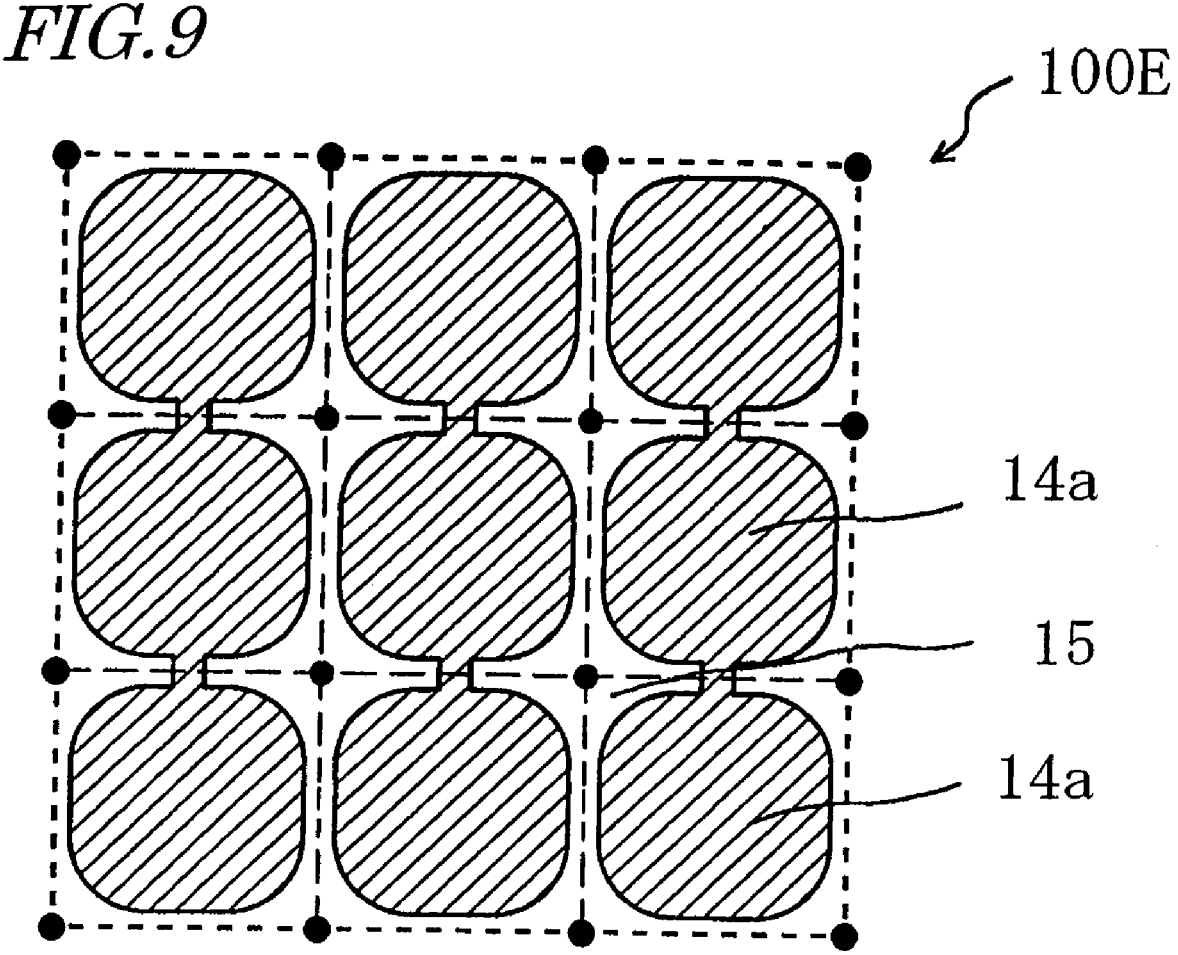

FIG. 9 is a plan view schematically illustrating another liquid crystal display device 100E of the present invention.

Figure 10:
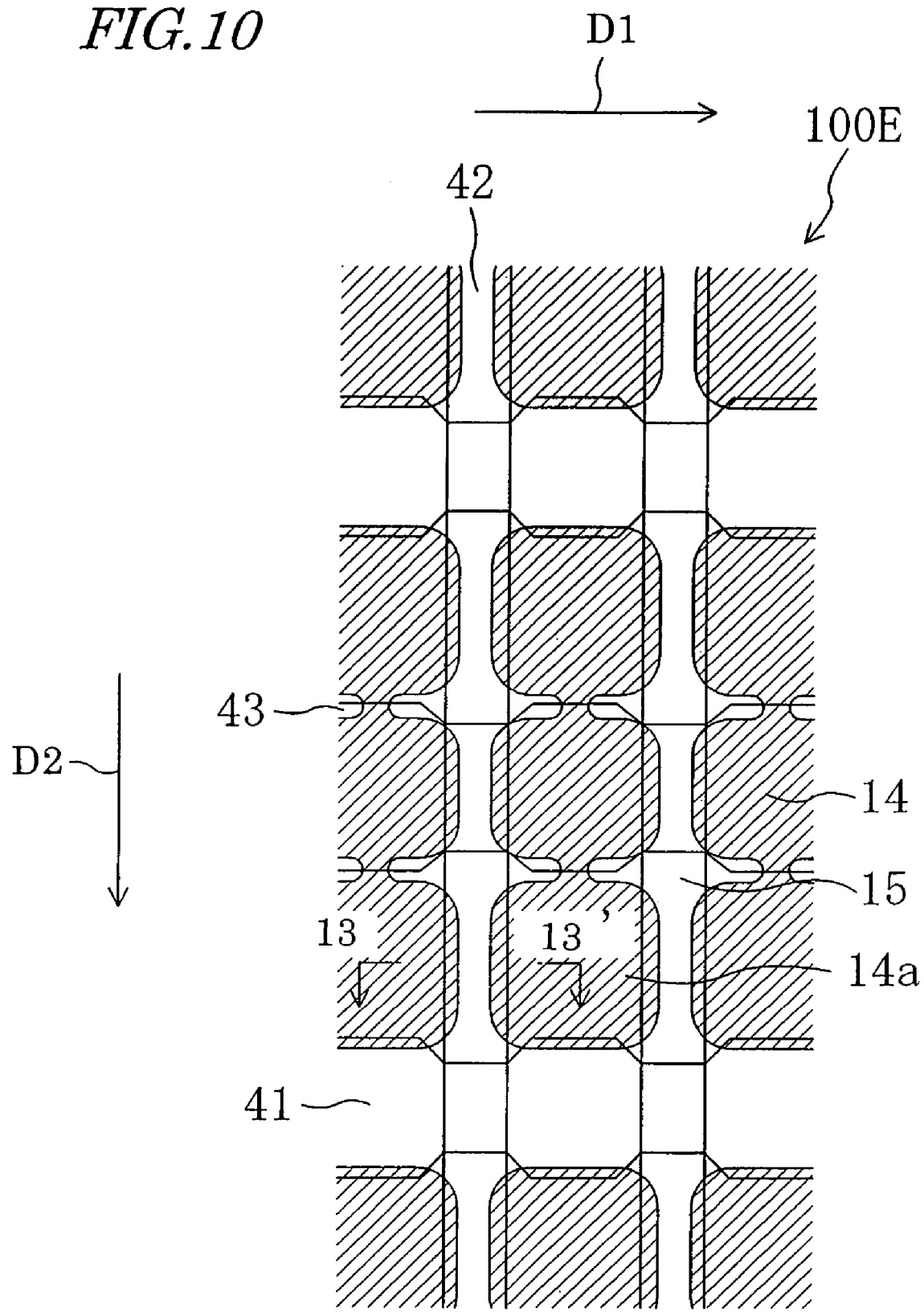

FIG. 10 is a plan view schematically illustrating the liquid crystal display device 100E of the present invention.

Figure 11:
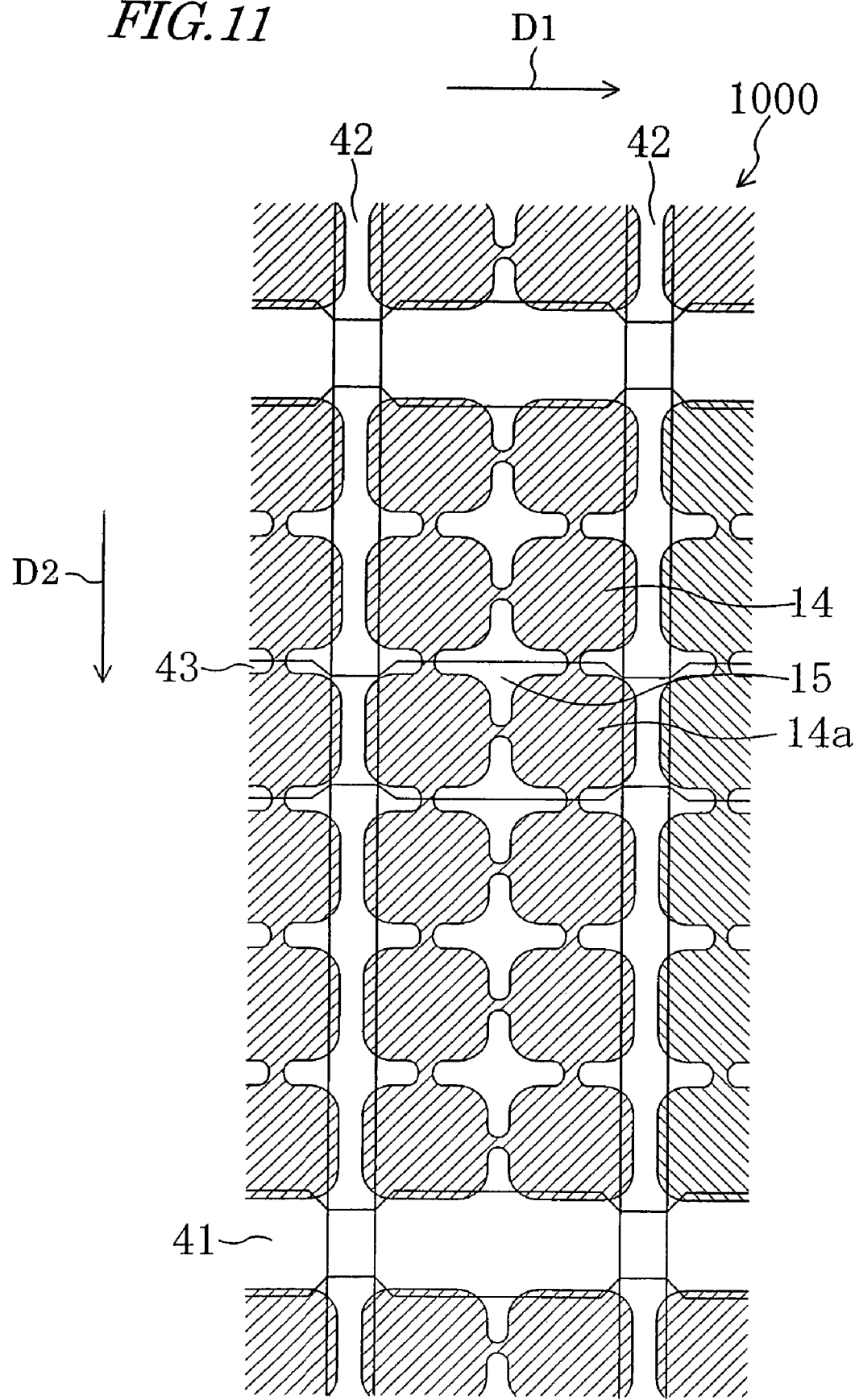

FIG. 11 is a plan view schematically illustrating a liquid crystal display device 1000 of a comparative example.

Figure 12:
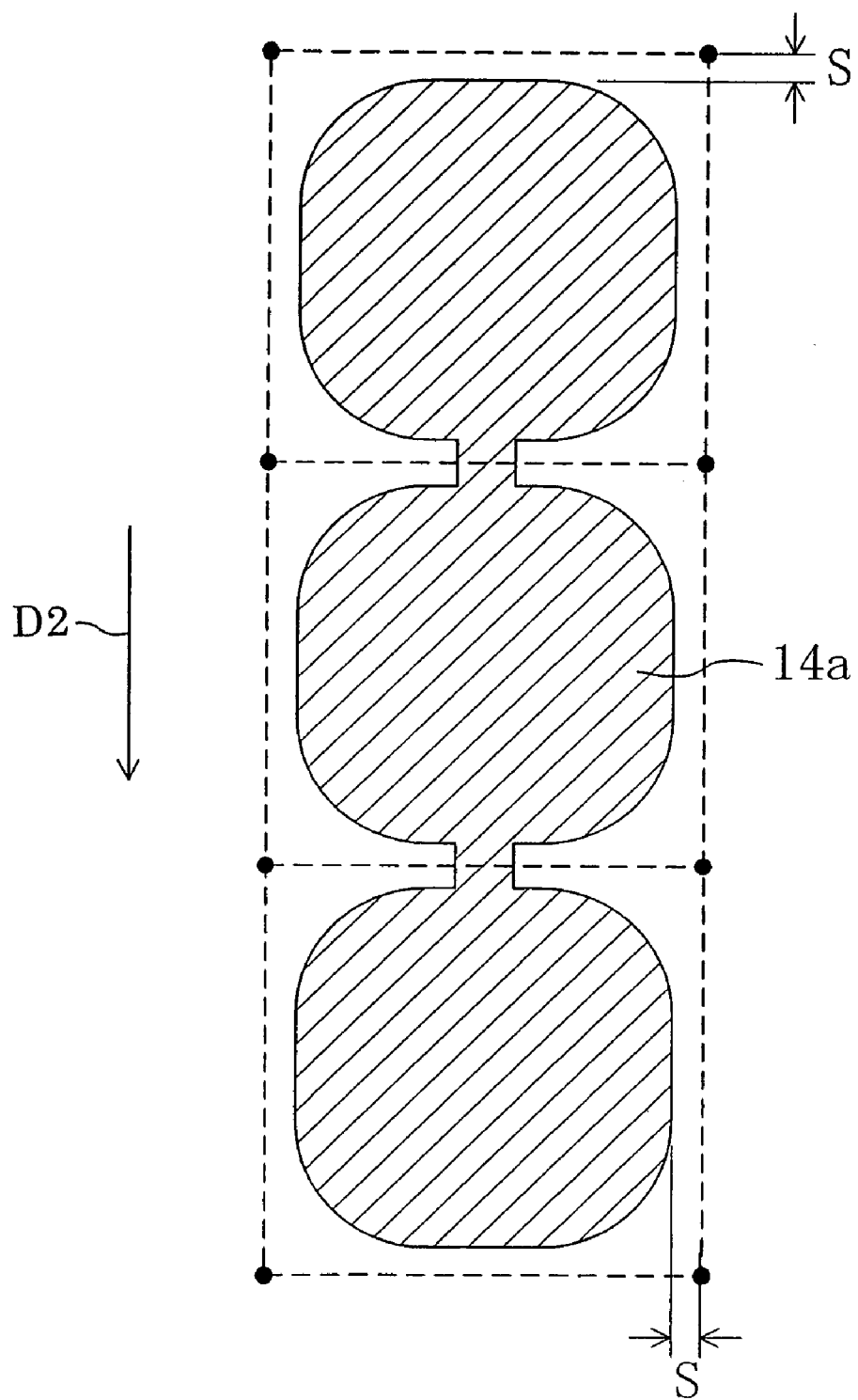

FIG. 12 is a plan view schematically illustrating a picture element electrode used in the liquid crystal display device of the present invention.

Figure 13A:
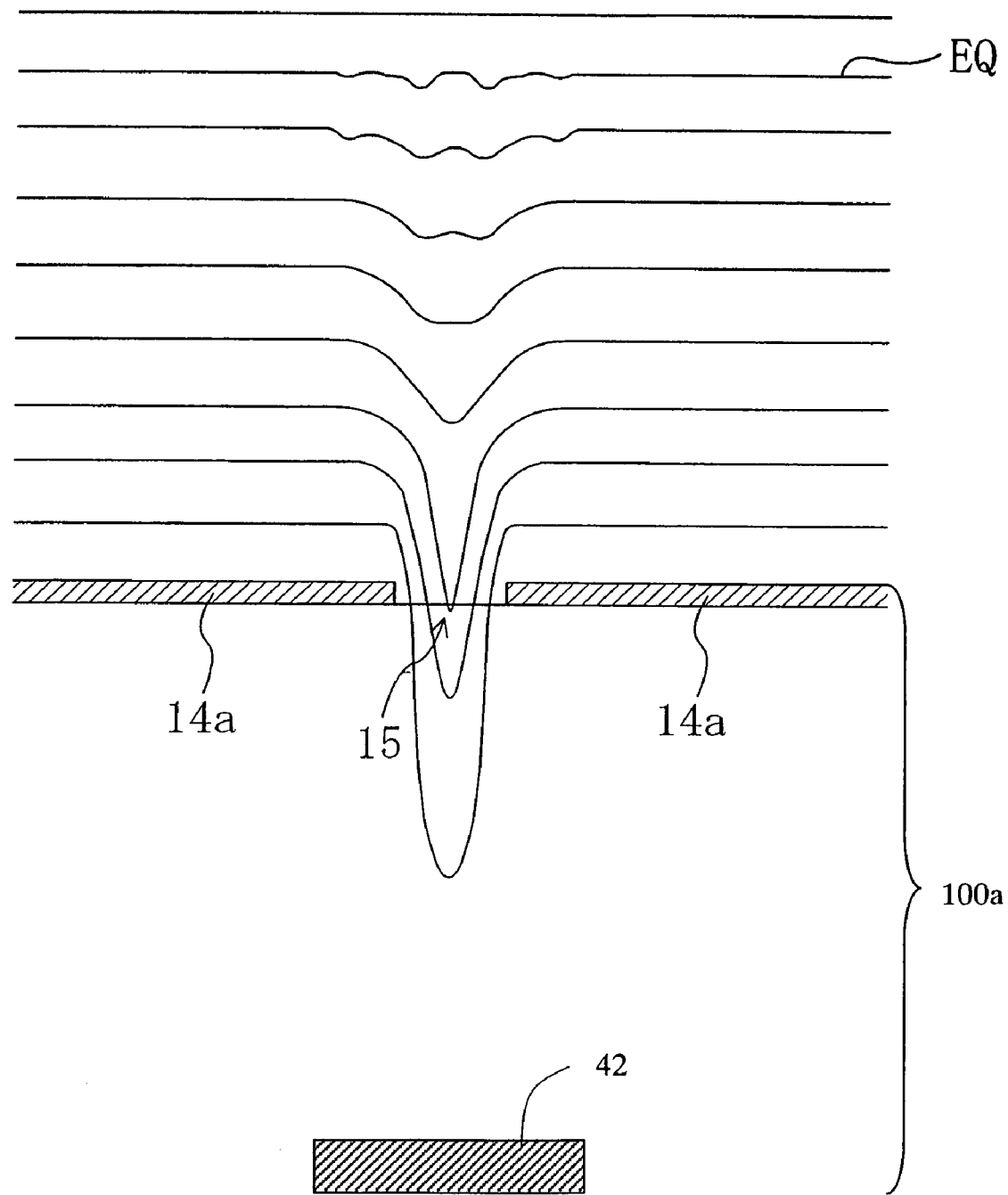

FIG. 13A schematically illustrates equipotential lines EQ produced when voltages of the same polarity are applied to two picture element regions that are adjacent to each other in the row direction.

Figure 13B:
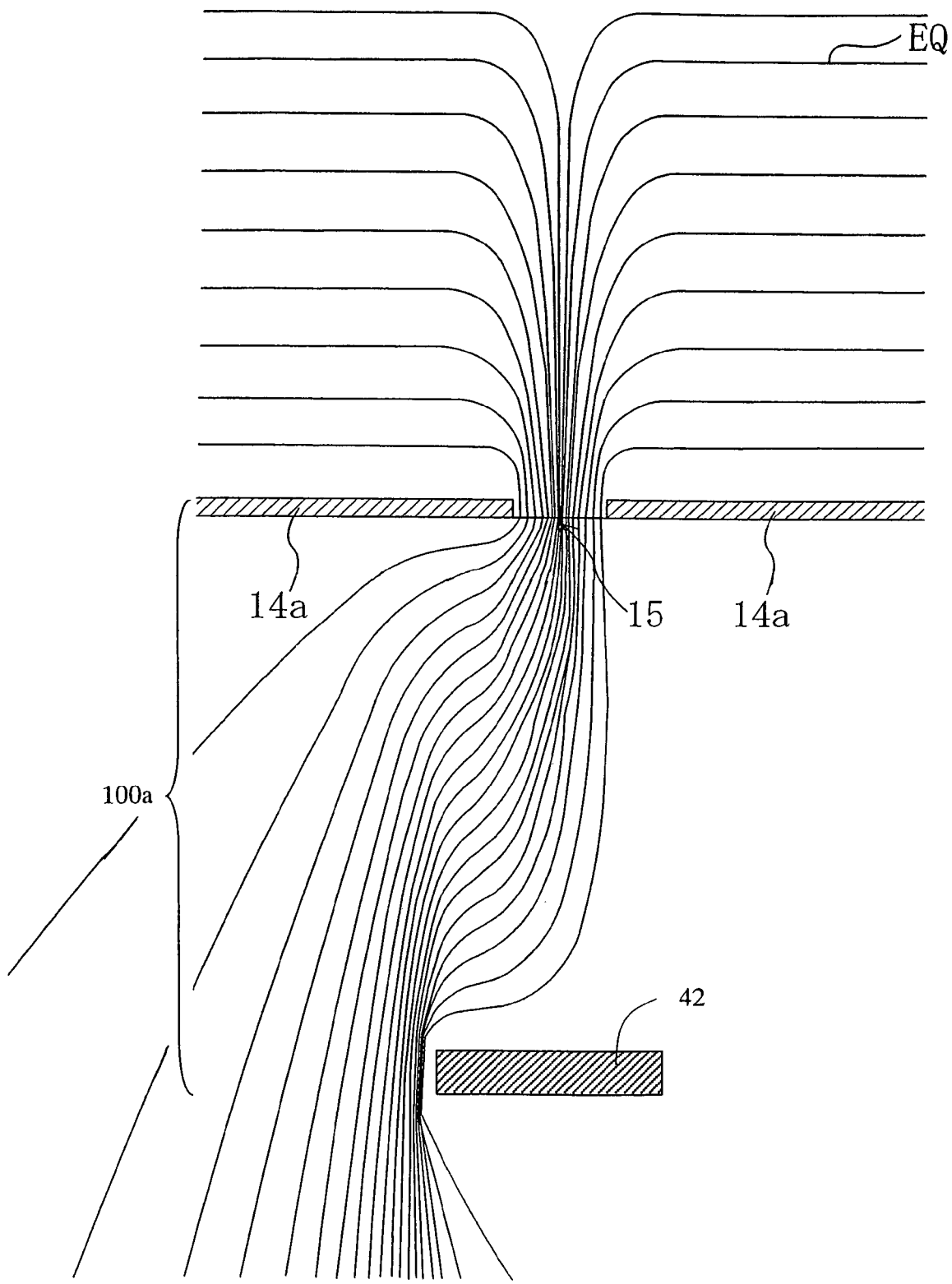

FIG. 13B schematically illustrates equipotential lines EQ produced when voltages of different polarities are applied to two picture element regions that are adjacent to each other in the row direction.

Figure 14A:
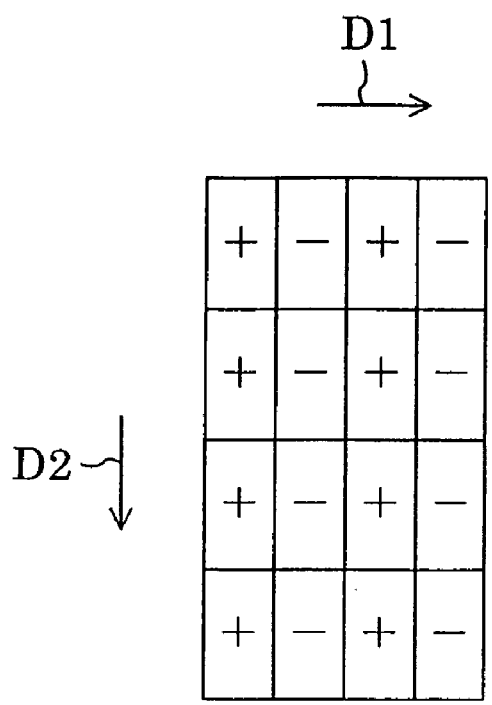
Figure 14B:
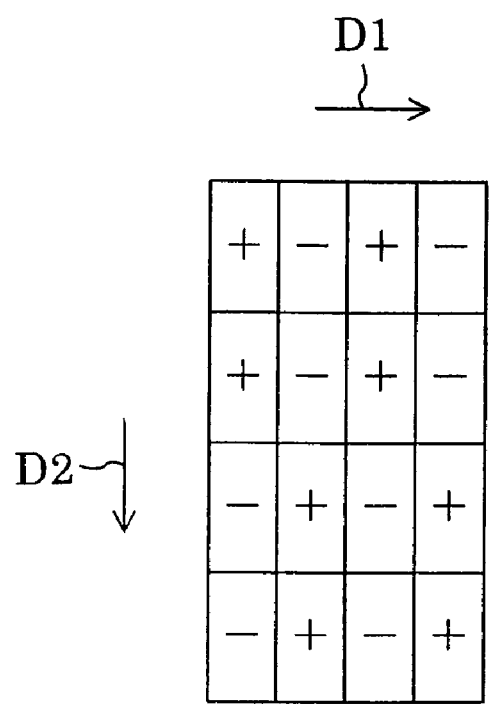
Figure 14C:
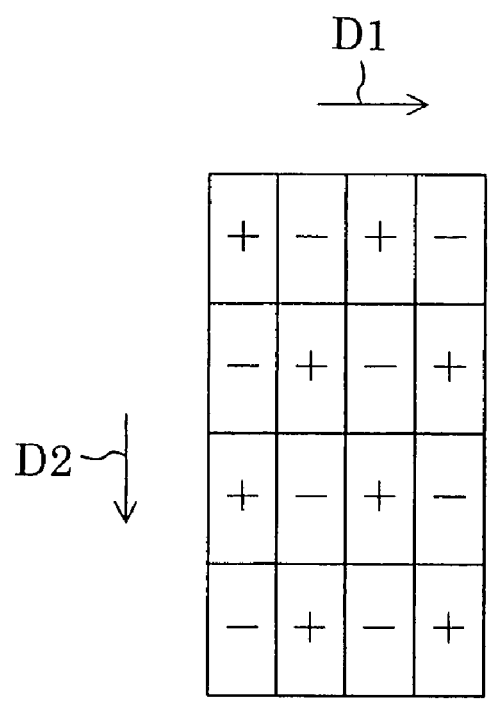

Each of FIG. 14A, FIG. 14B and FIG. 14C illustrates a driving method for use with the liquid crystal display device of the present invention.

Figure 15:
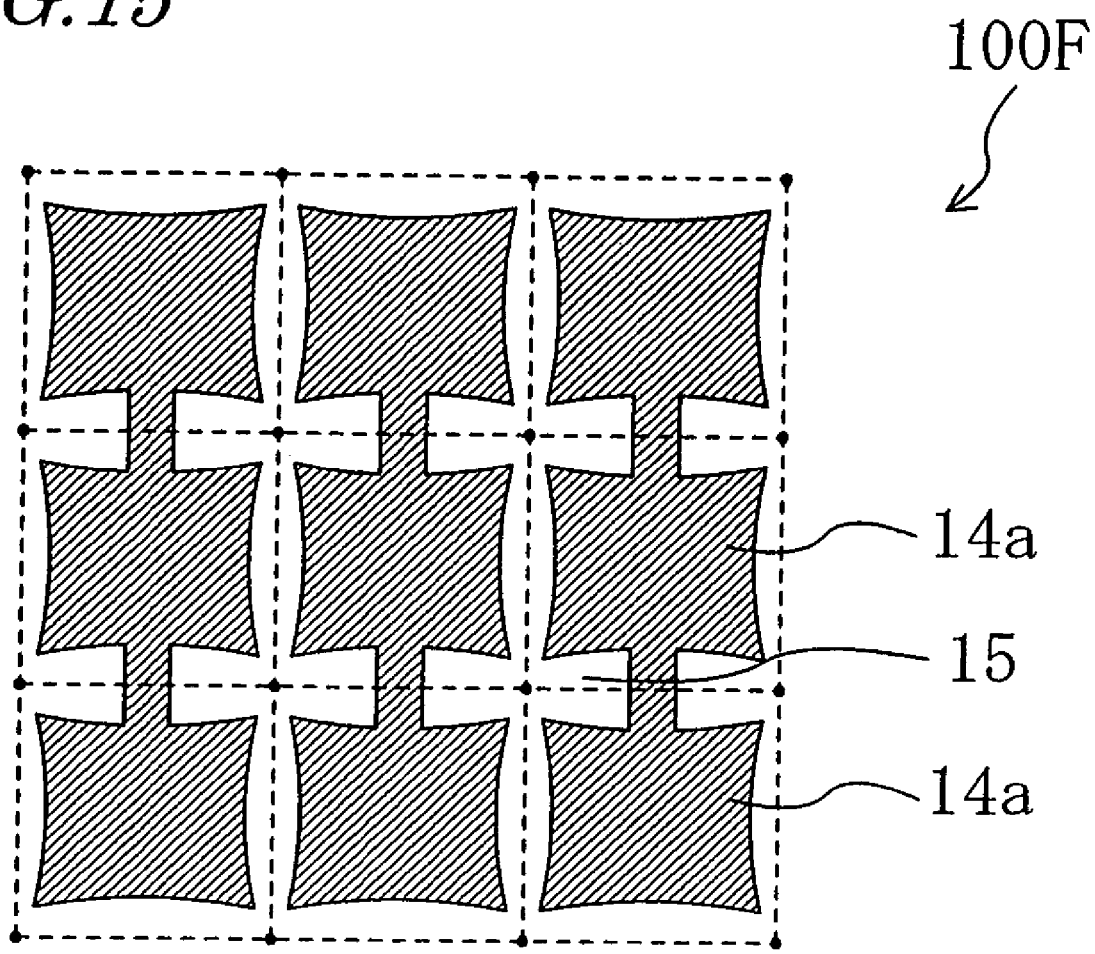

FIG. 15 is a plan view schematically illustrating another liquid crystal display device 100F of the present invention.

Figure 16:
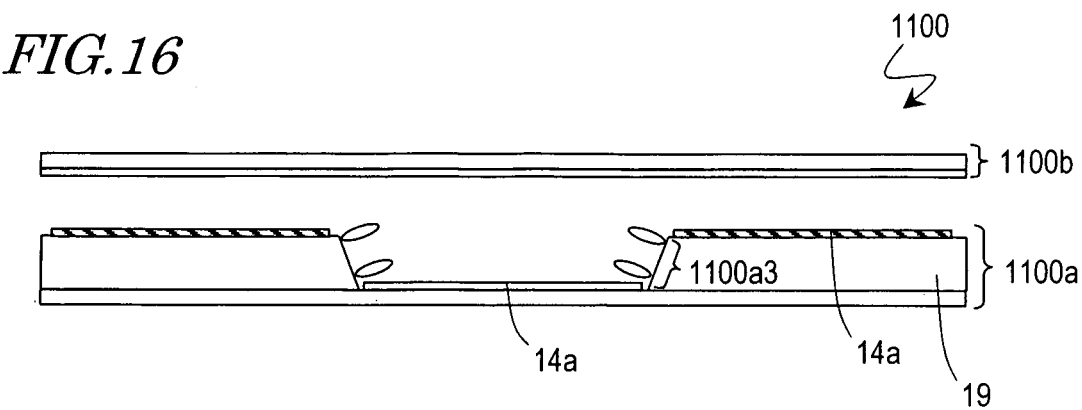

FIG. 16 is a cross-sectional view schematically illustrating a liquid crystal display device 1100 of a comparative example.

Figure 17A:
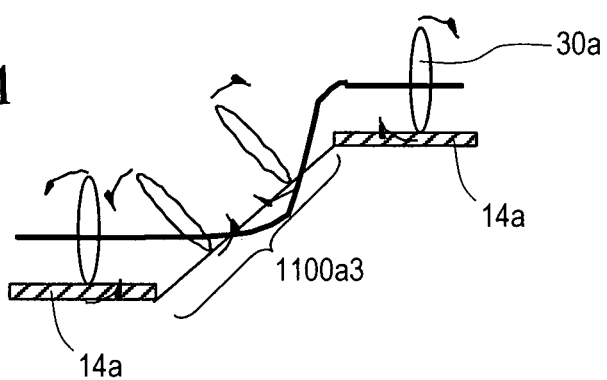
Figure 17B:
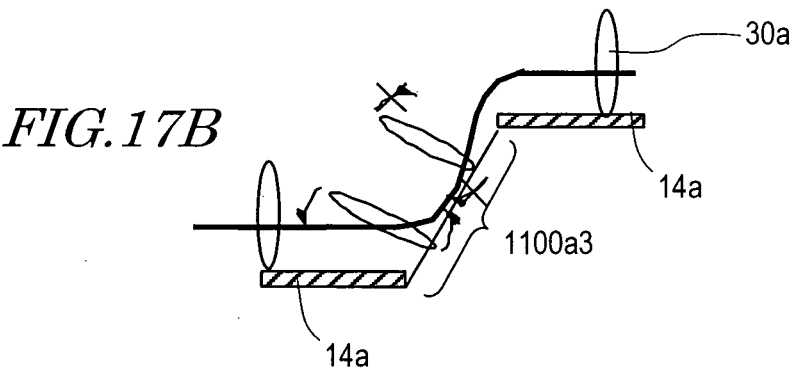

Each of FIG. 17A and FIG. 17B schematically illustrates the relationship between an electric force line and an orientation of a liquid crystal molecule on a side surface of a stepped portion of the liquid crystal display device 1100 of the comparative example.

Figure 18:
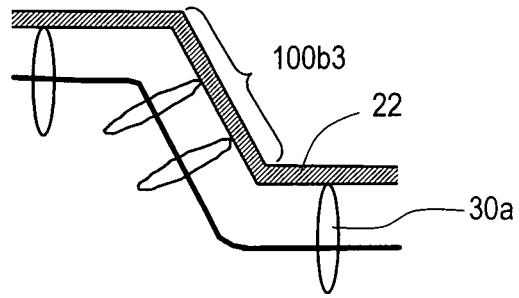

FIG. 18 schematically illustrates the relationship between an electric force line and an orientation of a liquid crystal molecule on a side surface of a stepped portion of the liquid crystal display device 100 of the present invention.

FIG. 19A to FIG. 19E each schematically illustrate a counter substrate 200b including an orientation-regulating structure 28.

Figure 20A:
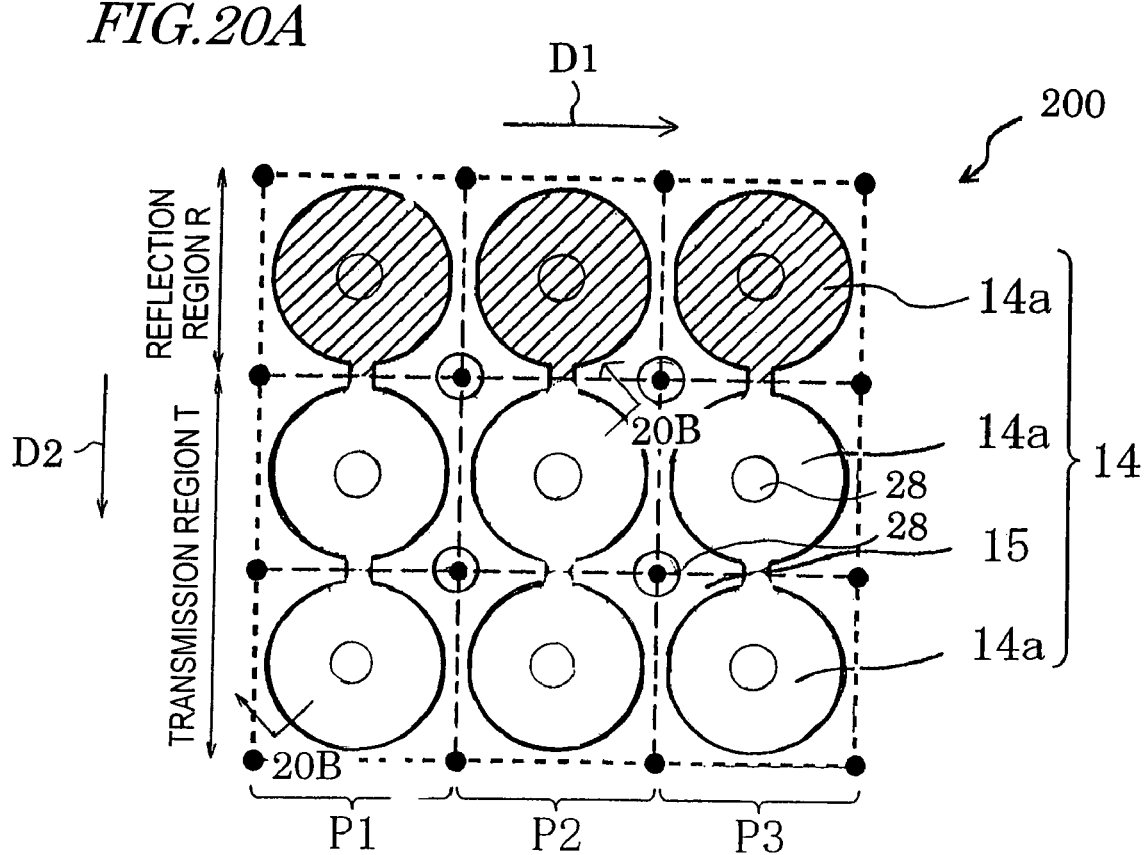
Figure 20B:
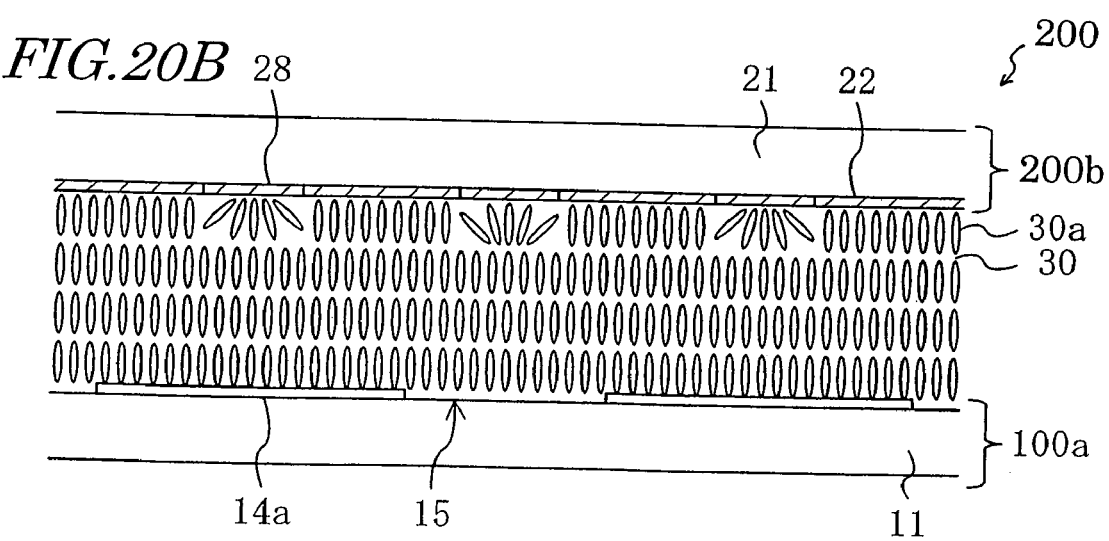

FIG. 20A and FIG. 20B schematically illustrate another liquid crystal display device 200 of the present invention, wherein FIG. 20A is a plan view, and FIG. 20B is a cross-sectional view taken along line 20B-20B' of FIG. 20A.

Figure 21A:
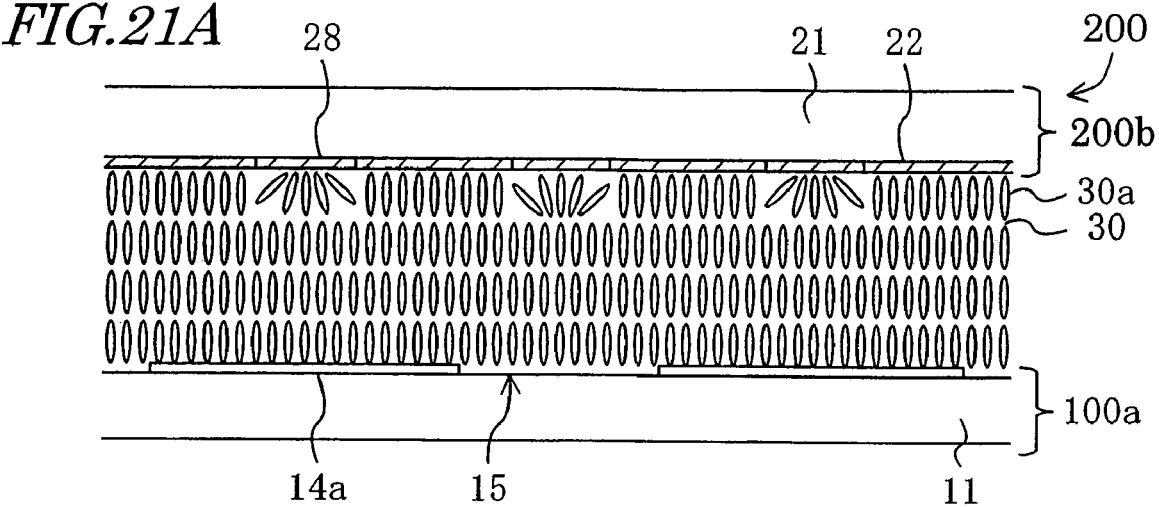
Figure 21B:
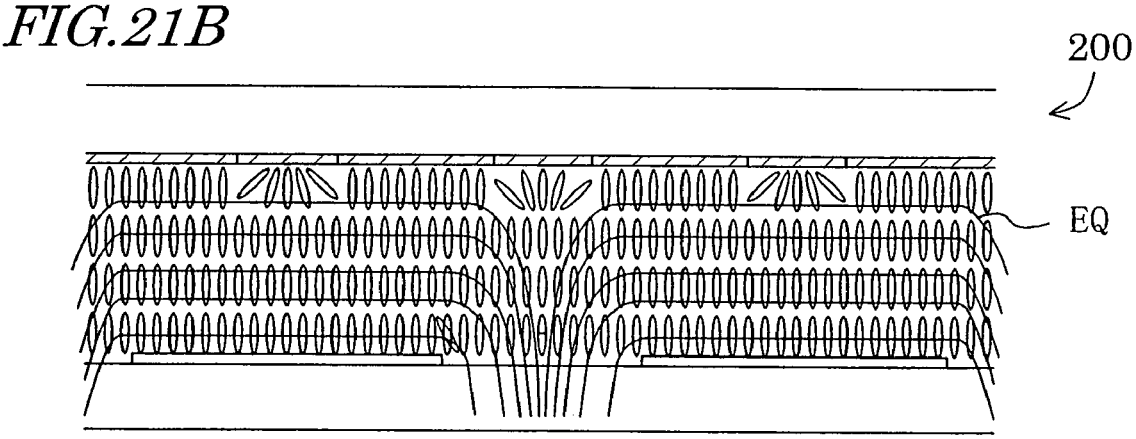
Figure 21C:
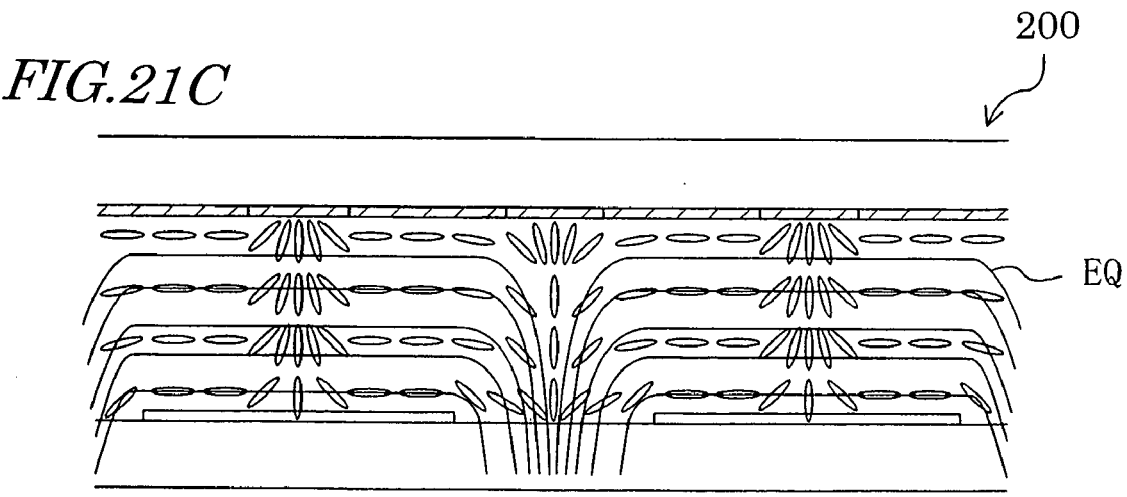

FIG. 21A to FIG. 21C are cross-sectional views schematically illustrating the liquid crystal display device 200, wherein FIG. 21A illustrates a state in the absence of an applied voltage, FIG. 21B illustrates a state where an orientation has just started to change (initial ON state), and FIG. 21C illustrates a steady state.

Figure 22A:
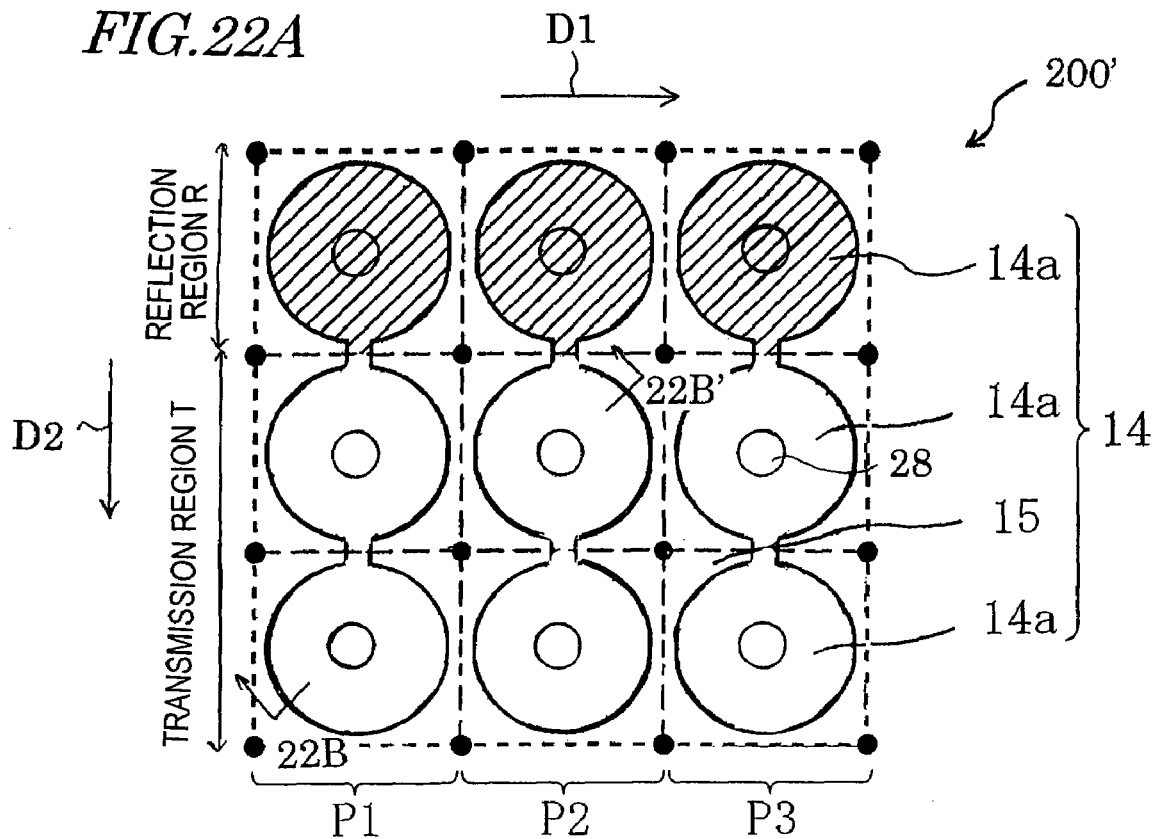
Figure 22B:
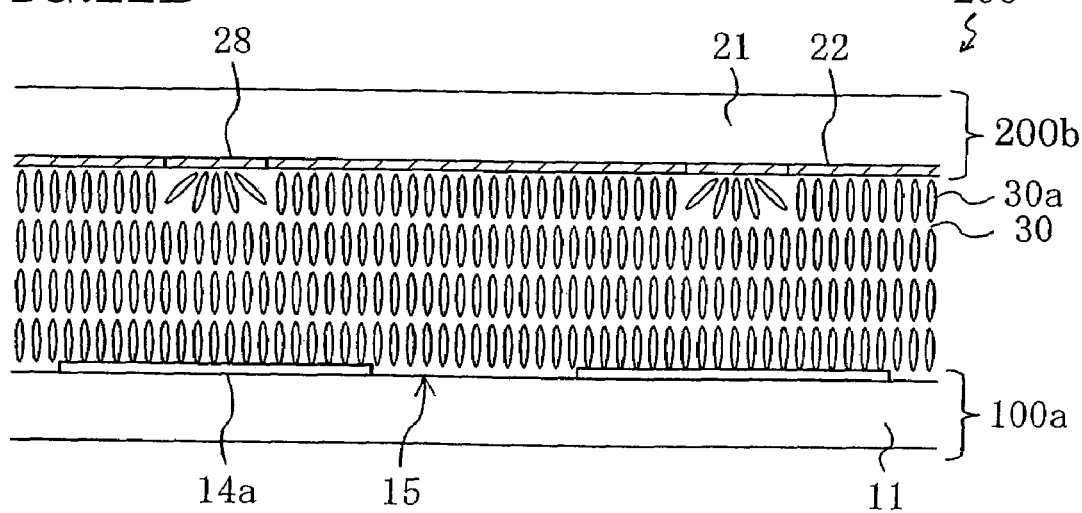

FIG. 22A and FIG. 22B schematically illustrate another liquid crystal display device 200' of the present invention, wherein FIG. 22A is a plan view, and FIG. 22B is a cross-sectional view taken along line 22B-22B' of FIG. 22A.

Figure 23A:
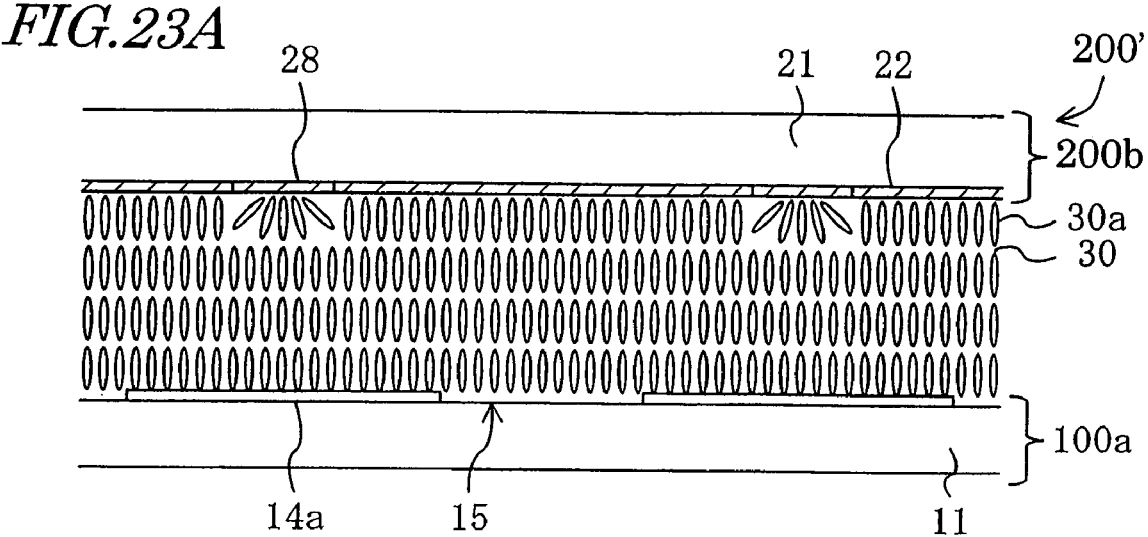
Figure 23B:
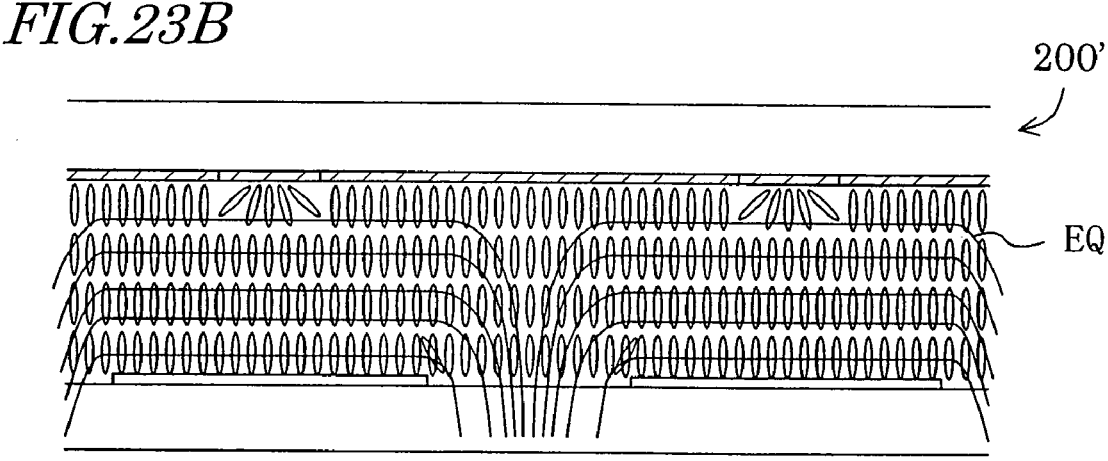
Figure 23C:
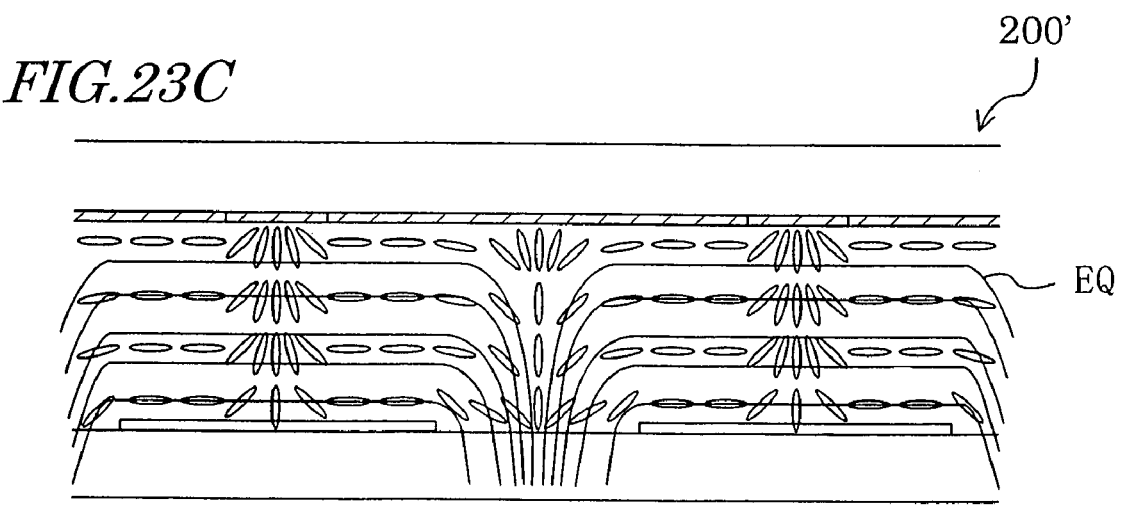

FIG. 23A to FIG. 23C are cross-sectional views schematically illustrating the liquid crystal display device 200', wherein FIG. 23A illustrates a state in the absence of an applied voltage, FIG. 23B illustrates a state where an orientation has just started to change (initial ON state), and FIG. 23C illustrates a steady state.

Figure 24A:
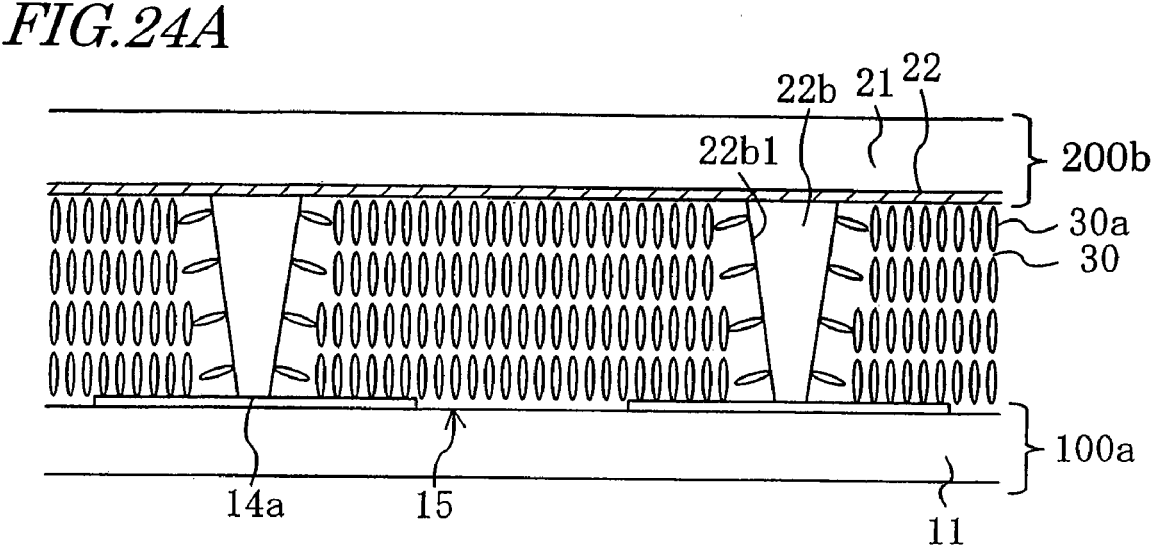
Figure 24B:
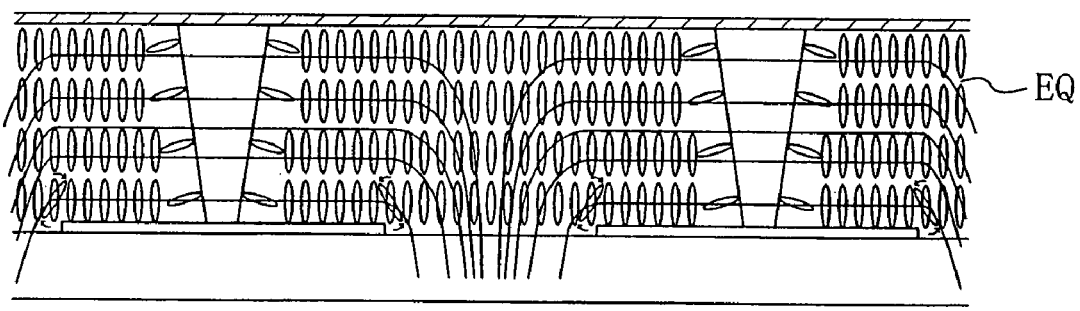
Figure 24C:
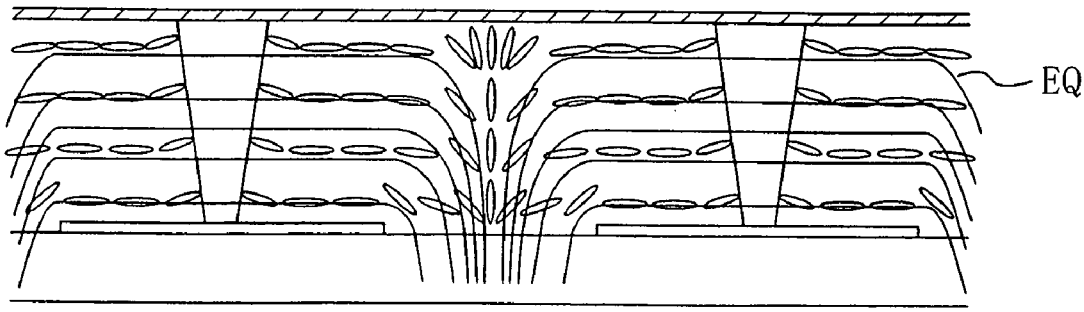

FIG. 24A to FIG. 24C are cross-sectional views schematically illustrating a liquid crystal display device including a protrusion (rib) that functions also as a spacer, wherein FIG. 24A illustrates a state in the absence of an applied voltage, FIG. 24B illustrates a state where an orientation has just started to change (initial ON state), and FIG. 24C illustrates a steady state.

Figure 25:
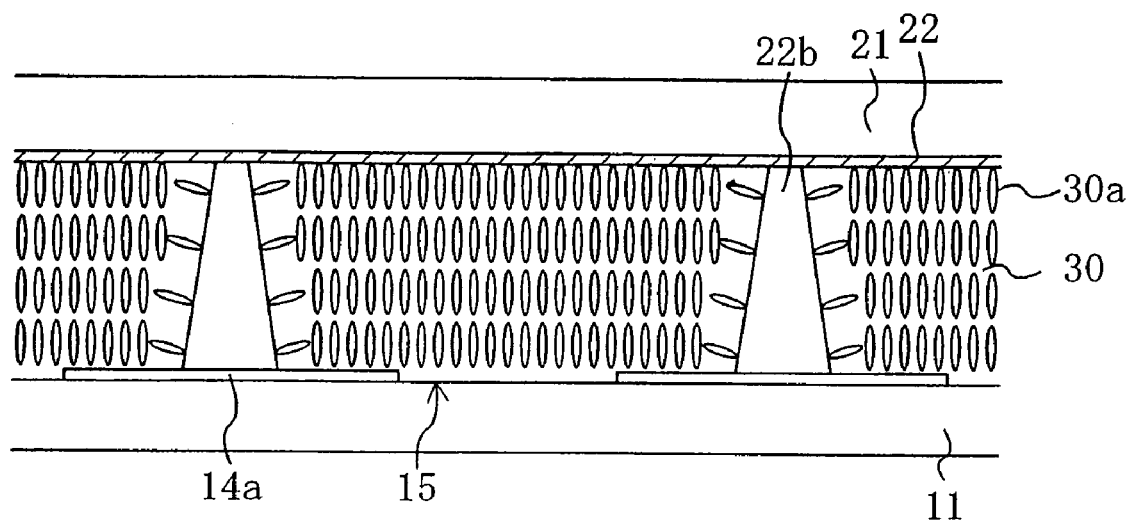

FIG. 25 is a cross-sectional view schematically illustrating a protrusion having a side surface whose inclination angle with respect to the substrate plane substantially exceeds 900.

Figure 26:
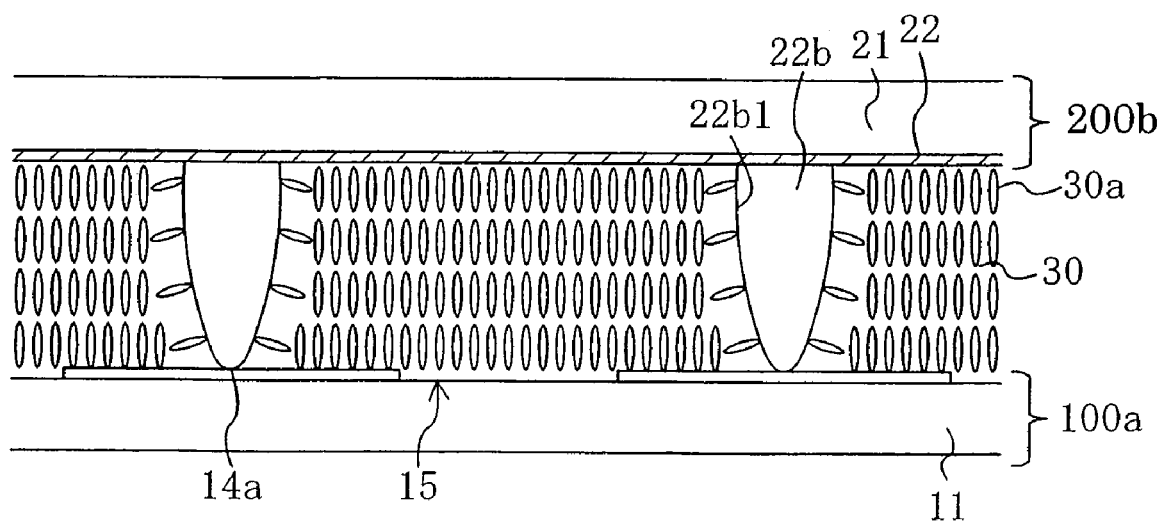

FIG. 26 is a cross-sectional view schematically illustrating a variation of a protrusion that functions also as a spacer.

Figure 27:
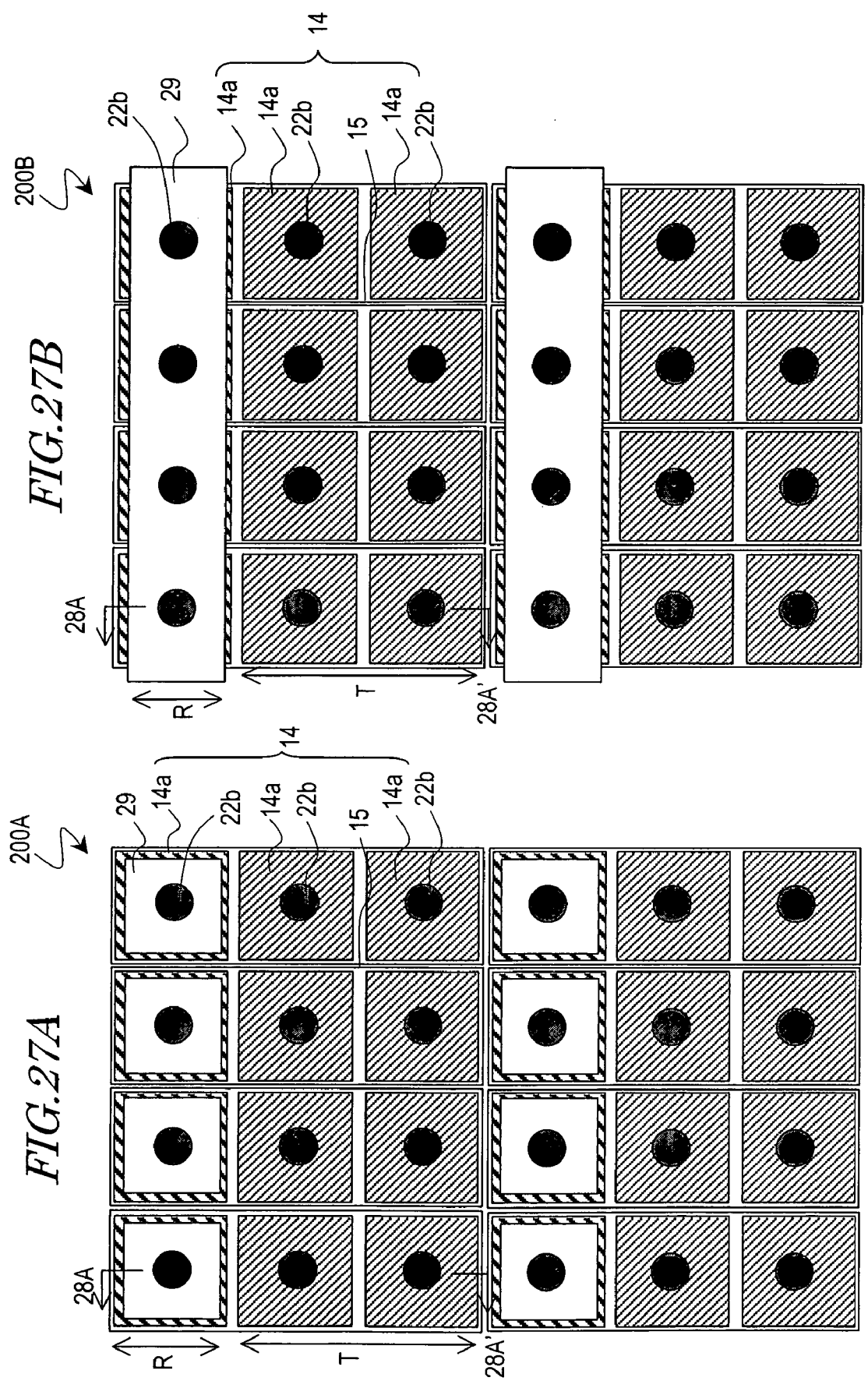

FIG. 27A is a plan view schematically illustrating another liquid crystal display device 200A of the present invention, and FIG. 27B is a plan view schematically illustrating another liquid crystal display device 200B of the present invention.

Figure 28:
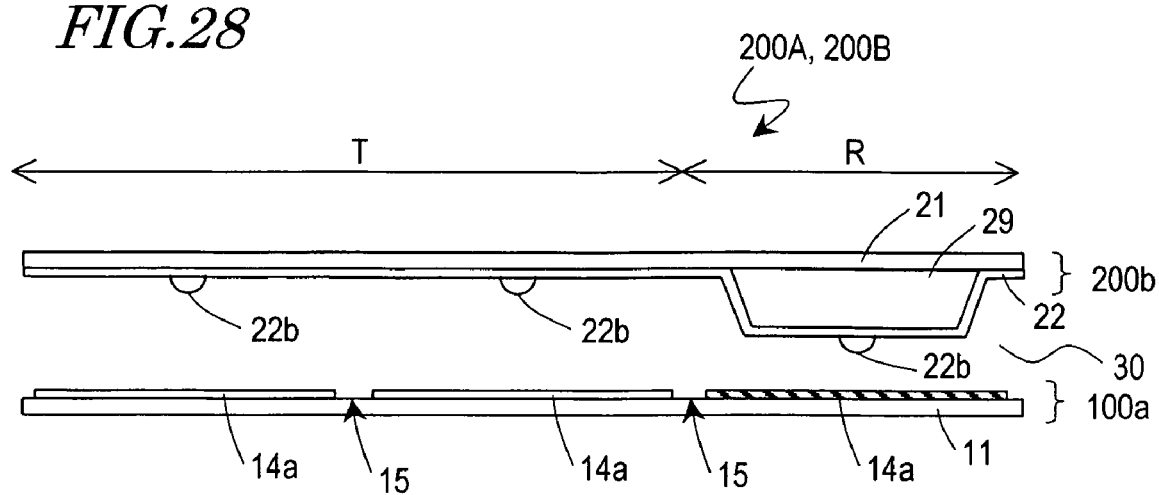

FIG. 28 is a cross-sectional view schematically illustrating the liquid crystal display devices 200A and 200B, taken along line 28-28' of FIG. 27A and FIG. 27B.

Figure 29B:
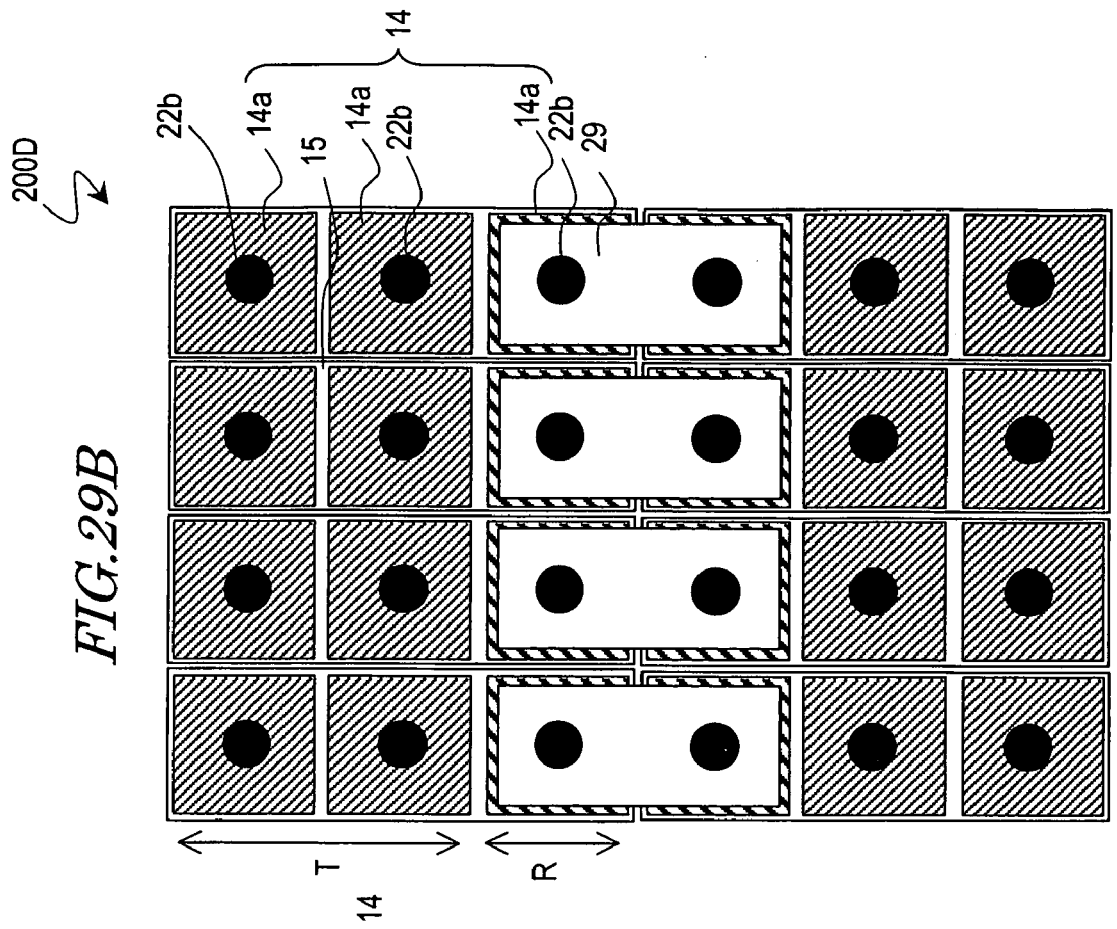
Figure 29A:
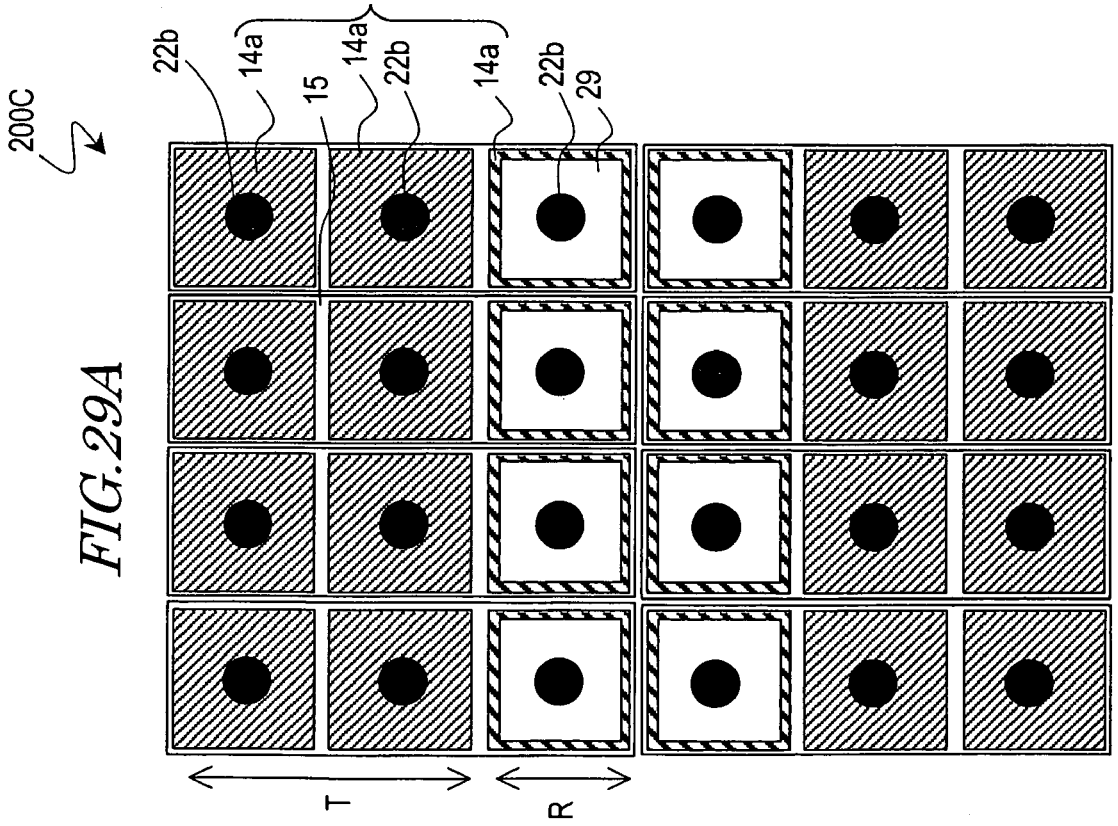

FIG. 29A is a plan view schematically illustrating another liquid crystal display device 200C of the present invention, and FIG. 29B is a plan view schematically illustrating another liquid crystal display device 200D of the present invention.

Figure 30B:
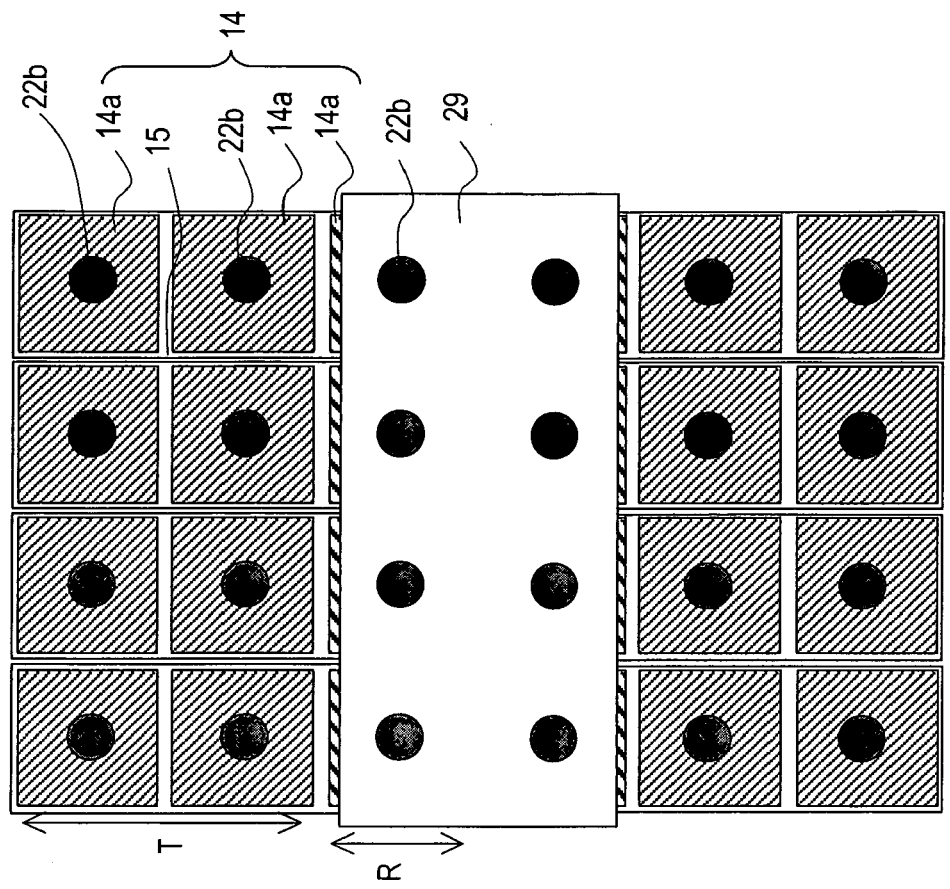
Figure 30A:
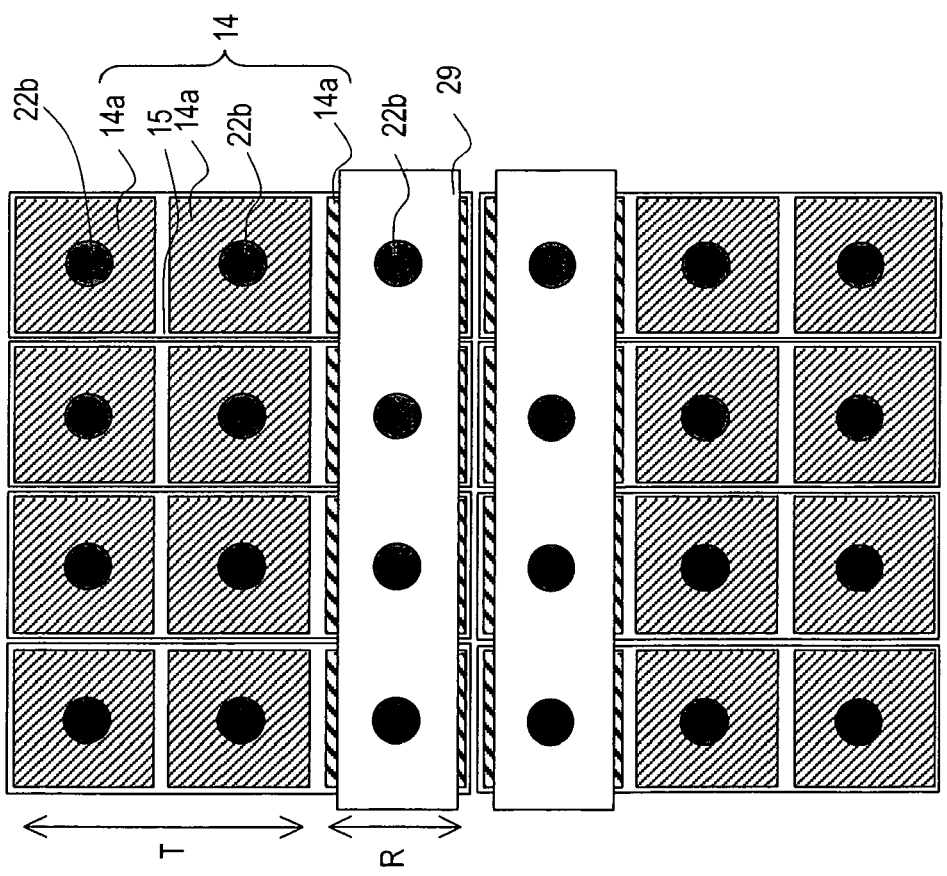

FIG. 30A is a plan view schematically illustrating another liquid crystal display device 200E of the present invention, and FIG. 30B is a plan view schematically illustrating another liquid crystal display device 200F of the present invention.

FIG. 31A is a plan view schematically illustrating another liquid crystal display device 200G of the present invention, and FIG. 31B is a plan view schematically illustrating another liquid crystal display device 200H of the present invention.

Figure 32A:
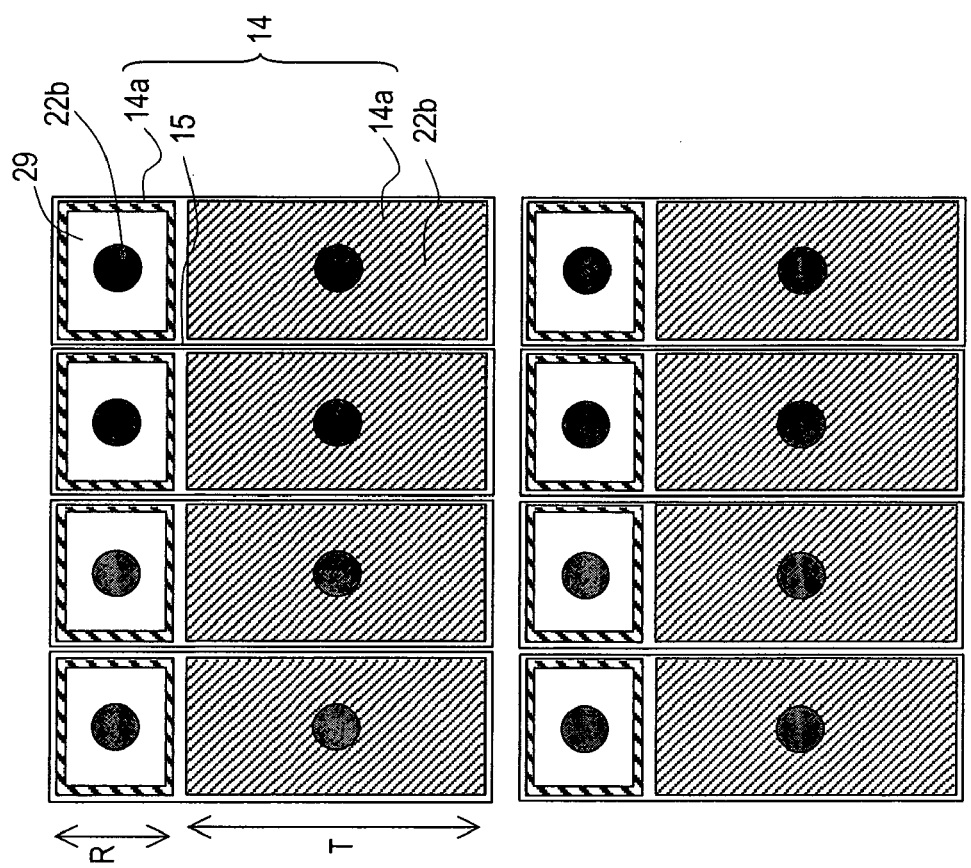
Figure 32B:
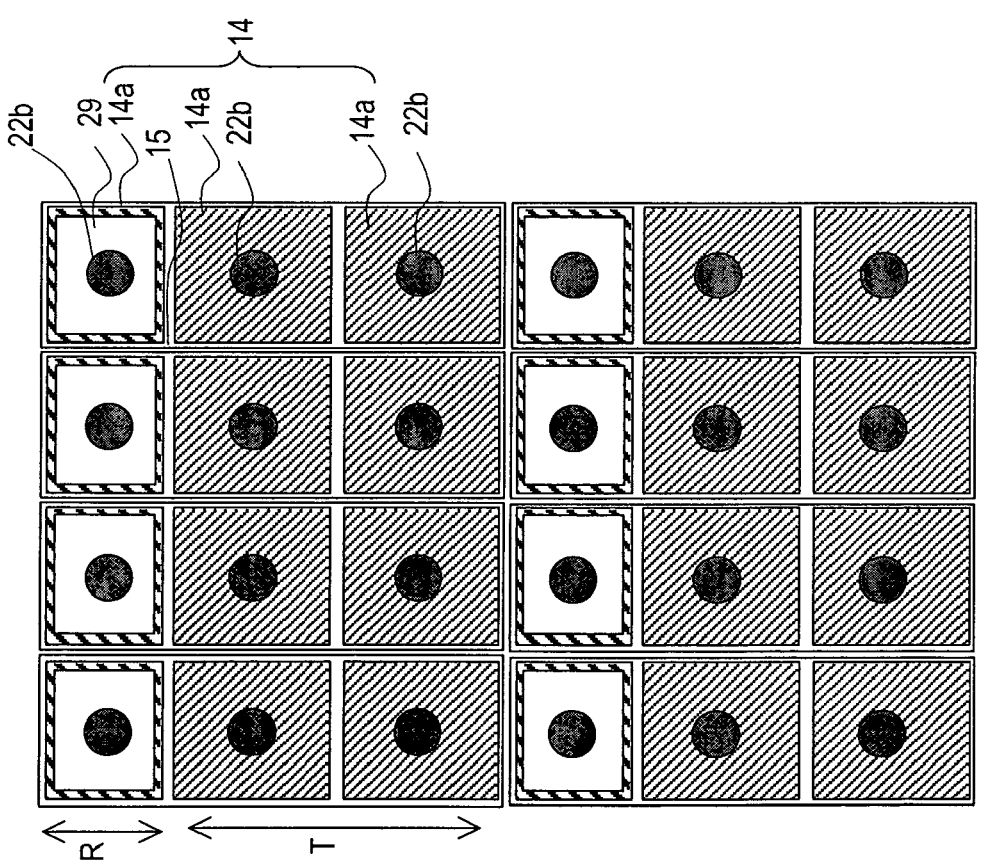

FIG. 32A is a plan view schematically illustrating another liquid crystal display device 200I of the present invention, and FIG. 32B is a plan view schematically illustrating another liquid crystal display device 200J of the present invention.

Figure 33A:
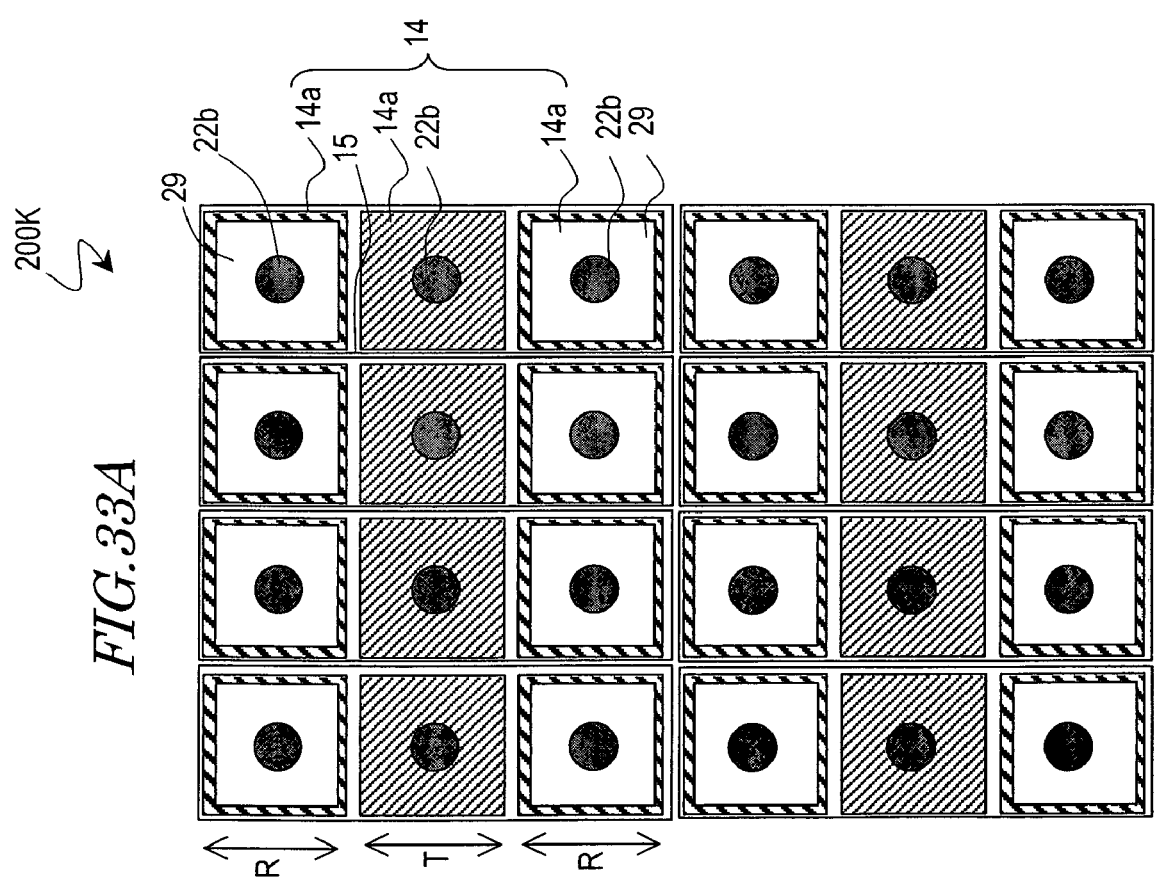
Figure 33B:
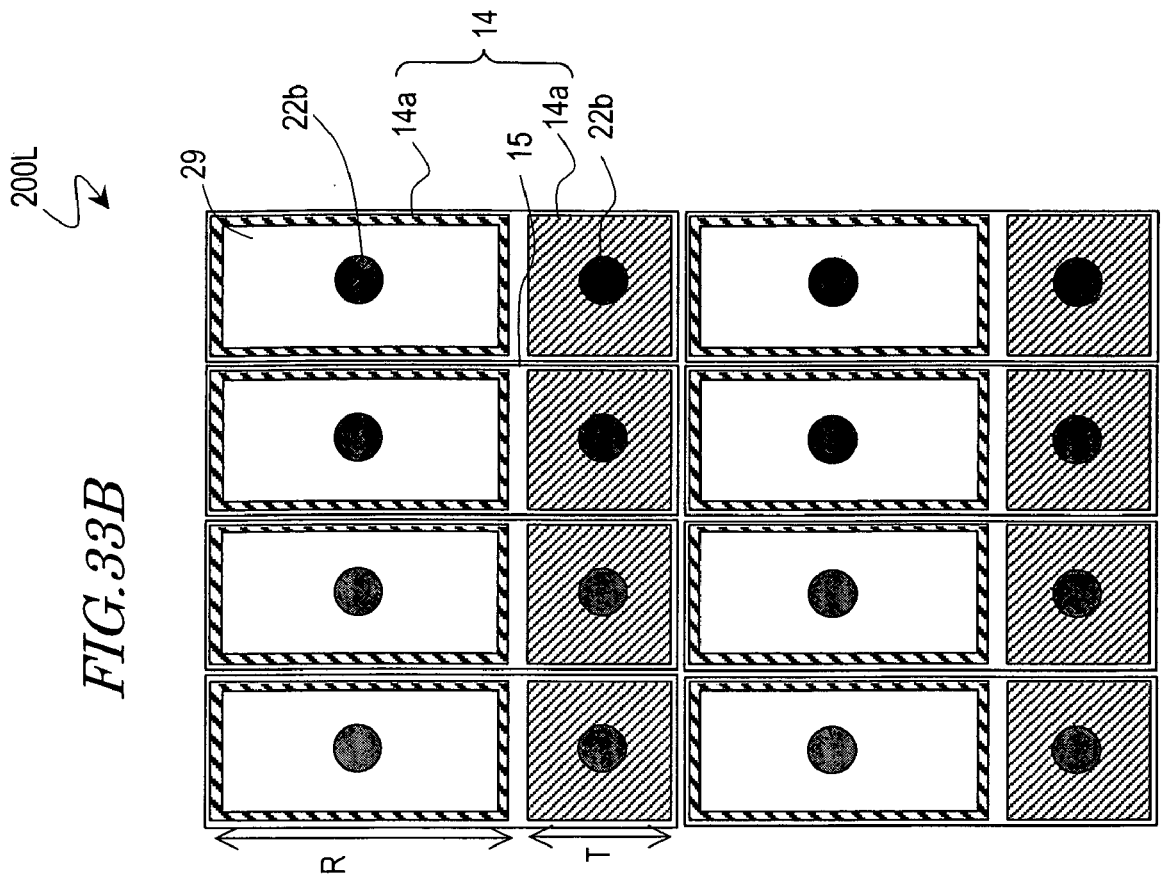

FIG. 33A is a plan view schematically illustrating another liquid crystal display device 200K of the present invention, and FIG. 33B is a plan view schematically illustrating another liquid crystal display device 200L of the present invention.

Figure 34B:
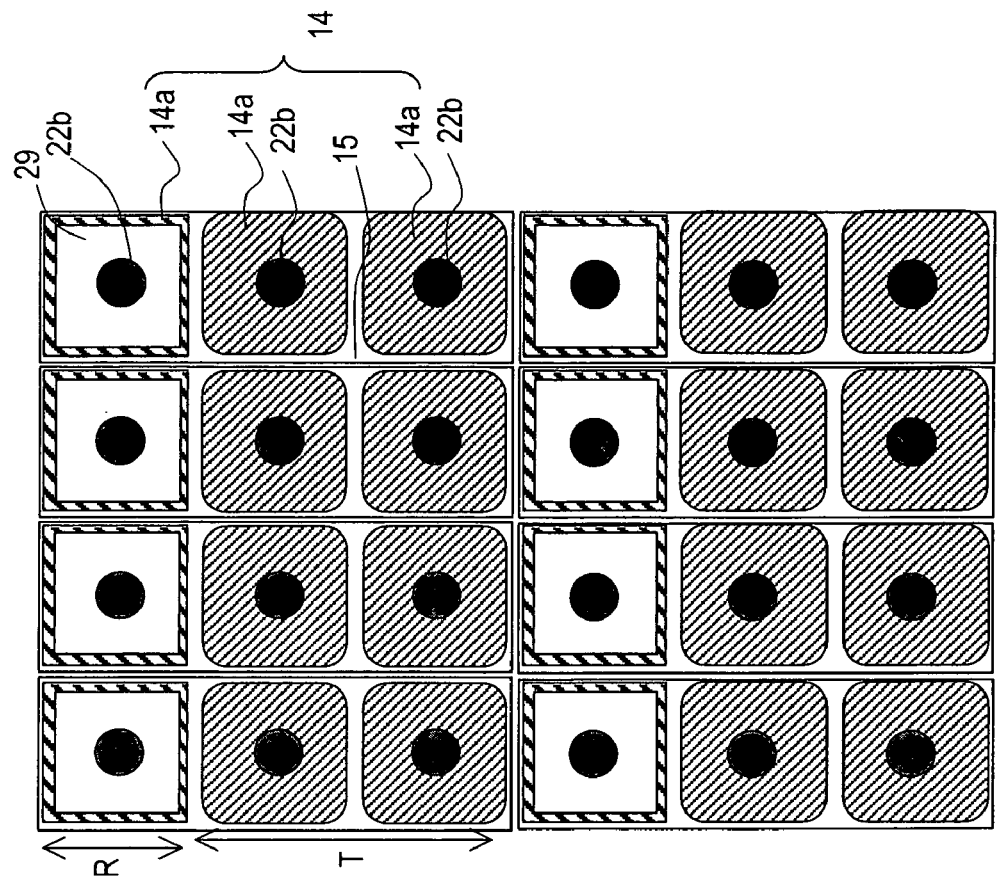
Figure 34A:
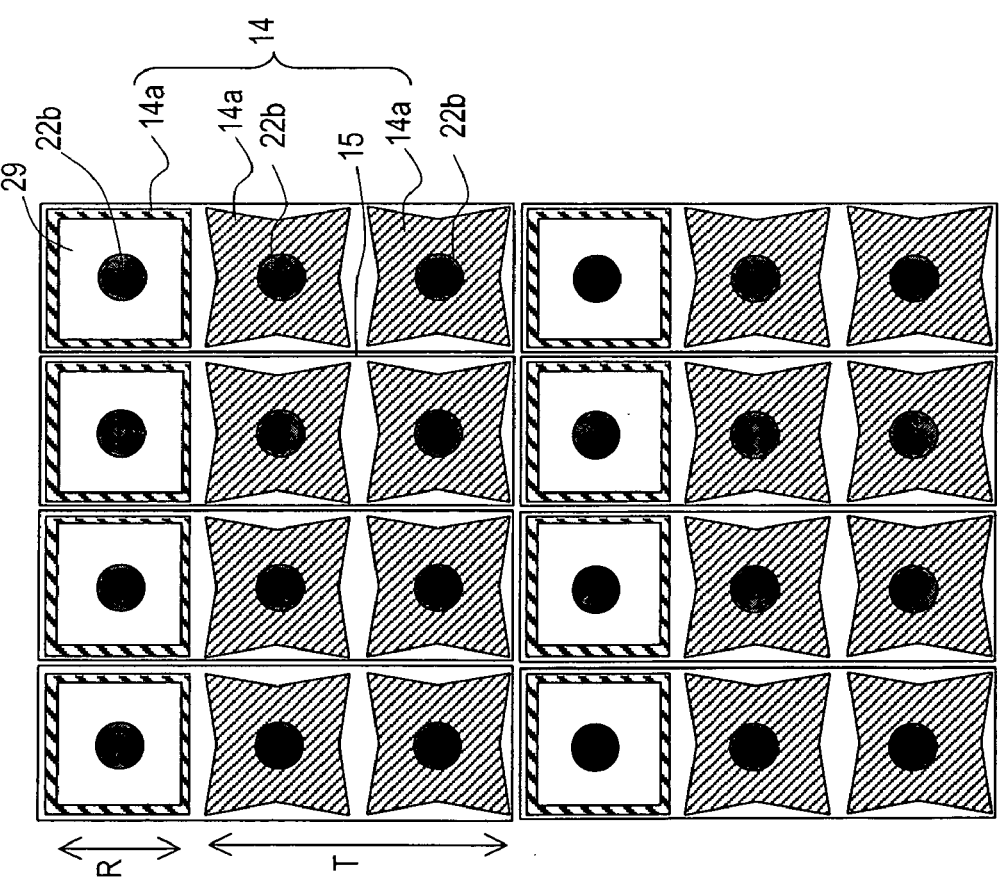

FIG. 34A is a plan view schematically illustrating another liquid crystal display device 200M of the present invention, and FIG. 34B is a plan view schematically illustrating another liquid crystal display device 200N of the present invention.

Figure 35A:
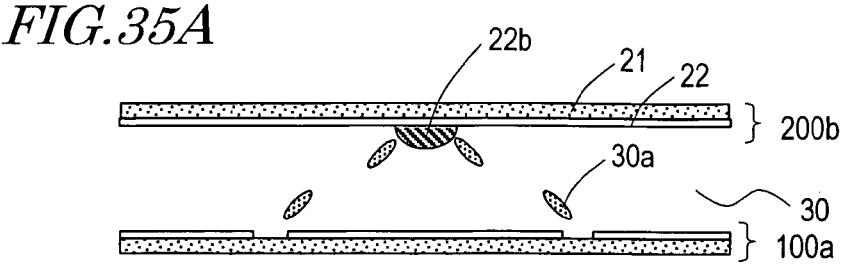
Figure 35B:
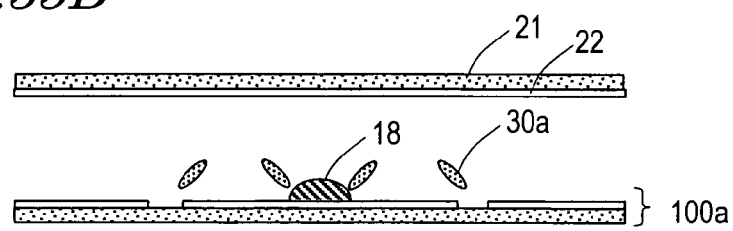

FIG. 35A is a cross-sectional view schematically illustrating an orientation of liquid crystal molecules where a protrusion is provided on a counter substrate, and FIG. 35B is a cross-sectional view schematically illustrating an orientation of liquid crystal molecules where a protrusion is provided on a TFT substrate.

Figure 36:
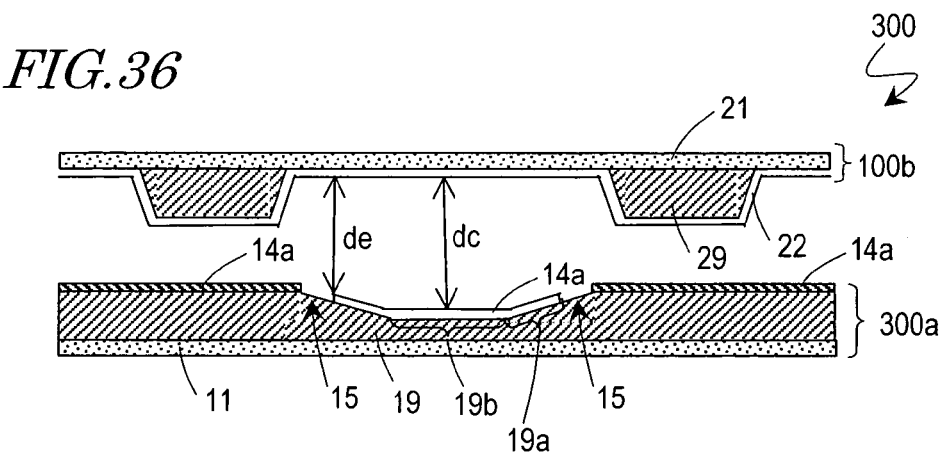

FIG. 36 is a cross-sectional view schematically illustrating a structure of another liquid crystal display device 300 of the present invention.

Figure 37:
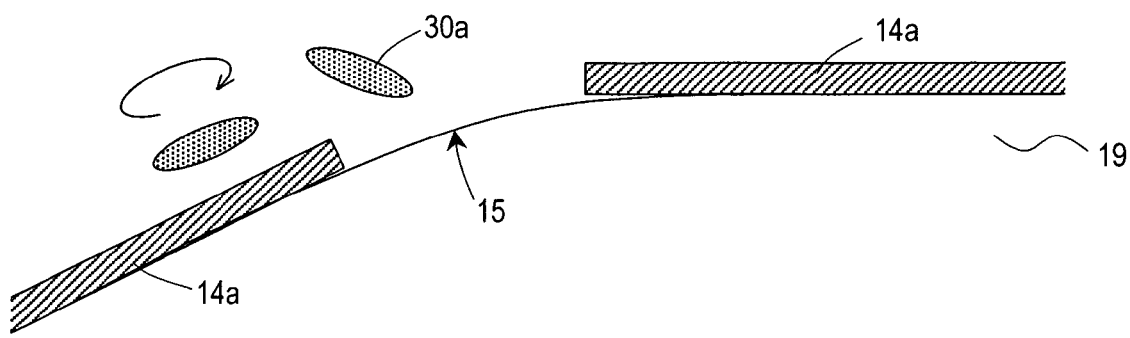

FIG. 37 is an enlarged cross-sectional view illustrating a portion of the liquid crystal display device 300 near an edge portion of a sub-electrode thereof.

DESCRIPTION OF THE PREFERRED EMBODIMENTS

Embodiments of the present invention will now be described with reference to the drawings. The liquid crystal display device of the present invention has desirable display characteristics and thus can be suitably used as an active matrix type liquid crystal display device. An embodiment of the present invention will now be described with respect to an active matrix type liquid crystal display device using thin film transistors (TFTs). The present invention is not limited thereto, but may alternatively be used with an active matrix type liquid crystal display device using an MIM structure.

Note that in the present specification, a region of a liquid crystal display device corresponding to a "picture element", which is the minimum unit of display, will be referred to as a "picture element region". In a color liquid crystal display device, a plurality of "picture elements" including R, G and B "picture elements" correspond to one "pixel". In an active matrix type liquid crystal display device, a picture element region is defined by a picture element electrode and a counter electrode opposing the picture element electrode. In a passive matrix type liquid crystal display device, a picture element region is defined as a region where one of column electrodes arranged in a stripe pattern crosses one of row electrodes also arranged in a stripe pattern perpendicular to the column electrodes. In an arrangement with a black matrix, strictly speaking, a picture element region is a portion of each region across which a voltage is applied according to the intended display state that corresponds to an opening of the black matrix.

Embodiment 1

Figure 1A:
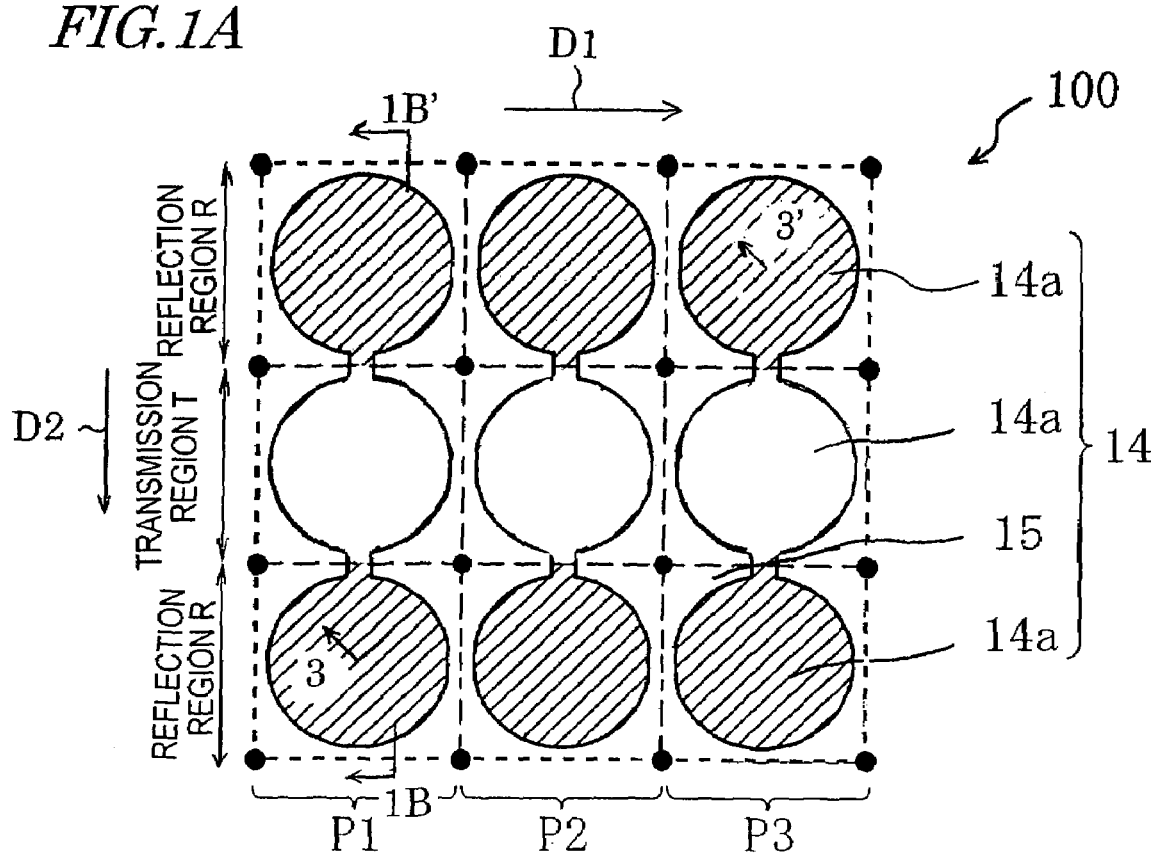
Figure 1B:
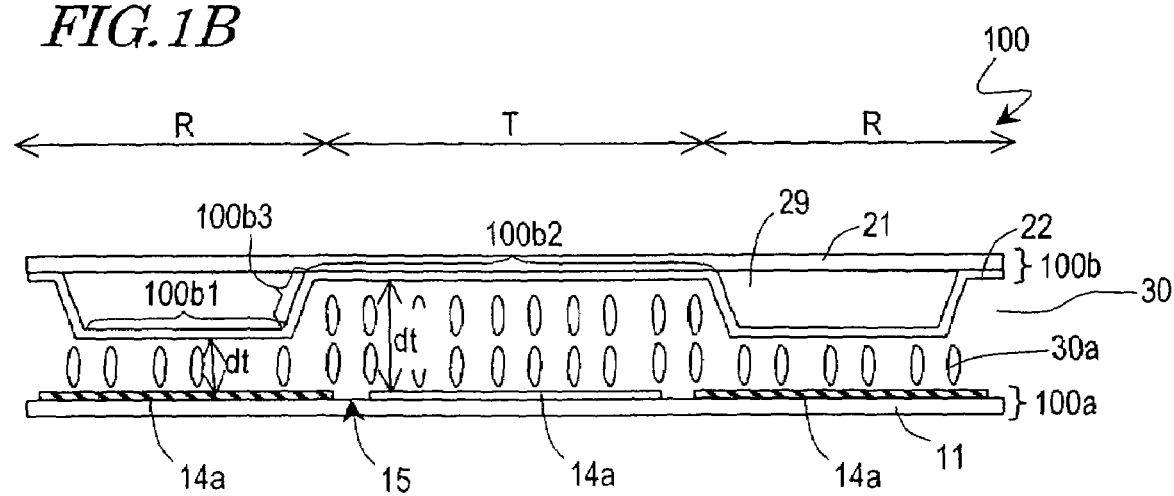

The structure of a liquid crystal display device 100 according to the present embodiment will now be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view illustrating three picture element regions P1, P2 and P3 of the liquid crystal display device 100 as viewed in the substrate normal direction, and FIG. 1B is a cross-sectional view taken along line 1B-1B' of FIG. 1A. FIG. 1B illustrates a state where no voltage is applied across a liquid crystal layer.

The liquid crystal display device 100 includes an active matrix substrate (hereinafter referred to as a "TFT substrate") 100a, a counter substrate (referred to also as a "color filter substrate") 100b, and a liquid crystal layer 30 provided between the TFT substrate 100a and the counter substrate 100b. Liquid crystal molecules 30a of the liquid crystal layer 30 have a negative dielectric anisotropy, and are aligned vertical to the surface of a vertical alignment film (not shown), as illustrated in FIG. 1B, in the absence of an applied voltage across the liquid crystal layer 30 by virtue of the vertical alignment film, as a vertical alignment layer provided on one surface of each of the TFT substrate 100a and the counter substrate 100b that is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film.

The TFT substrate 100a of the liquid crystal display device 100 includes a transparent substrate (e.g., a glass substrate) 11 and a picture element electrode 14 provided on the surface of the transparent substrate 11. The counter substrate 100b includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22, which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

A plurality of picture element regions are arranged periodically in a row direction D1 and a column direction D2 perpendicular to the row direction D1 (i.e., they are arranged in a matrix pattern). FIG. 1A illustrates the three picture element regions P1, P2 and P3 adjacent to one another in the row direction D1. The row direction D1 and the column direction D2 will be referred to as "periodic arrangement directions" of picture elements (picture element regions). Typically, the row direction D1 and the column direction D2 are perpendicular to each other. Moreover, in the present embodiment, each picture element region (picture element) has a generally oblong rectangular shape with a long side and a short side. Therefore, the picture element regions are arranged at different pitches (referred to as "picture element pitches") in the row direction D1 and in the column direction D2.

Each picture element region includes a transmission region T where an image is displayed in a transmission mode using light coming from the side of the TFT substrate 100a (typically, light from the backlight) and a reflection region R where an image is displayed in a reflection mode using light coming from the side of the counter substrate 100b (typically ambient light). In the present embodiment, the picture element electrode 14 includes a transparent electrode made of a transparent conductive material and a reflection electrode made of a light-reflecting conductive material. The transmission region T is defined by the transparent electrode, and the reflection region R is defined by the reflection electrode. Note that if the surface of the reflection electrode is provided with minute irregularities, light can be scattered by the reflection electrode, and it is thereby possible to realize a white display that is close to paper white.

While light used for displaying an image passes through the liquid crystal layer 30 only once in the transmission mode, it passes through the liquid crystal layer 30 twice in the reflection mode. By setting a thickness dr of the liquid crystal layer 30 in the reflection region R to be smaller than a thickness dt of the liquid crystal layer 30 in the transmission region T, as illustrated in FIG. 1B, the retardation given by the liquid crystal layer 30 to light used in the reflection mode can be made close to the retardation given by the liquid crystal layer 30 to light used in the transmission mode. By setting the thickness dr of the liquid crystal layer 30 in the reflection region R to be about ½ the thickness dt of the liquid crystal layer 30 in the transmission region T the retardations given by the liquid crystal layer 30 to light in these display modes can be made substantially equal to each other.

In the present embodiment, the counter substrate 100b has a stepped portion including an upper tier (an upper level surface) 100b1 located in the reflection region R, a lower tier (a lower level surface) 100b2 located in the transmission region T, and a side surface 100b3 connecting the upper tier 100b1 and the lower tier 100b2 to each other, whereby the thickness dr of the liquid crystal layer 30 in the reflection region R is smaller than the thickness dt of the liquid crystal layer 30 in the transmission region T. Specifically, the stepped portion of the counter substrate 100b is formed by providing a transparent dielectric layer 29 selectively in the reflection region R of the counter substrate 100b. The side surface 100b3 of the stepped portion is located in the reflection region R, and is covered by the counter electrode 22.

Next, the structure and the function of the picture element electrode 14 provided in the liquid crystal display device 100 of the present invention will be described.

As illustrated in FIG. 1A and FIG. 1B, the picture element electrode 14 includes a plurality of sub-electrodes 14a arranged in a line in the column direction D2. Typically, the plurality of sub-electrodes 14a are electrically connected together in each picture element region. In the present embodiment, each picture element electrode includes three sub-electrodes 14a, i.e., one transparent electrode and two reflection electrodes.

Moreover, the TFT substrate 100a includes a plurality of electrodeless regions 15 where the picture element electrode 14 made of a conductive film (e.g., an ITO film) is not provided (i.e., the electrodeless regions 15 do not overlap with any picture element electrodes 14). The electrodeless regions 15 have substantially the same shape and substantially the same size, and are arranged so that the respective centers thereof form a square lattice. Each sub-electrode 14a of the picture element electrode 14 is substantially surrounded by four electrodeless regions 15 whose respective centers are located at the four lattice points that form one unit lattice, and the sub-electrodes 14a have substantially the same shape and substantially the same size. In the illustrated example, the sub-electrode 14a has a generally circular shape. Each of the electrodeless regions 15 has a generally star shape having four quarter-arc-shaped sides (edges) with a four-fold rotation axis at the center among the four sides.

When a voltage is applied between the picture element electrode 14 having such a structure as described above and the counter electrode 22, an inclined electric field is produced around (near the periphery of) the sub-electrode 14a, i.e., at the edge portion of the electrodeless region 15, thereby producing a plurality of liquid crystal domains each having a radially-inclined orientation. The liquid crystal domain is produced in each region corresponding to the electrodeless region 15 and in each region corresponding to the sub-electrode 14a.

Figure 2:
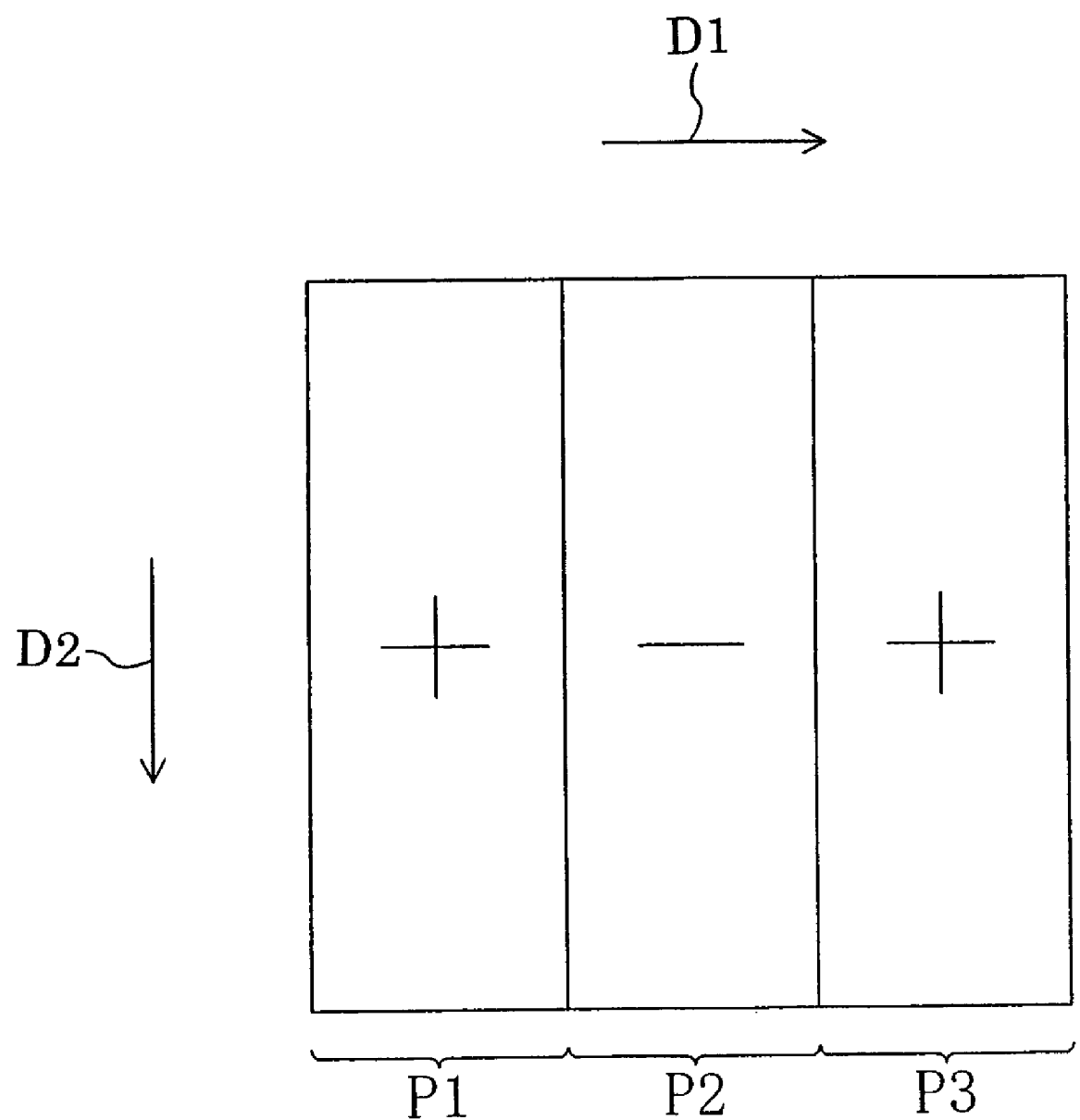
FIG. 2 schematically illustrates a state where voltages of different polarities are applied to picture element regions that are adjacent to each other in the row direction.

Note that in the liquid crystal display device 100 of the present invention, picture elements that are adjacent to each other in the row direction D1 are driven with voltages of opposite polarities, as illustrated in FIG. 2, during a period in which data is written to all the picture elements (i.e., one frame). Referring to FIG. 2, a voltage of one polarity is applied across the liquid crystal layer 30 in the picture element regions P1 and P3 (picture element regions marked with "+" sign) while a voltage of a different (opposite) polarity is applied across the liquid crystal layer 30 in the picture element region P2 (a picture element region marked with "−" sign). In other words, in each frame, the polarity of the voltage applied across the liquid crystal layer 30 in one picture element region is different from that of the voltage applied across the liquid crystal layer 30 in another picture element region that is adjacent to the first picture element region in a direction (the row direction D1) perpendicular to the direction (the column direction D2) along which the sub-electrodes 14a are arranged.

Figure 3A:
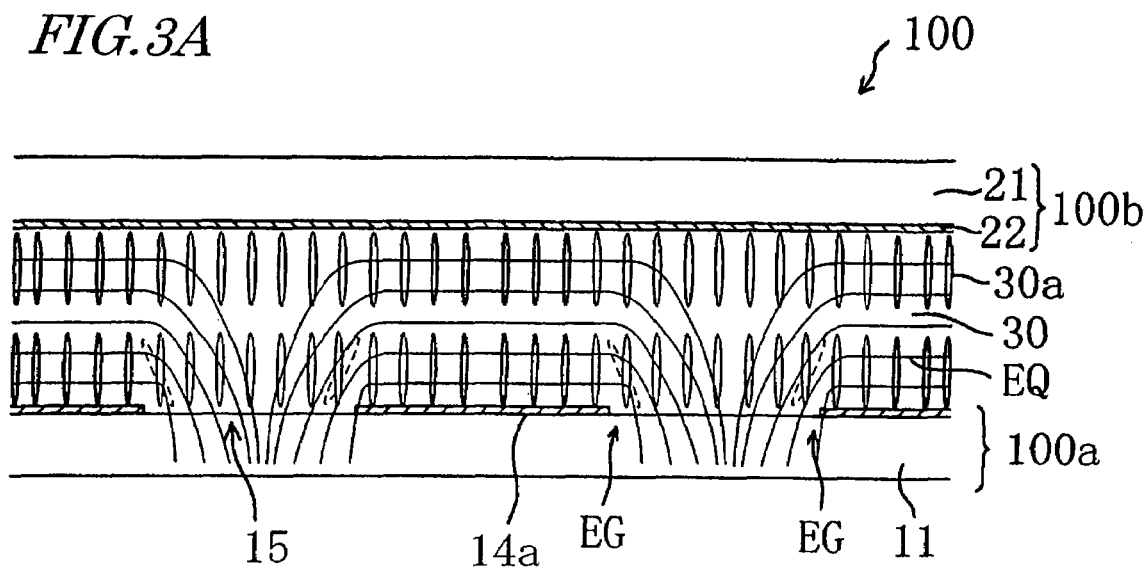
FIG. 3A and FIG. 3B illustrate a liquid crystal layer 30 of the liquid crystal display device 100 in the presence of, an applied voltage thereacross, wherein FIG. 3A schematically illustrates a state where an orientation has just started to change (initial ON state), and FIG. 3B schematically illustrates a steady state.
Figure 3B:
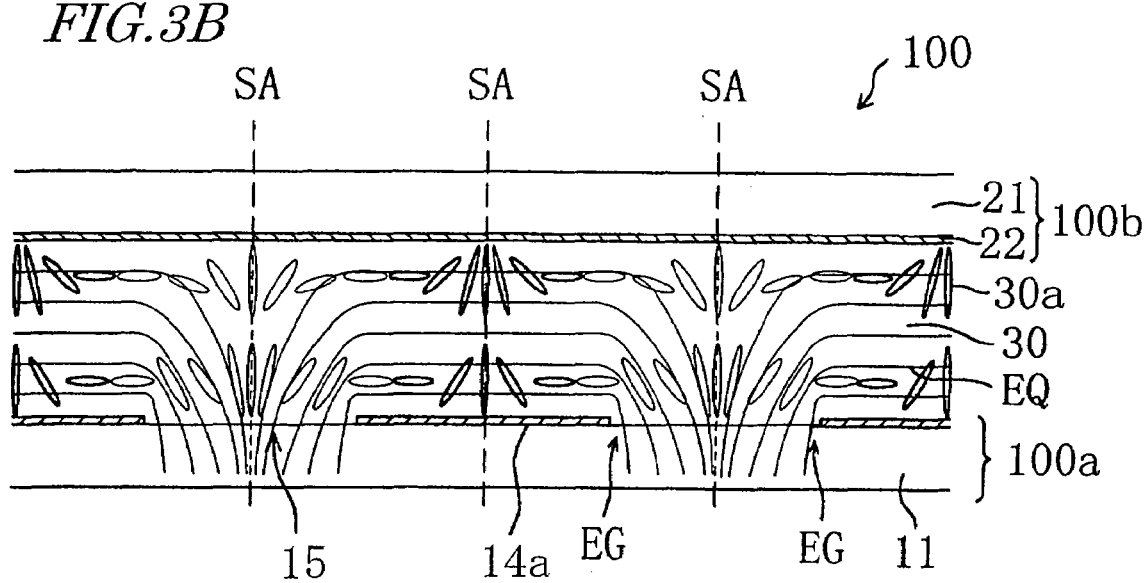

The mechanism by which liquid crystal domains are formed by an inclined electric field as described above will be described with reference to FIG. 3A and FIG. 3B. Each of FIG. 3A and FIG. 3B illustrates the liquid crystal layer 30 with a voltage being applied thereacross. FIG. 3A schematically illustrates a state where the orientation of the liquid crystal molecules 30a has just started to change (initial ON state) according to the voltage applied across the liquid crystal layer 30. FIG. 3B schematically illustrates a state where the orientation of the liquid crystal molecules 30a has changed and become steady according to the applied voltage. Curves EQ in FIG. 3A and FIG. 3B denote equipotential lines. Note that while FIG. 3A and FIG. 3B are cross-sectional views taken along line 3-3' of FIG. 1A, the stepped portion of the counter substrate 100b is not shown in these figures for the sake of simplicity.

When the picture element electrode 14 and the counter electrode 22 are at the same potential (a state where no voltage is applied across the liquid crystal layer 30), the liquid crystal molecules 30a in each picture element region are aligned vertical to the surfaces of the substrates 11 and 21, as illustrated in FIG. 3A.

When a voltage is applied across the liquid crystal layer 30, a potential gradient represented by the equipotential lines EQ shown in FIG. 3A (perpendicular to the electric force line) is produced. The equipotential lines EQ are parallel to the surface of the sub-electrode 14a and the counter electrode 22 in the liquid crystal layer 30 located between the sub-electrode 14a of the picture element electrode 14 and the counter electrode 22, and drop in a region corresponding to the electrodeless region 15 of the picture element electrode 14. An inclined electric field represented by an inclined portion of the equipotential lines EQ is produced in the liquid crystal layer 30 above an edge portion EG of the electrodeless region 15 (the peripheral portion of and within the electrodeless region 15 including the boundary thereof). Note that in the present embodiment, two picture elements that are adjacent to each other in the row direction D1 are driven with voltages of opposite polarities, and thus the equipotential lines EQ drop sharply in the electrodeless region 15 located between these picture elements, whereby the equipotential lines EQ are not continuous across these picture elements.

A torque acts upon the liquid crystal molecules 30a having a negative dielectric anisotropy so as to direct the axial orientation of the liquid crystal molecules 30a to be parallel to the equipotential lines EQ (perpendicular to the electric force line). Therefore, the liquid crystal molecules 30a above the right edge portion EG in FIG. 3A incline (rotate) clockwise and the liquid crystal molecules 30a above the left edge portion EG incline (rotate) counterclockwise as indicated by arrows in FIG. 3A. As a result, the liquid crystal molecules 30a above the edge portions EG are oriented parallel to the corresponding portions of the equipotential lines EQ.

Referring to FIG. 4A to FIG. 4D, the change in the orientation of the liquid crystal molecules 30a will now be described in greater detail.

Figure 4A:
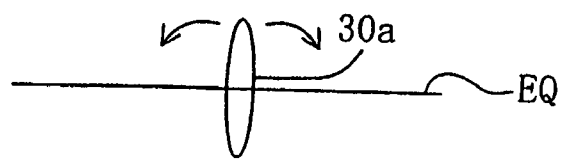

When an electric field is produced in the liquid crystal layer 30, a torque acts upon the liquid crystal molecules 30a having a negative dielectric anisotropy so as to direct the axial orientation thereof to be parallel to an equipotential line EQ. As illustrated in FIG. 4A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise occurs with the same probability. Therefore, the liquid crystal layer 30 between the pair of parallel plate-shape electrodes opposing each other has some liquid crystal molecules 30a that are subject to a clockwise torque and some other liquid crystal molecules 30a that are subject to a counterclockwise torque. As a result, the transition to the intended orientation according to the voltage applied across the liquid crystal layer 30 may not proceed smoothly.

Figure 4B:
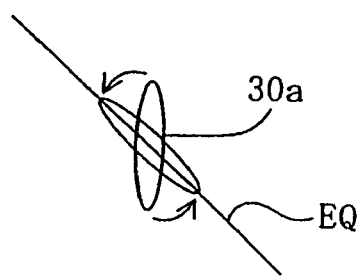
Figure 4C:
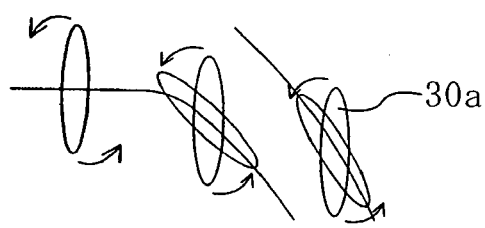
Figure 4D:
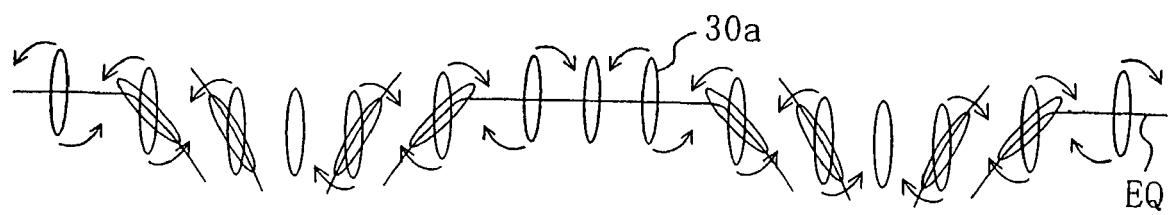

When an electric field represented by a portion of the equipotential lines EQ inclined with respect to the axial orientation of the liquid crystal molecules 30a (an inclined electric field) is produced at the edge portion EG of the electrodeless region 15 of the liquid crystal display device 100 of the present invention, as illustrated in FIG. 3A, the liquid crystal molecules 30a incline in whichever direction (the counterclockwise direction in the illustrated example) that requires less rotation for the liquid crystal molecules 30a to be parallel to the equipotential line EQ, as illustrated in FIG. 4B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 4C. As illustrated in FIG. 4D, when an electric field such that the equipotential line EQ forms a continuous concave/convex pattern, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential lines EQ, proceeds as described above and reaches a steady state, which is schematically illustrated in FIG. 3B. The liquid crystal molecules 30a located around the central portion of the electrodeless region 15 are influenced substantially equally by the respective orientations of the liquid crystal molecules 30a at the opposing edge portions EG of the electrodeless region 15, and therefore retain their orientation perpendicular to the equipotential lines EQ. The liquid crystal molecules 30a away from the center of the electrodeless region 15 incline by the influence of the orientation of other liquid crystal molecules 30a at the closer edge portion EG, thereby forming an inclined orientation that is symmetric about the center SA of the electrodeless region 15. The orientation as viewed in a direction perpendicular to the display plane of the liquid crystal display device 100 (a direction perpendicular to the surfaces of the substrates 11 and 21) is a state where the liquid crystal molecules 30a have a radial axial orientation (not shown) about the center of the electrodeless region 15. In the present specification, such an orientation will be referred to as a "radially-inclined orientation". Moreover, a region of the liquid crystal layer 30 that takes a radially-inclined orientation about a single axis will be referred to as a "liquid crystal domain".

A liquid crystal domain in which the liquid crystal molecules 30a take a radially-inclined orientation is formed also in a region corresponding to the sub-electrode 14a substantially surrounded by the electrodeless regions 15. The liquid crystal molecules 30a in a region corresponding to the sub-electrode 14a are influenced by the orientation of the liquid crystal molecules 30a at each edge portion EG of the electrodeless region 15 so as to take a radially-inclined orientation that is symmetric about the center SA of the sub-electrode 14a (corresponding to the center of a unit lattice formed by the electrodeless regions 15).

The radially-inclined orientation in a liquid crystal domain formed above the sub-electrode 14a and the radially-inclined orientation formed above the electrodeless region 15 are continuous with each other, and are both in conformity with the orientation of the liquid crystal molecules 30a at the edge portion EG of the electrodeless region 15. The liquid crystal molecules 30a in the liquid crystal domain formed above the electrodeless region 15 are oriented in the shape of a cone that spreads upwardly (toward the substrate 100b), and the liquid crystal molecules 30a in the liquid crystal domain formed above the sub-electrode 14a are oriented in the shape of a cone that spreads downwardly (toward the substrate 100a). As described above, the radially-inclined orientation in a liquid crystal domain formed above the electrodeless region 15 and that in a liquid crystal domain formed above the sub-electrode 14a are continuous with each other. Therefore, no disclination line (orientation defect) is formed along the boundary therebetween, thereby preventing a decrease in the display quality due to occurrence of a disclination line.

Note that a sufficient voltage may not be applied across the liquid crystal layer 30 around the central portion of the electrodeless region 15, whereby the liquid crystal layer 30 around the central portion of the electrodeless region 15 does not contribute to the display. In other words, even if the radially-inclined orientation of the liquid crystal layer 30 around the central portion of the electrodeless region 15 is disturbed to some extent (e.g., even if the central axis is shifted from the center of the electrodeless region 15), the display quality may not be decreased. Therefore, as long as the liquid crystal domain is formed at least corresponding to a sub-electrode 14a, it is possible to obtain a continuity of the liquid crystal molecules in each picture element region and to realize a wide viewing angle characteristic and a high display quality.

In order to improve the viewing angle dependence, which is a display quality of a liquid crystal display device, in all azimuth angles, the existence probabilities of the liquid crystal molecules 30a oriented in various azimuth angle directions preferably have rotational symmetry, and more preferably have axial symmetry, in each picture element region. Therefore, it is preferred that the liquid crystal domains are arranged with a high degree of symmetry in each picture element region. In the present embodiment, the sub-electrodes 14a are arranged in a line in a predetermined direction (the column direction D2) so as to have rotational symmetry and even axial symmetry. Therefore, the liquid crystal domains each corresponding to the sub-electrode 14a are also arranged with rotational symmetry and even axial symmetry.

As described above with reference to FIG. 3A and FIG. 3B, the picture element electrode 14 of the liquid crystal display device 100 of the present invention includes a plurality of sub-electrodes 14a each surrounded by a plurality of electrodeless regions 15 and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a vertical alignment in the absence of an applied voltage, change the orientation direction thereof, with the change in the orientation of those liquid crystal molecules 30a located on the inclined portion of the equipotential lines EQ serving as a trigger. Thus, a liquid crystal domain having a stable radially-inclined orientation is formed above the electrodeless region 15 and in the sub-electrode 14a. A display is produced by the change in the orientation of the liquid crystal molecules in the liquid crystal domain according to the voltage applied across the liquid crystal layer.

The shape (as viewed in the substrate normal direction) and arrangement of the sub-electrodes 14a of the picture element electrode 14 and those of the electrodeless regions 15 of the TFT substrate 100a will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability.

Therefore, the sub-electrode 14a preferably has a shape such that liquid crystal domains are formed in each picture element region so that the liquid crystal molecules 30a in each liquid crystal domain corresponding to the sub-electrode 14a are oriented in all azimuth angles with substantially the same probability. More specifically, the shape of the sub-electrode 14a preferably has rotational symmetry (more preferably symmetry with at least a two-fold rotation axis) about a symmetry axis extending through the center of each sub-electrode (in the normal direction).

Moreover, since only a portion of the liquid crystal domain formed corresponding to the electrodeless region 15 is included in a picture element region and contributes to the display, it is preferred that the liquid crystal molecules included in a collection of liquid crystal domain portions (segments) that are included in a picture element region are oriented in all azimuth angles with substantially the same probability. Thus, it is preferred that the electrodeless regions 15 have a shape and an arrangement such that the liquid crystal domain segments together form a liquid crystal domain in a complementary manner. Specifically, it is preferred that the shape of the electrodeless region 15 has rotational symmetry and that the electrodeless regions 15 are arranged so as to have rotational symmetry. Note that since the liquid crystal domain formed in the electrodeless region 15 has a portion thereof located outside a picture element region, it may be difficult to arrange the electrodeless regions 15 so that the liquid crystal domain segments together form a liquid crystal domain in a complementary manner. Nevertheless, it is possible to sufficiently reduce the azimuth angle dependence of the display characteristics as long as the existence probabilities of the liquid crystal molecules oriented in various azimuth angles have rotational symmetry (more preferably axial symmetry) for each collection of liquid crystal domain segments.

The orientation of the liquid crystal molecules 30a when the generally star-shaped electrodeless regions 15 surrounding the generally circular sub-electrodes 14a are arranged in a square lattice pattern, as illustrated in FIG. 1A, will be described with reference to FIG. 5A to FIG. 5C.

Each of FIG. 5A to FIG. 5C schematically illustrates an orientation of the liquid crystal molecules 30a as viewed in the substrate normal direction. In figures, such as FIG. 5B and FIG. 5C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 is provided. This similarly applies to all of the subsequent figures. A single unit lattice (formed by four electrodeless regions 15) in the picture element region illustrated in FIG. 1A will be described below. Cross-sectional views taken along the respective diagonals of FIG. 5A to FIG. 5C correspond to FIG. 1B, FIG. 3A and FIG. 3B, respectively, and FIG. 1B, FIG. 3A and FIG. 3B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) provided on one side of each of the TFT substrate 100a and the counter substrate 100b that is closer to the liquid crystal layer 30 take a vertical alignment as illustrated in FIG. 5A.

When an electric field is applied across the liquid crystal layer 30 so as to produce an electric field represented by equipotential lines EQ shown in FIG. 3A, a torque acts upon the liquid crystal molecules 30a having a negative dielectric anisotropy so as to direct the axial orientation thereof to be parallel to the equipotential lines EQ. As described above with reference to FIG. 4A and FIG. 4B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 4A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. Therefore, as illustrated in FIG. 5B, the liquid crystal molecules 30a start inclining from the edge portion of the electrodeless region 15 where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the electrodeless region 15, as described above with reference to FIG. 4C. Then, the axial orientation of the liquid crystal molecules 30a becomes stable as illustrated in FIG. 5C (radially-inclined orientation).

As described above, when the shape of the electrodeless region 15 has rotational symmetry, the liquid crystal molecules 30a in the picture element region successively incline, starting from the edge portion of the electrodeless region 15 toward the center of the electrodeless region 15 upon application of a voltage. As a result, there is obtained an orientation in which those liquid crystal molecules 30a around the center of the electrodeless region 15, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the electrodeless region 15, with the degree of inclination gradually increasing away from the center of the electrodeless region 15.

The liquid crystal molecules 30a in a region corresponding to the generally circular sub-electrode 14a surrounded by the four generally star-shaped electrodeless regions 15 arranged in a square lattice pattern also incline so as to conform with the orientation of the liquid crystal molecules 30a that have been inclined by an inclined electric field produced at the edge portion of each electrodeless region 15. As a result, there is obtained an orientation in which those liquid crystal molecules 30a around the center of the sub-electrode 14a, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the sub-electrode 14a, with the degree of inclination gradually increasing away from the center of the sub-electrode 14a.

As described above, when liquid crystal domains in each of which the liquid crystal molecules 30a take a radially-inclined orientation are arranged in a square lattice pattern, the existence probabilities of the liquid crystal molecules 30a of the respective axial orientations have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis).

For the radially-inclined orientation of the liquid crystal molecules 30a, a radially-inclined orientation having a counterclockwise or clockwise spiral pattern as illustrated in FIG. 6B or FIG. 6C, respectively, is more stable than the simple radially-inclined orientation as illustrated in FIG. 6A. The spiral orientation is different from a normal twist orientation (in which the orientation direction of the liquid crystal molecules 30a spirally changes along the thickness of the liquid crystal layer 30). In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 6B or FIG. 6C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the electrodeless region 15 and the sub-electrode 14a, as illustrated in FIG. 6B or FIG. 6C, respectively, in the presence of an applied voltage. Whether the spiral pattern is counterclockwise or clockwise is determined by the type of chiral agent used. Thus, by controlling the liquid crystal layer 30 in the electrodeless region 15 into a radially-inclined orientation of a spiral pattern in the presence of an applied voltage, the direction of the spiral pattern of the radially-inclined liquid crystal molecules 30a about other liquid crystal molecules 30a standing vertical to the substrate plane can be constant in all liquid crystal domains, whereby it is possible to realize a uniform display without display non-uniformity. Since the direction of the spiral pattern around the liquid crystal molecules 30a standing vertical to the substrate plane is definite, the response speed upon application of a voltage across the liquid crystal layer 30 is also improved.

Moreover, when a large amount of a chiral agent is added, the orientation of the liquid crystal molecules 30a changes in a spiral pattern along the thickness of the liquid crystal layer 30 as in a normal twist orientation. In an orientation where the orientation of the liquid crystal molecules 30a does not change in a spiral pattern along the thickness of the liquid crystal layer 30, the liquid crystal molecules 30a which are oriented perpendicular or parallel to the polarization axis of the polarization plate do not give a phase difference to the incident light, whereby incident light passing through a region of such an orientation does not contribute to the transmittance. In contrast, in an orientation where the orientation of the liquid crystal molecules 30a changes in a spiral pattern along the thickness of the liquid crystal layer 30, the liquid crystal molecules 30a that are oriented perpendicular or parallel to the polarization axis of the polarization plate also give a phase difference to the incident light, and the optical rotatory power can also be utilized, whereby incident light passing through a region of such an orientation also contributes to the transmittance. Thus, it is possible to obtain a liquid crystal display device capable of producing a bright display.

FIG. 1A illustrates an example in which each sub-electrode 14a has a generally circular shape and each electrodeless region 15 has a generally star shape, wherein such sub-electrodes 14a and such electrodeless regions 15 are arranged in a square lattice pattern. However, the shape of the sub-electrodes 14a and the shape and arrangement of the electrodeless regions 15 are not limited to those of the example above.

FIG. 7A and FIG. 7B are plan views respectively illustrating the liquid crystal display devices 100A and 100B having respective electrodeless regions 15 and sub-electrodes 14a of different shapes.

The electrodeless regions 15 and the sub-electrodes 14a of the liquid crystal display devices 100A and 100B illustrated in FIG. 7A and FIG. 7B, respectively, are slightly distorted from those of the liquid crystal display device 100 illustrated in FIG. 1A. The electrodeless regions 15 and the sub-electrodes 14a of the liquid crystal display devices 100A and 100B have a two-fold rotation axis (not a four-fold rotation axis) and are regularly arranged so as to form oblong rectangular unit lattices. In both of the liquid crystal display devices 100A and 100B, the electrodeless region 15 has a distorted star shape, and the sub-electrode 14a has a generally elliptical shape (a distorted circular shape). The liquid crystal display devices 100A and 100B illustrated in FIG. 7A and FIG. 7B also have a high display quality and desirable viewing angle characteristic.

Moreover, liquid crystal display devices 100C and 100D as illustrated in FIG. 8A and FIG. 8B, respectively, also have a high display quality and desirable viewing angle characteristic.

In the liquid crystal display devices 100C and 100D, generally cross-shaped electrodeless regions 15 are arranged in a square lattice pattern so that each sub-electrode 14a has a generally square shape. Of course, these patterns may be distorted so that there are oblong rectangular unit lattices. As described above, it is possible to obtain a liquid crystal display device having a high display quality and a desirable viewing angle characteristic alternatively by regularly arranging the generally rectangular (including a square and oblong rectangle) sub-electrodes 14a.

However, the shape of the electrodeless region 15 and/or the sub-electrode 14a is preferably a circle or an ellipse, rather than a rectangle, so that a radially-inclined orientation is more stable. It is believed that a radially-inclined orientation is more stable with a circular or elliptical electrodeless region and/or sub-electrode because the edge of the electrodeless region 15 is more continuous (smooth), whereby the orientation direction of the liquid crystal molecules 30a changes more continuously (smoothly).

In view of the continuity of the orientation direction of the liquid crystal molecules 30a described above, a liquid crystal display device 100E as illustrated in FIG. 9 is also desirable. The liquid crystal display device 100E illustrated in FIG. 9 is a variation of the liquid crystal display device 100D illustrated in FIG. 8B in which each side of the electrodeless region 15 on the sub-electrode 14a is an arc. In the liquid crystal display device 100, the electrodeless regions 15 and the sub-electrodes 14a have a four-fold rotation axis and are arranged in a square lattice pattern (having a four-fold rotation axis). Alternatively, the shape of the sub-electrode 14a of the electrodeless region 15 may be distorted into a shape having a two-fold rotation axis, and such sub-electrodes 14a may be arranged so as to form oblong rectangular lattices (having a two-fold rotation axis), as illustrated in FIG. 7A and FIG. 7B.

The voltage applied through a liquid crystal domain formed above the electrodeless region 15 is lower than the voltage applied through another liquid crystal domain formed above the sub-electrode 14a. As a result, in a normally black mode display, for example, the liquid crystal domain formed above the electrodeless region 15 appears darker. Therefore, it is preferred that the area ratio of the sub-electrode 14a in a picture element region is high while that of the electrodeless region 15 is low.

In the liquid crystal display device of the present invention, the picture element electrode 14 includes a plurality of sub-electrodes 14a, whereby it is possible to realize a stable radially-inclined orientation in a picture element region, without being restricted by the shape and size, etc., of the picture element region, by appropriately arranging the plurality of sub-electrodes 14a in the picture element region according to the shape and size, etc., of the picture element region. In contrast, if the picture element electrode is a single electrode, it may not be possible to realize a stable radially-inclined orientation depending on the shape and size, etc., of the picture element region. The picture element electrode being a single electrode is not a problem if the picture element region has a circular or square shape. However, if the picture element region has an oblong rectangular shape with a large aspect ratio as in a liquid crystal display device capable of producing a color display, for example, the electrode needs to have a shape with a large aspect ratio, and it may not be possible to realize a stable radially-inclined orientation. Moreover, when the picture element region has a large size, for example, the electrode needs to have a large size, in which case a stable orientation may not be obtained only by the inclined electric field produced around the electrode.

Moreover, in the liquid crystal display device of the present invention, a plurality of sub-electrodes 14a are arranged (in a line) in a predetermined direction in each picture element region, as illustrated in FIG. 1A, for example, whereby it is possible to increase the area ratio of the sub-electrode 14a and to increase the proportion of the area that contributes to the display with respect to the total area of the picture element region (effective aperture ratio), as compared with a case where the sub-electrodes are arranged in two or more lines. The reason for this will be described with reference to FIG. 10.

As illustrated in FIG. 10, the liquid crystal display device 100E includes gate bus lines (scanning lines) 41 extending parallel to one another in the row direction D1, and source bus lines (signal lines) 42 extending parallel to one another in the column direction D2. Each gate bus line (scanning line) 41 is electrically connected to the gate electrode of a TFT (not shown) provided for each picture element region, and each source bus line (signal line) 42 is electrically connected to the source electrode of the TFT. Moreover, the drain electrode of the TFT is electrically connected to the picture element electrode 14. The liquid crystal display device 100E further includes a storage capacitance line 43.

In the liquid crystal display device 100E, a number of sub-electrodes 14a are arranged in a line in each picture element region, and a portion of the electrodeless region 15 surrounding the sub-electrodes 14a overlaps with the gate bus line 41 or the source bus line 42 and such a portion is located outside the picture element region. Thus, each of the plurality of electrodeless regions 15 has at least a portion thereof that is located outside the picture element region.

When a plurality of sub-electrodes 14a are arranged in two or more lines, there exists an electrodeless region 15 that is surrounded by the sub-electrodes 14a in each picture element region, and such an electrodeless region 15 is entirely located within the picture element region. For example, in a liquid crystal display device 1000 of a comparative example in which the sub-electrodes 14a are arranged in two lines, as illustrated in FIG. 11, there exists an electrodeless region 15 that is surrounded by the sub-electrodes 14a in each picture element region, and such an electrodeless region 15 is entirely located within the picture element region. Then, the area ratio of the electrodeless region 15 in the picture element region increases, thus decreasing the area ratio of the sub-electrode 14a.

In contrast, when a plurality of sub-electrodes 14a are arranged in a line in each picture element region, as illustrated in FIG. 10, each of the plurality of electrodeless regions 15 has at least a portion thereof that is located outside the picture element region, whereby it is possible to reduce the area ratio of the electrodeless region 15 in the picture element region and to increase the area ratio of the sub-electrode 14a, and thus to improve the aperture ratio.

Now, how the aperture ratio can be improved will be described in greater detail with reference to data obtained by using a liquid crystal display device of particular specifications. The specifications of the liquid crystal display device were as follows: the display area was 15 inches long diagonally, the sub-electrode 14a had a generally square shape with generally arc-shaped corner portions (as illustrated in FIG. 9 and FIG. 10), the width of the gate bus line and the width of the light blocking layer on the source bus line were 12 μm, and the interval between the sub-electrodes 14a was 8.5 μm. The transmittance of the liquid crystal display device when the sub-electrodes 14a were arranged in a line was compared with that when the sub-electrodes 14a were arranged in two lines. The transmittance when the sub-electrodes 14a were arranged in a line was improved, as compared with that when the sub-electrodes 14a were arranged in two lines, by 6% for SXGA (1280×1024 pixels), 9% for UXGA (1600×1200 pixels), and 11% for QXGA (2048×1536 pixels). Thus, the effect of improving the aperture ratio by arranging a plurality of sub-electrodes 14a in a line in each picture element region is particularly significant for high definition type liquid crystal display devices.

Note that in a structure where the picture element electrode 14 overlaps with the gate bus line 41 or the source bus line 42 as illustrated in FIG. 10, it is preferred that an insulative film (e.g., an organic insulative film) is formed to be as thick as possible on the bus lines, and the picture element electrode 14 is formed thereon, in order to reduce the influence from these bus lines.

Referring to FIG. 12, "S" denotes the length of the gap between the square unit lattice formed by the electrodeless regions 15 and the sub-electrode 14a (hereinafter referred to as the "side spacing S"). The side spacing S needs to be equal to or greater than a predetermined length in order to produce an inclined electric field that is required for obtaining a stable radially-inclined orientation.

While the side spacing S is defined both in the row direction D1 and in the column direction D2, in the present embodiment, picture elements that are adjacent to each other along the row direction D1 are driven with voltages of opposite polarities in each frame as illustrated in FIG. 2. In this way, as compared with a case where picture elements that are adjacent to each other along the row direction D1 are not driven with voltages of opposite polarities, it is possible to obtain a sufficient orientation-regulating force even if the side spacing S in the row direction D1 is reduced. This is because a relatively strong inclined electric field can be produced when picture elements that are adjacent to each other along the row direction D1 are driven with voltages of opposite polarities. The reason for this will be described with reference to FIG. 13A and FIG. 13B.

FIG. 13A schematically illustrates equipotential lines EQ produced when a voltage of +5 V is applied across the liquid crystal layer in both of two picture element regions that are adjacent to each other in the row direction D1, and FIG. 13B schematically illustrates equipotential lines EQ produced when a voltage of +5 V is applied across the liquid crystal layer in one of two picture element regions that are adjacent to each other in the row direction D1 while applying a voltage of −5 V across the liquid crystal layer in the other one of the two picture element regions.

As illustrated in FIG. 13A, when voltages of the same polarity are applied across the liquid crystal layer in two adjacent picture element regions, there is produced an electric field such that the equipotential line EQ forms a continuous concave/convex pattern.

In contrast, as illustrated in FIG. 13B, when voltages of opposite polarities are applied across the liquid crystal layer in two adjacent picture element regions, the equipotential lines EQ representing the electric fields produced in the two picture element regions are not continuous, but the equipotential lines EQ drop sharply in the electrodeless region 15. Therefore, at the edge portion of the electrodeless region 15, i.e., around the sub-electrode 14a, a sharp potential gradient is formed, thereby producing an inclined electric field of a greater strength than that in the case as illustrated in FIG. 13A.

As described above, when picture elements that are adjacent to each other in the row direction D1 are driven with voltages of opposite polarities, it is possible to obtain a sufficient orientation-regulating force even if the side spacing S in the row direction D1 is reduced. Thus, it is possible to form a sufficiently stable radially-inclined orientation even when the distance between two picture element electrodes 14 that are adjacent to each other in the row direction D1 is reduced so as to increase the aperture ratio.

Further experiments were conducted with the liquid crystal display device having particular specifications as shown above (the liquid crystal display device in which the display area was 15 inches long diagonally, the sub-electrode 14a had a generally square shape with generally arc-shaped corner portions, the width of the gate bus line and the width of the light blocking layer on the source bus line were 12 μm, and the interval between the sub-electrodes 14a was 8.5 μm). Specifically, a comparison was made between a case where picture elements that are adjacent to each other in the row direction D1 were driven with voltages of opposite polarities, and a case where they were not driven with voltages of opposite polarities. In a case where picture elements that are adjacent to each other in the row direction D1 were not driven with voltages of opposite polarities, the minimum distance between the picture element electrodes 14 required for realizing a stable radially-inclined orientation was 8.5 μm, i.e., equal to the distance between the sub-electrodes 14a in each picture element region. In contrast, in a case where picture elements that are adjacent to each other in the row direction D1 were driven with voltages of opposite polarities, it was possible to obtain a stable radially-inclined orientation even if the distance between picture element electrodes 14 that are adjacent to each other in the row direction D1 was reduced to 3 μm.

In the present embodiment, the aperture ratio can sufficiently be improved when picture elements that are adjacent to each other in the row direction D1 are driven with voltages of opposite polarities, while picture elements that are adjacent to each other in the column direction D2 are not driven with voltages of opposite polarities as illustrated in FIG. 14A (so-called "source line inversion driving method"). Nevertheless, in order to gain other advantageous effects such as the effect of suppressing flicker, it is preferred that the polarity of the applied voltage is inverted for every n rows (where n is an integer of 1 or more) of picture elements, i.e., for every n picture elements in the column direction D2, while driving picture elements that are adjacent to each other in the row direction D1 with voltages of opposite polarities. In other words, it is preferred that the polarity of the voltage applied across the liquid crystal layer in picture element regions of the same column is inverted for every n rows in each frame.

For example, as illustrated in FIG. 14B, the polarity of the applied voltage may be inverted for every 2 rows of picture elements, i.e., for every 2 picture elements in the column direction D2 (so-called "2H dot inversion driving method"). Alternatively, as illustrated in FIG. 14C, the polarity of the applied voltage may be inverted for every row of picture elements, i.e., for every picture element in the column direction D2 (so-called "dot inversion driving method"). If picture elements that are adjacent to each other in the column direction D2 are driven with voltages of opposite polarities while picture elements that are adjacent to each other in the row direction D1 are driven with voltages of opposite polarities, as illustrated in FIG. 14C, it is possible to reduce the interval between picture element electrodes 14 that are adjacent to each other in the column direction D2 and thus to further improve the aperture ratio.

Now, the relationship between the shape of the sub-electrode 14a and the stability of a radially-inclined orientation and the relationship between the shape of the sub-electrode 14a and the transmittance value will be described.

A research by the present inventor revealed that with the spacing of the sub-electrode 14a (the side spacing S) being constant, the orientation stability is higher as the shape of the sub-electrode 14a is closer to a circle or an ellipse. This is because as the shape of the sub-electrode 14a is closer to a circle or an ellipse, the continuity in the orientation direction of the liquid crystal molecules 30a in a radially-inclined orientation is higher.

It was also revealed that the transmittance is higher as the shape of the sub-electrode 14a is closer to a rectangle such as a square or an oblong rectangle. This is because with the value of the side spacing S being constant, as the shape of the sub-electrode 14a is closer to a rectangle, the area ratio of the sub-electrode 14a is increased, thereby increasing the area of the liquid crystal layer that is directly influenced by the electric field produced by electrodes (the area defined in the plane perpendicular to the substrate normal direction) and thus increasing the effective aperture ratio.

Therefore, the shape of the sub-electrode 14a can be determined in view of the intended orientation stability and the intended transmittance.

When the sub-electrode 14a has a generally square shape with generally arc-shaped corner portions, as illustrated in FIG. 9 and FIG. 10, for example, it is possible to realize a relatively high orientation stability and a relatively high transmittance. Of course, similar effects can be obtained also when the sub-electrode 14a has a generally rectangular shape with generally arc-shaped corner portions. Note that due to limitations on the production process, the corner portion of the sub-electrode 14a formed from a conductive film may not be arc-shaped, strictly speaking, but may instead be an obtuse polygonal shape (a shape made of a plurality of angles exceeding 90°), and the corner portion may have a slightly distorted arc shape (e.g., a portion of an ellipse) or a distorted polygonal shape, instead of a quarter-arc shape or a regular polygonal shape (e.g., a portion of a regular polygon). Alternatively, the corner portion may have a shape that is a combination of curves and obtuse angles. The term "generally arc shape" as used herein may be any of these shapes. Note that due to similar process-related reasons, the shape of the generally-circular sub-electrode 14a as illustrated in FIG. 1A may be a polygonal shape or a distorted shape instead of a strictly circular shape.

In view of the response speed, the sub-electrode 14a may be shaped as in a liquid crystal display device 100F illustrated in FIG. 15. In the liquid crystal display device 100F as illustrated in FIG. 15, the shape of the sub-electrode 14a of the picture element electrode 14 is a distorted square shape with acute angle corner portions. Note that a corner with an acute angle as used herein refers to a corner or a rounded corner having an angle less than 90°.

When the sub-electrode 14a has a shape with acute angle corner portions, as illustrated in FIG. 15, the total length of the edge portion along which an inclined electric field is produced is increased, whereby the inclined electric field can be acted upon more liquid crystal molecules 30a. Thus, the number of liquid crystal molecules 30a that initially start inclining in response to an electric field is increased, thereby reducing the amount of time required for a radially-inclined orientation to be formed entirely across the picture element region. As a result, the response speed to the application of a voltage across the liquid crystal layer 30 is improved.

Moreover, when the sub-electrode 14a has a shape with acute angle corners, the existence probability of the liquid crystal molecules 30a that are oriented in a particular azimuth angle direction can be increased (or decreased) as compared to a case where the shape of the sub-electrode 14a is a generally circular shape or a generally rectangular shape. In other words, a high directionality can be introduced in the existence probabilities of the liquid crystal molecules 30a oriented in various azimuth angle directions. Therefore, when an acute angle corner is employed in the sub-electrode 14a in a liquid crystal display device having a polarization plate in which linearly-polarized light is incident upon the liquid crystal layer 30, it is possible to decrease the existence probability of the liquid crystal molecules 30a oriented vertical or horizontal to the polarization axis of the polarization plate, i.e., the liquid crystal molecules 30a that do not give a phase difference to the incident light. Thus, it is possible to improve the light transmittance and to realize a brighter display.

Note that it has been stated above that the surface of the reflection electrode may be provided with minute irregularities in order to realize a white display that is close to paper white. When the surface of the reflection electrode is provided with such minute irregularities, equipotential lines parallel to the surface (in conformity with the minute irregularities) are formed in the presence of an applied voltage, whereby the surface of the reflection electrode with minute irregularities does not exert an orientation-regulating force that controls the orientation direction of the liquid crystal molecules in the presence of an applied voltage, and thus does not affect the formation of a radially-inclined orientation.

The description above has been primarily directed to the electrode structure of the TFT substrate 100a and the function thereof. Now, the structure of the counter substrate 100b and the function thereof will be described with reference to FIG. 1B and FIG. 16. FIG. 16 schematically illustrates a liquid crystal display device 1100 of a comparative example. The liquid crystal display device 1100 of the comparative example is similar to the liquid crystal display device 100 in that the picture element electrode 14 of a TFT substrate 1100a includes a plurality of sub-electrodes 14a and that liquid crystal domains each taking a radially-inclined orientation in the presence of an applied voltage are formed. However, the liquid crystal display device 1100 is different from the liquid crystal display device 100 in that a counter substrate 1100b is not provided with a stepped portion, but the TFT substrate 1100a is provided with a stepped portion by providing an insulating film 19 under the reflection electrode of the TFT substrate 1100a.

As illustrated in FIG. 1B, in the liquid crystal display device 100 of the present invention, the counter substrate 100b includes a stepped portion including the upper tier 100b1 located in the reflection region R, the lower tier 100b2 located in the transmission region T, and the side surface 100b3 connecting the upper tier 100b1 and the lower tier 100b2 to each other, whereby the thickness dr of the liquid crystal layer 30 in the reflection region R is smaller than the thickness dt of the liquid crystal layer 30 in the transmission region T. Thus, a stepped portion is provided on the counter substrate 100b, but not on the TFT substrate 100a, thereby realizing a multigap structure suitable for displaying an image both in a transmission mode and a reflection mode. Therefore, it is not necessary to provide a stepped portion using the insulating film 19, or the like, under the reflection electrode, as in the liquid crystal display device 1100 of the comparative example illustrated in FIG. 16, whereby it is possible to simplify the production process of the TFT substrate 1000a.

With a multigap structure, the side surface of a stepped portion is inclined with respect to the substrate plane, whereby liquid crystal molecules that are oriented vertical to the side surface cause light leakage in a black display and lower the contrast ratio. However, in the liquid crystal display device 100, the side surface 100b3 of a stepped portion is located in the reflection region R, as illustrated in FIG. 1B, whereby the contrast ratio is not lowered in the transmission region T, thus suppressing the deterioration in the display quality. The reflection region R has a lower contrast ratio than the transmission region T in the first place, and the required level of display characteristics for the reflection region R is also lower. Therefore, even if some light leakage occurs in the reflection region R, it does not affect the display. In contrast, in the liquid crystal display device 1100 of the comparative example illustrated in FIG. 16, a side surface 1100a3 of a stepped portion is not located in the reflection region R, whereby transmitted light (light that is used for displaying an image in a transmission mode) leaks, thus significantly deteriorating the display quality.

Moreover, in the liquid crystal display device 1100 of the comparative example illustrated in FIG. 16, the side surface 1100a3 of a stepped portion is an electrodeless region that is not covered with an electrode. Referring to FIG. 17A, while an alignment control is done by using an inclined electric field produced around the side surface 1100a3, the side surface 1100a3 is inclined with respect to the substrate plane, whereby the alignment control may be difficult depending on the level of the applied voltage, the inclination angle of the side surface 1100a3, etc. For example, as illustrated in FIG. 17B, if the inclination angle of the side surface 1100a3 is large, the angle between the equipotential line EQ and the liquid crystal molecules 30a may be close to 90°, in which case the orientation-regulating force is significantly weak.

In contrast, in the liquid crystal display device 100, the counter substrate 100b is provided with a stepped portion, whereby the side surface 100b3 of the stepped portion can be covered with the electrode 22. Along the side surface 100b3 covered with the electrode 22, the equipotential line EQ is parallel to the side surface 100b3 and perpendicular to the liquid crystal molecules 30a, as illustrated in FIG. 18, whereby the orientation-regulating force is not exerted.

As described above, in the liquid crystal display device 100 of the present invention, a multigap structure is realized by providing a stepped portion on a substrate different from the substrate that is provided with an electrode for producing an inclined electric field for forming a radially-inclined orientation, and the side surface 100b3 of the stepped portion is located in the reflection region R while being covered with the electrode 22, whereby it is possible to obtain advantages related to the production process and to suppress the deterioration in the display quality due to the inclination of the side surface 100b3 of the stepped portion.

The liquid crystal display device 100 of the present embodiment may employ the same arrangement as a vertical alignment type liquid crystal display device known in the art, and may be produced by a known production method, except that the picture element electrode 14 includes a plurality of sub-electrodes 14a arranged in a line in one of two periodic arrangement directions, in which picture elements are arranged periodically, except that picture elements that are adjacent to each other in the other periodic arrangement direction are driven with voltages of opposite polarities, and except that the counter substrate 100b includes a stepped portion.

Note that in the present embodiment, the transparent dielectric layer (e.g., a transparent resin layer) 29 is selectively formed in the reflection region R to provide a stepped portion on the counter substrate 100b. Alternatively, different materials may be used for the color filter layer in the reflection region R and that in the transmission region T, with the thickness of the color filter layer in the reflection region R being larger than that in the transmission region T, thus forming a stepped portion. Since light used in the transmission mode passes through the color filter layer only once while light used in the reflection mode passes through the color filter layer twice, if the optical density of the color filter layer in the transmission region T is the same as that in the reflection region R, the color purity and/or the brightness will be lower in the reflection region R. However, where different materials are used for the color filter layer in the reflection region R and that in the transmission region T as described above, the optical density of the color filter layer in the reflection region R can be made smaller than that in the transmission region T, whereby it is possible to improve the color purity and/or the brightness in the reflection region R.

Typically, a vertical alignment film (not shown) as a vertical alignment layer is provided on one side of each of the picture element electrode 14 and the counter electrode 22 that is closer to the liquid crystal layer 30 so as to vertically align the liquid crystal molecules having a negative dielectric anisotropy.

The liquid crystal material may be a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarization plate.

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. For example, a vertical alignment type liquid crystal display device may be used in an optical rotation mode or in a display mode that is a combination of an optical rotation mode and a birefringence mode, in addition to a birefringence mode in which an image is displayed by controlling the birefringence of the liquid crystal layer with an electric field. It is possible to obtain a birefringence-mode liquid crystal display device by providing a pair of polarization plates on the outer side (the side away from the liquid crystal layer 30) of the pair of substrates (e.g., the TFT substrate and the counter substrate) of any of the liquid crystal display devices described above. Moreover, a phase difference compensator (typically a phase plate) may be provided as necessary. Furthermore, a liquid crystal display device with a high brightness can be obtained also by using generally circularly-polarized light.

Embodiment 2

The liquid crystal display device of the present embodiment is different from the liquid crystal display device 100 of Embodiment 1 in that the counter substrate includes an orientation-regulating structure.

FIG. 19A to FIG. 19E schematically illustrate a counter substrate 200b having an orientation-regulating structure 28. Each element having substantially the same function as that of the liquid crystal display device 100 will be denoted by the same reference numeral and will not be further described.

Figure 19A:
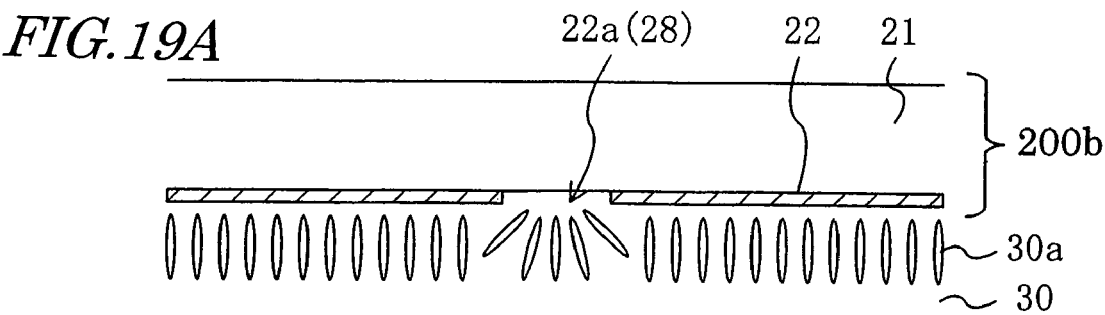
Figure 19B:
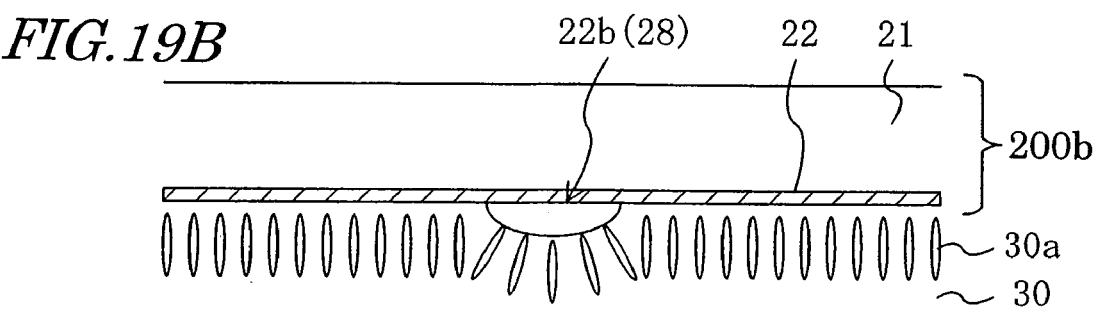
Figure 19C:
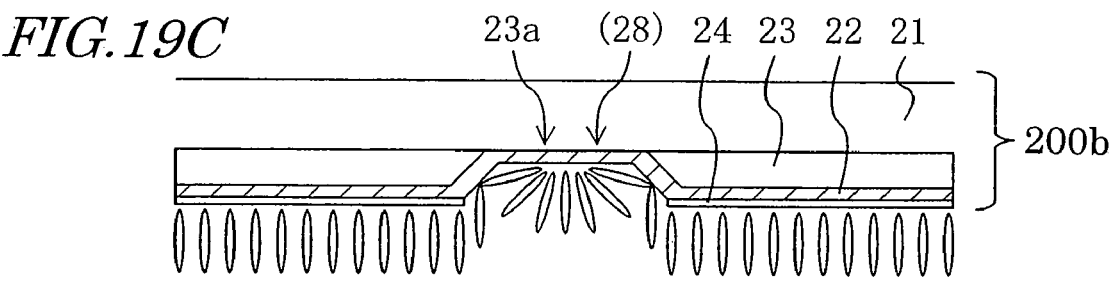
Figure 19D:
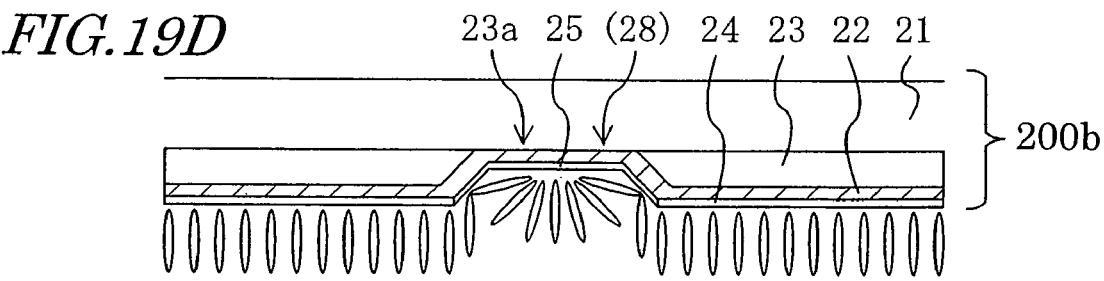
Figure 19E:
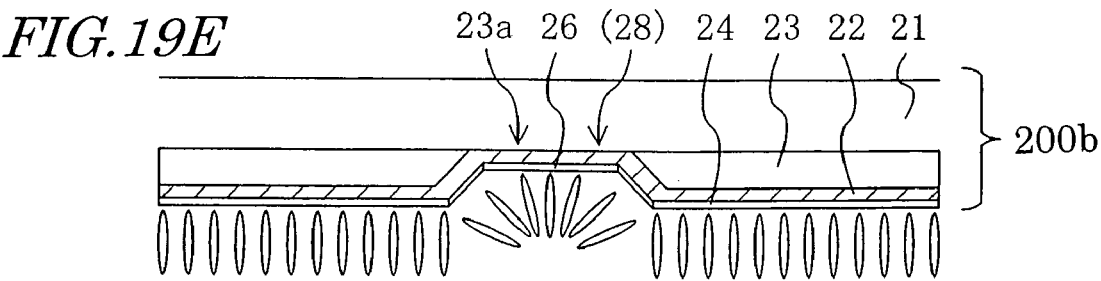

The orientation-regulating structure 28 illustrated in FIG. 19A to FIG. 19E functions to orient the liquid crystal molecules 30a of the liquid crystal layer 30 into a radially-inclined orientation. Note that the orientation-regulating structure 28 illustrated in FIG. 19A to FIG. 19D and that illustrated in FIG. 19E are different in terms of the direction in which the liquid crystal molecules 30a are to be inclined.

The direction in which the liquid crystal molecules are inclined by the orientation-regulating structure 28 illustrated in FIG. 19A to FIG. 19D is aligned with the orientation direction of the radially-inclined orientation of each liquid crystal domain that is formed in a region corresponding to the sub-electrode 14a (see, for example, FIG. 1A and FIG. 1B) of the picture element electrode 14. In contrast, the direction in which the liquid crystal molecules are inclined by the orientation-regulating structure 28 illustrated in FIG. 19E is aligned with the orientation direction of the radially-inclined orientation of each liquid crystal domain that is formed in a region corresponding to the electrodeless region 15 (see, for example, FIG. 1A and FIG. 1B) of the picture element electrode 14.

The orientation-regulating structure 28 illustrated in FIG. 19A is formed by an opening 22a of the counter electrode 22 and the sub-electrode 14a of the picture element electrode (not shown in FIG. 19A; see, for example, FIG. 1A) 14 opposing the opening 22a. A vertical alignment film (not shown) is provided on one surface of the counter substrate 200b that is closer to the liquid crystal layer 30.

The orientation-regulating structure 28 exerts an orientation-regulating force only in the presence of an applied voltage. Since the orientation-regulating structure 28 is only required to exert an orientation-regulating force upon the liquid crystal molecules in each liquid crystal domain in a radially-inclined orientation formed by the electrode structure of the TFT substrate 100a, the size of the opening 22a is smaller than the electrodeless region 15 provided in the TFT substrate 100a, and smaller than the sub-electrode 14a (see, for example, FIG. 1A) which is surrounded by the electrodeless regions 15. For example, a sufficient effect can be obtained only, with an area less than or equal to one half of that of the electrodeless region 15 or the sub-electrode 14a. When the opening 22a of the counter electrode 22 is provided so as to oppose the central portion of the sub-electrode 14a of the picture element electrode 14, the continuity of the orientation of the liquid crystal molecules increases, and it is possible to fix the position of the central axis of the radially-inclined orientation.

As described above, when a structure exerting an orientation-regulating force only in the presence of an applied voltage is employed as the orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Each of the orientation-regulating structures 28 illustrated in FIG. 19B to FIG. 19D exerts an orientation-regulating force regardless of the presence/absence of an applied voltage, whereby it is possible to obtain a stable radially-inclined orientation at any display gray level, and there is provided a high resistance to a stress.

The orientation-regulating structure 28 illustrated in FIG. 19B includes a protrusion (rib) 22b that is provided on the counter electrode 22 so as to protrude into the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 200b that is closer to the liquid crystal layer 30. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 19B through a heat treatment after patterning. The protrusion 22b having a slightly-humped cross section with a vertex (e.g., a portion of a sphere) as illustrated in the figure or a conical protrusion provides a desirable effect of fixing the central position of the radially-inclined orientation.

The orientation-regulating structure 28 illustrated in FIG. 19C is provided as a surface having a horizontal alignment power facing the liquid crystal layer 30 that is provided in an opening (or a depressed portion) 23a in a dielectric layer 23 formed under the counter electrode 22 (i.e., on one side of the counter electrode 22 that is closer to the substrate 21). A vertical alignment film 24 is provided so as to cover one side of the counter substrate 200b that is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 19D.

The horizontal alignment film illustrated in FIG. 19D can be provided by, for example, once providing the vertical alignment film 24 across the entire surface of the counter substrate 200b, and then selectively irradiating a portion of the vertical alignment film 24 in the opening 23a with UV light so as to reduce the vertical alignment power thereof. The horizontal orientation power required for the orientation-regulating structure 28 does not have to be so high that the resulting pretilt angle is as small as that resulting from an alignment film used in a TN type liquid crystal display device. For example, a pretilt angle of 45° or less is sufficient.

As illustrated in FIG. 19C and FIG. 19D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in the figure.

A radially-inclined orientation can be obtained only by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 200b that is closer to the liquid crystal layer 30, because it adds nothing to the process. In the structures illustrated in FIG. 19C and FIG. 19D, there is little decrease in light efficiency because there is no region where a voltage is applied across the liquid crystal layer 30 via the protrusion 22b as in the structure illustrated in FIG. 19A.

In the orientation-regulating structure 28 illustrated in FIG. 19E, a depressed portion is formed on one side of the counter substrate 200b that is closer to the liquid crystal layer 30 by using the opening 23a of the dielectric layer 23, as in the orientation-regulating structure 28 illustrated in FIG. 19D, and a horizontal alignment film 26 is formed only in the bottom portion of the depressed portion. Instead of forming the horizontal alignment film 26, the surface of the counter electrode 22 may be exposed as illustrated in FIG. 19C.

A liquid crystal display device 200 having the orientation-regulating structure as described above is shown in FIG. 20A and FIG. 20B. FIG. 20A is a plan view, and FIG. 20B is a cross-sectional view taken along line 20B-20B' of FIG. 20A.

The liquid crystal display device 200 includes the TFT substrate 100a having the picture element electrode 14 including the sub-electrodes 14a and the electrodeless regions 15, and the counter substrate 200b having the orientation-regulating structure 28. The structure of the TFT substrate 100a is not limited to the structure illustrated herein, but may be any other structure described above. Moreover, while a structure that exerts an orientation-regulating force even in the absence of an applied voltage (FIG. 19B to FIG. 19D and FIG. 19E) will be used as the orientation-regulating structure 28, the orientation-regulating structure 28 illustrated in FIG. 19B to FIG. 19D can be replaced with that illustrated in FIG. 19A.

Among the orientation-regulating structures 28 provided in the counter substrate 200b of the liquid crystal display device 200, the orientation-regulating structure 28 provided around the center of a region opposing the sub-electrode 14a of the picture element electrode 14 is one of those illustrated in FIG. 19B to FIG. 19D, and the orientation-regulating structure 28 provided around the center of a region opposing the electrodeless region 15 of the picture element electrode 14 is one illustrated in FIG. 19E.

With such an arrangement, in the presence of an applied voltage across the liquid crystal layer 30, i.e., in the presence of an applied voltage between the picture element electrode 14 and the counter electrode 22, the direction of the radially-inclined orientation formed by the sub-electrode 14a of the picture element electrode 14 is aligned with the direction of the radially-inclined orientation formed by the orientation-regulating structure 28, thereby stabilizing the radially-inclined orientation. This is schematically shown in FIG. 21A to FIG. 21C. FIG. 21A illustrates a state in the absence of an applied voltage, FIG. 21B illustrates a state where the orientation has just started to change (initial ON state) after application of a voltage, and FIG. 21C schematically illustrates a steady state during the voltage application.

As illustrated in FIG. 21A, the orientation-regulating force exerted by the orientation-regulating structure (FIG. 19B to FIG. 19D) 28 acts upon the liquid crystal molecules 30a in the vicinity thereof even in the absence of an applied voltage, thereby forming a radially-inclined orientation.

When voltage application begins, an electric field represented by equipotential lines EQ shown in FIG. 21B is produced (by the electrode structure of the TFT substrate 100a), and a liquid crystal domain in which the liquid crystal molecules 30a are in a radially-inclined orientation is formed in each region corresponding to the electrodeless region 15 and each region corresponding to the sub-electrode 14a, and the liquid crystal layer 30 reaches a steady state as illustrated in FIG. 21C. The inclination direction of the liquid crystal molecules 30a in each liquid crystal domain coincides with the direction in which the liquid crystal molecules 30a are inclined by the orientation-regulating force exerted by the orientation-regulating structure 28 that is provided in a corresponding region.

When a stress is applied upon the liquid crystal display device 200 in a steady state, the radially-inclined orientation of the liquid crystal layer 30 once collapses, but upon removal of the stress, the radially-inclined orientation is restored because of the orientation-regulating forces from the sub-electrode 14a and the orientation-regulating structure 28 acting upon the liquid crystal molecules 30a. Therefore, the occurrence of an after image due to a stress is suppressed. When the orientation-regulating force from the orientation-regulating structure 28 is excessively strong, retardation occurs even in the absence of an applied voltage due to the radially-inclined orientation, whereby the display contrast ratio may decrease. However, the orientation-regulating force from the orientation-regulating structure 28 does not have to be strong because it is only required to have an effect of stabilizing a radially-inclined orientation formed by an inclined electric field and fixing the central axis position thereof. Therefore, an orientation-regulating force that would not cause such a degree of retardation as to deteriorate the display quality is sufficient.

For example, when the protrusion (rib) 22b illustrated in FIG. 19B is employed, each protrusion 22b may have a diameter of about 15 μm and a height (thickness) of about 1 μm for the sub-electrode 14a having a diameter of about 30 μm to about 35 μm, thereby obtaining a sufficient orientation-regulating force and suppressing the reduction in the contrast ratio due to retardation to a practical level.

FIG. 22A and FIG. 22B illustrate another liquid crystal display device 200' including an orientation-regulating structure.

The liquid crystal display device 200' does not have the orientation-regulating structure in a region opposing the electrodeless region 15 of the TFT substrate 100a. Formation of the orientation-regulating structure 28 illustrated in FIG. 19E which should be formed in a region opposing the electrodeless region 15 introduces difficulties into the process. Therefore, in view of the productivity, it is preferred to use only one of the orientation-regulating structures 28 illustrated in FIG. 19A to FIG. 19D. Particularly, the orientation-regulating structure 28 illustrated in FIG. 19B is preferred because it can be produced by a simple process.

Even if no orientation-regulating structure is provided in a region corresponding to the electrodeless region 15 as in the liquid crystal display device 200', substantially the same radially-inclined orientation as that of the liquid crystal display device 200 is obtained, as schematically illustrated in FIG. 23A to FIG. 23C, and also the stress resistance thereof is at a practical level.

In a case where the protrusion 22b as illustrated in FIG. 19B is employed as the orientation-regulating structure 28, the thickness of the liquid crystal layer 30 may be defined by the protrusion 22b, as illustrated in FIG. 24A. In other words, the protrusion 22b may function also as a spacer that controls the cell gap (the thickness of the liquid crystal layer 30). Such an arrangement is advantageous in that it is not necessary to separately provide a spacer for defining the thickness of the liquid crystal layer 30, thereby simplifying the production process.

In the illustrated example, the protrusion 22b has a truncated cone shape with a side surface 22b1 that is inclined by a taper angle θ less than 90° with respect to the substrate plane of the substrate 21. When the side surface 22b1 is inclined by an angle less than 90° with respect to the substrate plane, the side surface 22b1 of the protrusion 22b has an orientation-regulating force of the same direction as that of the orientation-regulating force exerted by the inclined electric field for the liquid crystal molecules 30a of the liquid crystal layer 30, thereby functioning to stabilize the radially-inclined orientation.

As schematically illustrated in FIG. 24A to FIG. 24C, a radially-inclined orientation similar to that obtained with the liquid crystal display device 200' can be obtained also with the protrusion 22b that functions also as a spacer.

While the protrusion 22b has the side surface 22b1 that is inclined by an angle less than 90° with respect to the substrate plane in the example illustrated in FIG. 24A to FIG. 24C, the protrusion 22b may alternatively have the side surface 22b1 that is inclined by an angle of 90° or more with respect to the substrate plane. In view of the stability of the radially-inclined orientation, it is preferred that the inclination angle of the side surface 22b1 does not substantially exceed 90°, and it is more preferred that the inclination angle is less than 90°. Even if the inclination angle exceeds 90°, as long as it is close to 90° (as long as it does not substantially exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b substantially exceeds 90° as illustrated in FIG. 25, the side surface 22b1 of the protrusion 22b will have an orientation-regulating force of the opposite direction to the orientation-regulating force exerted by the inclined electric field for the liquid crystal molecules 30a of the liquid crystal layer 30, whereby the radially-inclined orientation may not be stable.

The protrusion 22b that functions also as a spacer is not limited to a protrusion having a truncated cone shape as illustrated in FIG. 24A and FIG. 24B. For example, the protrusion 22b may have a shape as illustrated in FIG. 26 such that the cross section thereof in a plane vertical to the substrate plane is a part of an ellipse (i.e., a shape such as a part of an elliptical sphere). In the protrusion 22b illustrated in FIG. 26, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

The protrusion 22b as described above that is in contact with both the upper and lower substrates (the TFT substrate and the counter substrate) and functions also as a spacer defining the thickness of the liquid crystal layer 30 may be formed either on the upper substrate or on the lower substrate in the process of producing a liquid crystal display device. Regardless of whether it is formed on the upper or lower substrate, the protrusion 22b will be in contact with both substrates, functioning as a spacer and as the orientation-regulating structure, once the upper and lower substrates are attached to each other.

It is not necessary that all of the protrusions 22b provided in regions opposing the sub-electrodes 14a function as spacers. By forming some of the protrusions 22b to be lower than the other protrusions 22b that function as spacers, it is possible to suppress the occurrence of light leakage.

Alternative liquid crystal display devices of the present embodiment will now be described.

The TFT substrate 100a of each of liquid crystal display devices 200A and 200B illustrated in FIG. 27A, FIG. 27B and FIG. 28 includes, in each picture element region, the picture element electrode 14 including three sub-electrodes 14a. Two of the three sub-electrodes 14a provided in a picture element region are transparent electrodes and the remaining one sub-electrode 14a is a reflection electrode. The sub-electrodes 14a each have a square shape. Moreover, the counter substrate 200b of each of the liquid crystal display devices 200A and 200B includes the protrusion (rib) 22 as the orientation-regulating structure in a region opposing the sub-electrode 14a.

The liquid crystal display device 200A illustrated in FIG. 27A and the liquid crystal display device 200B illustrated in FIG. 27B are different from each other in the structure of the transparent dielectric layer 29 of the counter substrate 200b. Specifically, in the liquid crystal display device 200A, the transparent dielectric layer 29 is formed separately (individually) in each picture element region, as illustrated in FIG. 27A, whereas in the liquid crystal display device 200B, the transparent dielectric layer 29 in a picture element region is continuous with the transparent dielectric layers 29 in other picture element regions that are adjacent to the picture element region in the row direction D1, as illustrated in FIG. 27B. Where the transparent dielectric layer 29 in a picture element region is continuous with the transparent dielectric layers 29 in other picture element regions that are adjacent to the picture element region in a certain direction, as illustrated in FIG. 27B, it is no longer necessary to consider the alignment margin for the transparent dielectric layers 29 in that direction, whereby it is possible to reduce the pixel interval in the direction, thus improving the aperture ratio and the productivity.

In the liquid crystal display devices 200A and 200B illustrated in FIG. 27A and FIG. 27B, respectively, the picture element regions are arranged so that the reflection regions R of picture element regions adjacent to one another in the row direction D1 are adjacent to one another. In contrast, in liquid crystal display devices 200C, 200D, 200E and 200F illustrated in FIG. 29A, FIG. 29B, FIG. 30A and FIG. 30B, respectively, the reflection region R of each picture element region is not only adjacent to the reflection region R of a next picture element region in the row direction D1 but also adjacent to the reflection region R of a next picture element region in the column direction D2.

In the liquid crystal display device 200C illustrated in FIG. 29A, the transparent dielectric layer 29 is formed separately in the reflection region R in each picture element region. In contrast, in the liquid crystal display devices 200D, 200E and 200F illustrated in FIG. 29B, FIG. 30A and FIG. 30B, respectively, the transparent dielectric layer 29 in a picture element region is continuous with the transparent dielectric layers 29 in other picture element regions that are adjacent to the picture element region in the row direction D1 and/or the column direction D2, whereby it is possible to improve the aperture ratio and the productivity. Particularly, in the liquid crystal display device 200F illustrated in FIG. 30B, the transparent dielectric layer 29 in a picture element region is continuous with the transparent dielectric layers 29 in other picture element regions that are adjacent to the picture element region in the row direction D1 and with the transparent dielectric layer 29 in another picture element region that is adjacent to the picture element region in the column direction D2, whereby it is no longer necessary to consider the alignment margin for the transparent dielectric layers 29 in the row direction D1 or in the column direction D2. This arrangement is highly effective in improving the aperture ratio and the productivity.

While FIG. 27 to FIG. 30 illustrate arrangements where each picture element region is equally divided into regions defined by the sub-electrodes 14a (referred to as "sub-picture element regions") having the same size and the same shape, it is not necessary in the present invention that the picture element region is divided equally. One or more of the sub-picture element regions of one picture element region may have a different size/shape from that of the other sub-picture element regions, or a sub-picture element region in the transmission region T may have a different size/shape from that of a sub-picture element region in the reflection region R. Moreover, while FIG. 27 to FIG. 30 illustrate arrangements where a sub-picture element region has a square shape and has an aspect ratio of 1:1, it is not necessary in the present invention that the aspect ratio of the sub-picture element region is 1:1.

A liquid crystal display device 200G illustrated in FIG. 31A is different from the liquid crystal display device 200A illustrated in FIG. 27A in that the sub-electrode 14a provided in the reflection region R has an oblong rectangular shape, and the sub-picture element region in the reflection region R has an oblong rectangular shape. While it may be difficult to form all the sub-picture element regions in the picture element region with an aspect ratio of 1:1 depending on the aspect ratio of the picture element region, if one or more of the sub-picture element regions have a different shape (e.g., an oblong rectangular shape) from others, as illustrated in FIG. 31A, the plurality of sub-electrodes 14a can be arranged within a picture element region as closely as possible, whereby it is possible to increase the area ratio of the sub-electrode 14a in each picture element region, thus increasing the aperture ratio. Note that where the size/shape of one or more of the sub-picture element regions is adjusted according to the aspect ratio of the picture element region, the display is less influenced if the size/shape of the sub-picture element region in the reflection region R is adjusted. This is because the reflection region R, having a smaller cell gap (the thickness of the liquid crystal layer 30), has a better response characteristic in the first place, and the required level of display quality is lower than that in the transmission region T.

A liquid crystal display device 200H illustrated in FIG. 31B is similar to the liquid crystal display device 200A illustrated in FIG. 27A except that two square-shaped sub-picture element regions (the sub-picture element electrodes 14a) arranged in the transmission region T are replaced by a single oblong rectangular sub-picture element region (the sub-picture element electrode 14a) with a larger aspect ratio (about 1:2). If the number of sub-picture element regions (the sub-electrodes 14a) in each picture element region is reduced by using sub-picture element regions (the sub-electrodes 14a) of a larger aspect ratio, although the orientation stability and the response speed decrease, the area ratio of the electrodeless region 15 in the picture element region can be reduced, whereby it is possible to further improve the aperture ratio. A research by the present inventor revealed that a sufficiently stable radially-inclined orientation can be obtained even with the sub-electrodes 14a having an aspect ratio of about 1:2.

Moreover, depending on the shape of the picture element region, all of the sub-picture element regions (the sub-picture element electrodes 14a) in each picture element region may be oblong rectangular, as in liquid crystal display devices 200I and 200J illustrated "in FIG. 32A and FIG. 32B, respectively, to improve the aperture ratio. In the liquid crystal display device 200I illustrated in FIG. 32A, two sub-picture element regions (the sub-electrodes 14a) in the transmission region T and one sub-picture element region (the sub-electrode 14a) in the reflection region R are all oblong rectangular. Moreover, in the liquid crystal display device 200J illustrated in FIG. 32B, one sub-picture element region (the sub-electrode 14a) in the transmission region T and one sub-picture element region (the sub-electrode 14a) in the reflection region R are both oblong rectangular.

Note that FIG. 27 to FIG. 32 illustrate arrangements where an image is displayed preferentially in the transmission mode, with the area ratio between the transmission region T and the reflection region R being about 2:1. It is understood that where an image is displayed preferentially in the reflection mode, the area ratio of the reflection region R can be made higher than that of the transmission region T as in liquid crystal display devices 200K and 200L illustrated in FIG. 33A and FIG. 33B, respectively.

In the liquid crystal display device 200K illustrated in FIG. 33A, two of the three square-shaped sub-electrodes 14a in each picture element region are reflection electrodes and the remaining one square-shaped sub-electrode 14a is a transparent electrode, with the area ratio between the transmission region T and the reflection region R being about 1:2.

In the liquid crystal display device 200L illustrated in FIG. 33B, each picture element region includes one square-shaped sub-electrode 14a being a transparent electrode and one oblong rectangular-shaped (aspect ratio: about 1:2) sub-electrode 14a being a reflection electrode, with the area ratio between the transmission region T and the reflection region R also being about 1:2.

Moreover, in order to improve the response characteristic of the liquid crystal layer 30 in the transmission region T, each sub-electrode 14a in the transmission region T may have a shape with acute angle corners, as in a liquid crystal display device 200M illustrated in FIG. 34A. Alternatively, in order to increase both the orientation stability and the transmittance for the transmission region T, each sub-electrode 14a in the transmission region T may be formed in a barrel-like shape (a generally square shape with generally arc-shaped corner portions), as in a liquid crystal display device 200N illustrated in FIG. 34B.

Note that while the present embodiment is directed to liquid crystal display devices including orientation-regulating structures on the counter substrate 200b, a research by the present inventor on various arrangements revealed that a stable radially-inclined orientation can be formed also by providing a protrusion (rib) on a central portion of the sub-electrode 14a of the TFT substrate 100a. Where the protrusion 22b as an orientation-regulating structure is provided on the counter substrate 200b in a region opposing the sub-electrode 14a, as illustrated in FIG. 35A, the orientation-regulating force of the protrusion 22b conforms with the orientation-regulating force of an inclined electric field produced at the edge portion of the electrodeless region 15. In contrast, where a protrusion (rib) 18 is provided on a central portion of the sub-electrode 14a of the TFT substrate 100a, as illustrated in FIG. 35B, the orientation-regulating force thereof apparently does not conform with the orientation-regulating force of an inclined electric field produced at the edge portion of the electrodeless region 15. However, since the protrusion 18 exerts a strong orientation-regulating force by virtue of the surface configuration thereof, the liquid crystal molecules 30a above the sub-electrode 14a in the presence of an applied voltage create a twisted metastable state so as to conform with the orientation of the liquid crystal molecules 30a around the edge portion of the electrodeless region 15, whereby a stable radially-inclined orientation can be formed.

Embodiment 3

A liquid crystal display device 300 of the present embodiment will now be described with reference to FIG. 36. The liquid crystal display device 300 is different from the liquid crystal display device 100 illustrated in FIG. 1A and FIG. 1B in that the thickness de of the liquid crystal layer 30 at an edge portion of the sub-electrode 14a placed in the transmission region T is smaller than the thickness dc of the liquid crystal layer 30 at a central portion of the sub-electrode 14a, as illustrated in FIG. 36.

The response speed of the liquid crystal molecules 30a is typically higher as the thickness of the liquid crystal layer 30 (cell gap) is smaller (whereby the effect of the electric field is more significant), and it is generally inversely proportional to the square of the thickness of the liquid crystal layer 30. Therefore, if the thickness de of the liquid crystal layer 30 at the edge portion (outer periphery) of the sub-electrode 14a is smaller than the thickness dc of the liquid crystal layer 30 at the central portion of the sub-electrode 14a, as in the present embodiment, the response speed of the liquid crystal molecules 30a above the edge portion of the sub-electrode 14a is higher than that of the liquid crystal molecules 30a above the central portion of the sub-electrode 14a. The liquid crystal molecules 30a above the edge portion are those that trigger the formation of a radially-inclined orientation. Therefore, if the response speed of the liquid crystal molecules 30a above the edge portion is increased, a liquid crystal domain is formed more quickly. As a result, the response speed of the entire region of the liquid crystal layer 30 where a liquid crystal domain is formed is increased. Therefore, the liquid crystal display device 300 of the present embodiment has a desirable response characteristic.

Note that while the response speed can be further increased by decreasing the cell gap across the entire picture element region, it is then necessary to increase the refractive index anisotropy ($\Delta n$) of the liquid crystal material to give a predetermined retardation to light passing through the liquid crystal layer 30. With common liquid crystal materials, however, the viscosity increases as the refractive index anisotropy increases, thereby canceling out the advantage of an improved response speed obtained by reducing the cell gap. Therefore, it is not possible to sufficiently improve the response speed by simply reducing the thickness of the liquid crystal layer 30 entirely across the picture element region.

In contrast, in the liquid crystal display device 300 of the present embodiment, the cell gap is reduced only in a portion of the picture element region (a region corresponding to the edge portion of the sub-electrode 14a), and it is not necessary to increase the refractive index anisotropy ($\Delta n$) of the liquid crystal material, whereby it is possible to sufficiently improve the response speed.

In order to sufficiently improve the response speed, the difference between the thickness de of the liquid crystal layer 30 at the edge portion of the sub-electrode 14a and the thickness dc of the liquid crystal layer 30 at the central portion thereof is preferably 0.5 µm, more preferably 1 µm or more, and even more preferably 1.5 µm or more.

Note that while a structure where the cell gap is smaller at the edge portion of the sub-electrode 14a than at the central portion of the sub-electrode 14a is employed for the transmission region T in the present embodiment, such a structure may alternatively be employed for the reflection region R or for both the transmission region T and the reflection region R. Note however that since the reflection region R has a smaller cell gap in the first place, a desirable effect of improving the response speed can be obtained by reducing the cell gap at the edge portion at least in the transmission region T.

In the present embodiment, the thickness de of the liquid crystal layer 30 at the edge portion is made smaller than the thickness dc of the liquid crystal layer 30 at the central portion by setting the height of the surface of the sub-electrode 14a at the edge portion to be larger than that at the central portion of the sub-electrode 14a, as illustrated in FIG. 36. More specifically, the interlayer insulating film 19 is provided between the picture element electrode 14 and the transparent substrate 11 with the height of the surface of the interlayer insulating film 19 being locally changed, whereby the surface of the sub-electrode 14a at the edge portion thereof is higher than that at the central portion thereof.

The interlayer insulating film 19 of the present embodiment includes a first region 19a where the height of the surface thereof on the side closer to the liquid crystal layer 30 changes continuously and a second region 19b where the height of the surface thereof on the side closer to the liquid crystal layer 30 is substantially constant. The edge portion of the sub-electrode 14a in the transmission region T is located in the first region 19a and the central portion of the sub-electrode 14a is located in the second region 19b.

In view of the display quality, it is preferred that the inclination angle of the first region 19a of the interlayer insulating film 19 (the inclination angle with respect to the surface of the substrate 11) is small. Since the vertical alignment film formed in the first region 19a has an orientation-regulating force for orienting the liquid crystal molecules 30a vertical to the surface thereof, the liquid crystal molecules 30a in the first region 19a are oriented in an inclined direction with respect to the surface of the substrate 11. The degree of inclination of the liquid crystal molecules 30a is larger as the inclination angle of the first region 19a is larger. Since the orientation-regulating force from the vertical alignment film exists irrespective of the presence/absence of a voltage application, light leakage occurs in a black display due to the inclined liquid crystal molecules 30a in the first region 19a. Therefore, if the inclination angle of the first region 19a of the interlayer insulating film 19 is excessively large, the contrast ratio decreases. Thus, the inclination angle of the first region 19a of the interlayer insulating film 19 is preferably small, and the interlayer insulating film 19 preferably has a gentle slope. Specifically, the inclination angle of the first region 19a of the interlayer insulating film 19 with respect to the surface of the substrate 11 is preferably 30° or less, and more preferably 20° or less.

Note that if the height of the surface of the sub-electrode 14a changes continuously across the entire sub-electrode 14a, the retardation of the liquid crystal layer 30 is no longer constant across the sub-electrode 14a, whereby the display quality may deteriorate. In such a case, it is difficult to suitably compensate for the phase difference by using a phase difference compensator. If the interlayer insulating film 19 includes the second region 19b where the height of the surface on the side closer to the liquid crystal layer 30 is substantially constant, as in the present embodiment, such problems can be suppressed.

The interlayer insulating film 19 having a gentle slope as described above can be formed by, for example, exposing and developing a photosensitive resin film using a photomask and then thermally deforming the film in a heat treatment. Specifically, the interlayer insulating film 19 having a gentle slope as illustrated in FIG. 36 can be obtained by first forming a photosensitive resin film on the surface of the transparent substrate 11, exposing the film using a photomask so that a portion corresponding to the reflection region R is unexposed while a portion corresponding to the transmission region T is exposed to a predetermined amount of light, developing the film, and then subjecting the film to a heat treatment at a predetermined temperature. Note that the exposure process is performed with such an exposure value that a portion of the photosensitive resin film corresponding to the transmission region T will not be completely removed but will partly remain after the development process. Such an exposure process is sometimes called a "half exposure process".

Note that with an arrangement where the cell gap is locally reduced at the edge portion of the sub-electrode 14a, as in the present embodiment, it is preferred to employ a display mode using circularly-polarized light, i.e., a display mode in which light to be incident upon the liquid crystal layer 30 is circularly-polarized light and the circularly-polarized light is modulated through the liquid crystal layer 30 to display an image. The reason for this will now be described with reference to FIG. 37. FIG. 37 is an enlarged cross-sectional view illustrating an edge portion of the sub-electrode 14a in the presence of an applied voltage.

As illustrated in FIG. 37, if the edge portion of the sub-electrode 14a is formed on an inclined surface, the degree of continuity may be poor between the orientation of the liquid crystal molecules 30a above the edge portion of the sub-electrode 14a and that above the electrodeless region 15 in the presence of an applied voltage. Therefore, referring to FIG. 37, the liquid crystal molecule 30a above the edge portion once falls down due to the electric field effect, after which it changes the azimuth angle of its orientation as indicated by an arrow in the figure so as to maintain a degree of orientation continuity with other adjacent liquid crystal molecules 30a. Thus, the liquid crystal molecules 30a near the edge portion show a two-step response behavior in response to a voltage application. The second step, in which the azimuth angle of orientation changes slowly, causes a change in the transmittance (brightness) in a display mode using linearly-polarized light, whereby it may not be possible in such a display mode to obtain a sufficient effect of improving the response speed by locally decreasing the cell gap at the edge portion of the sub-electrode 14a. In contrast, in a display mode using circularly-polarized light, the change in the azimuth angle of the liquid crystal molecules 30a does not substantially influence the transmittance, whereby it is possible to obtain a desirable effect of improving the response speed.

A display mode using circularly-polarized light can be realized by, for example, providing a circular polarization plate (e.g., a combination of a linear polarization plate and a λ/4 plate) on both sides of the liquid crystal layer 30.

The present invention provides a transmission-reflection liquid crystal display device having a wide viewing angle characteristic, a high display quality, and a high aperture ratio, and being capable of producing a bright display.

The liquid crystal display device of the present invention can suitably be used as a display device in various types of products such as personal computers, televisions and PDAs.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

This non-provisional application claims priority under 35 USC § 119(a) on Patent Application No. 2003-428427 filed in Japan on Dec. 24, 2003, the entire contents of which are hereby incorporated by reference.

What is claimed is:

1. A liquid crystal display device, comprising:
    a first substrate;

a second substrate; and a liquid crystal layer provided between the first substrate and the second substrate, wherein:

a plurality of picture element regions are defined in a matrix pattern including a plurality of rows extending in a first direction and a plurality of columns extending in a second direction crossing the first direction;

each of the plurality of picture element regions includes a first electrode provided on one side of the first substrate that is closer to the liquid crystal layer, a second electrode provided on one side of the second substrate that is closer to the liquid crystal layer so as to oppose the first electrode, and the liquid crystal layer provided between the first electrode and the second electrode;

the first electrode includes, in each of the plurality of picture element regions, a plurality of sub-electrodes, whereby the liquid crystal layer takes a vertical alignment in the absence of an applied voltage between the first electrode and the second electrode, and forms a plurality of first liquid crystal domains above the plurality of sub-electrodes of the first electrode by inclined electric fields produced around the plurality of sub-electrodes in response to a voltage applied between the first electrode and the second electrode, each of the plurality of first liquid crystal domains taking a radially-inclined orientation;

each of the plurality of picture element regions includes a transmission region where an image is displayed in a transmission mode using light coming from the first substrate side, and a reflection region where an image is displayed in a reflection mode using light coming from the second substrate side;

in each of the plurality of picture element regions, a thickness dr of the liquid crystal layer in the reflection region is smaller than a thickness dt of the liquid crystal layer in the transmission region, and the second substrate includes a stepped portion including an upper tier located in the reflection region, a lower tier located in the transmission region and a side surface connecting the upper tier and the lower tier to each other, the side surface of the stepped portion being located in the reflection region and covered by the second electrode; and the plurality of sub-electrodes of the first electrode are arranged in a line in the second direction, and a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame.

2. The liquid crystal display device according to claim 1, wherein the plurality of picture element regions each have a shape whose longitudinal direction is defined in the second direction and whose width direction is defined in the first direction.

3. The liquid crystal display device according to claim 1, wherein a polarity of a voltage applied across the liquid crystal layer in a plurality of picture element regions belonging to one column among the plurality of picture element regions is inverted for every n rows (where n is an integer of 1 or more) in each frame.

4. The liquid crystal display device according to claim 1, wherein a polarity of a voltage applied across the liquid crystal layer in the first picture element region is different from a polarity of a voltage applied across the liquid crystal layer in a third picture element region that belongs to the same column as that of the first picture element region and belongs to a row adjacent to a row to which the first picture element region belongs in each frame.

5. The liquid crystal display device according to claim 1, wherein a shape of each of the plurality of sub-electrodes has rotational symmetry.

6. The liquid crystal display device according to claim 5, wherein each of the plurality of sub-electrodes has a generally circular shape.

7. The liquid crystal display device according to claim 5, wherein each of the plurality of sub-electrodes has a generally rectangular shape.

8. The liquid crystal display device according to claim 5, wherein each of the plurality of sub-electrodes has a generally rectangular shape with generally arc-shaped corner portions.

9. The liquid crystal display device according to claim 5, wherein each of the plurality of sub-electrodes has a shape with acute angle corners.

10. The liquid crystal display device according to claim 1, wherein:

the first substrate includes a plurality of electrodeless regions where the first electrode is not provided, the plurality of electrodeless regions substantially surrounding the plurality of sub-electrodes of the first electrode; and the liquid crystal layer forms a plurality of second liquid crystal domains in the plurality of electrodeless regions by the inclined electric fields produced around the plurality of sub-electrodes in response to a voltage applied between the first electrode and the second electrode, each of the plurality of second liquid crystal domains taking a radially-inclined orientation.

11. The liquid crystal display device according to claim 10, wherein an orientation of the plurality of first liquid crystal domains and that of the plurality of second liquid crystal domains are continuous with each other.

12. The liquid crystal display device according to claim 10, wherein at least some of the plurality of electrodeless regions have substantially the same shape and substantially the same size, and form at least one unit lattice arranged so as to have rotational symmetry.

13. The liquid crystal display device according to claim 12, wherein a shape of each of the at least some of the plurality of electrodeless regions has rotational symmetry.

14. The liquid crystal display device according to claim 1, wherein the second substrate includes, in a region corresponding to at least one of the plurality of first liquid crystal domains, an orientation-regulating structure that exerts an orientation-regulating force for orienting liquid crystal molecules in the at least one first liquid crystal domain into a radially-inclined orientation at least in the presence of an applied voltage.

15. The liquid crystal display device according to claim 14, wherein the orientation-regulating structure is provided in a region in the vicinity of a center of the at least one first liquid crystal domain.

16. The liquid crystal display device according to claim 14, wherein the orientation-regulating structure exerts an orientation-regulating force for orienting the liquid crystal molecules into a radially-inclined orientation even in the absence of an applied voltage.

17. The liquid crystal display device according to claim 16, wherein the orientation-regulating structure is a protrusion protruding from the second substrate into the liquid crystal layer.

18. The liquid crystal display device according to claim 17, wherein a thickness of the liquid crystal layer is defined by the protrusion protruding from the second substrate into the liquid crystal layer.

19. The liquid crystal display device according to claim 1, wherein in each of the plurality of picture element regions, a thickness de of the liquid crystal layer at an edge portion of at least one of the plurality of sub-electrodes is smaller than a thickness dc of the liquid crystal layer at a central portion of the at least one sub-electrode.

20. The liquid crystal display device according to claim 19, wherein a height of a surface of the at least one sub-electrode at an edge portion thereof is larger than that at a central portion thereof.

21. The liquid crystal display device according to claim 20, wherein:
the first substrate includes a transparent substrate and an interlayer insulating film provided between the transparent substrate and the first electrode;
the interlayer insulating film includes a first region where a height thereof on one side that is closer to the liquid crystal layer changes continuously; and
an edge portion of the at least one sub-electrode is located in the first region.

22. The liquid crystal display device according to claim 21, wherein:
the interlayer insulating film includes a second region where the height thereof on one side that is closer to the liquid crystal layer is substantially constant; and
a central portion of the at least one sub-electrode is located in the second region.

23. The liquid crystal display device according to claim 19, wherein light incident upon the liquid crystal layer is circularly-polarized light, and the circularly-polarized light is modulated through the liquid crystal layer to display an image.

24. The liquid crystal display device according to claim 1, wherein the first electrode includes a transparent electrode defining the transmission region and a reflection electrode defining the reflection region.

25. The liquid crystal display device according to claim 1, wherein the second substrate further includes a transparent dielectric layer selectively provided in the reflection region in each of the plurality of picture element regions.

26. The liquid crystal display device according to claim 25, wherein the transparent dielectric layer provided in each of the plurality of picture element regions is continuous with the transparent dielectric layer provided in at least one of adjacent picture element regions.

27. The liquid crystal display device according to claim 1, wherein:
the first substrate further includes a switching element provided for each of the plurality of picture element regions; and
the first electrode is a picture element electrode provided for each of the plurality of picture element regions and switched by the switching element, and the second electrode is at least one counter electrode opposing the plurality of picture element electrodes.

* * * * *